United States Patent
Jong et al.

(10) Patent No.: US 9,391,690 B2
(45) Date of Patent: Jul. 12, 2016

(54) METHOD AND SYSTEM OF PROVIDING EFFICIENT PACKETIZED VOICE COMMUNCATIONS AND DATA BEARERS IN MOBILE SATELLITE SYSTEMS

(75) Inventors: Je-Hong Jong, North Potomac, MD (US); Maruf Mohammad, Gaithersburg, MD (US); Harish Ramchandran, Germantown, MD (US); Jun Xu, Germantown, MD (US); Channasandra Ravishankar, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 598 days.

(21) Appl. No.: 13/586,224

(22) Filed: Aug. 15, 2012

(65) Prior Publication Data

US 2013/0028175 A1    Jan. 31, 2013

Related U.S. Application Data

(63) Continuation of application No. 12/626,511, filed on Nov. 25, 2009, now abandoned.

(60) Provisional application No. 61/118,155, filed on Nov. 26, 2008.

(51) Int. Cl.
*H04B 7/185*    (2006.01)

(52) U.S. Cl.
CPC ................... *H04B 7/18513* (2013.01)

(58) Field of Classification Search
None
See application file for complete search history.

(56) References Cited

U.S. PATENT DOCUMENTS

| | | | |
|---|---|---|---|
| 6,278,876 B1 * | 8/2001 | Joshi et al. | 455/427 |
| 6,385,447 B1 * | 5/2002 | Soleimani et al. | 455/427 |
| 6,859,466 B1 * | 2/2005 | Chen et al. | 370/509 |
| 7,649,951 B2 | 1/2010 | Moffatt | |
| 7,751,488 B2 | 7/2010 | Moffatt | |
| 2002/0126764 A1 * | 9/2002 | Murakami et al. | 375/295 |
| 2002/0137510 A1 * | 9/2002 | Sims et al. | 455/427 |
| 2002/0174376 A1 * | 11/2002 | Classon et al. | 714/4 |
| 2003/0081696 A1 * | 5/2003 | Kim et al. | 375/316 |
| 2003/0129943 A1 * | 7/2003 | Park et al. | 455/13.4 |
| 2004/0030792 A1 * | 2/2004 | Febvre | 709/230 |
| 2004/0091074 A1 * | 5/2004 | Febvre et al. | 375/368 |

(Continued)

OTHER PUBLICATIONS

ETSI TS 101 376-5-2 V2.3.1 (Jul. 2008), Technical Specification, GEO-Mobile Radio Interface Specifications (Release 2); General Packet Radio Service; Part 5: Radio interface physical layer specifications; Sub-part 2: Multiplexing and Multiple Access; Stage 2 Service Description; GMPRS-1 05.002.*

(Continued)

*Primary Examiner* — Hassan Phillips
*Assistant Examiner* — Gautam Sharma
(74) *Attorney, Agent, or Firm* — Potomac Technology Law, LLC

(57) ABSTRACT

A broadband satellite communications system comprises forward error correction (FEC) encoder/decoder, interleaver/deinterleaver, puncturing/de-puncturing, scrambler/descrambler, bit to symbol mapping/de-mapping devices, modulator/demodulator, transmit and receive filter; operating in a time-division multiple access (TDMA) system where information is sent in a burst-by-burst fashion during the assigned time slot; supporting diverse traffic types such as voice over internet protocol (VOIP), control messages (DACCH) and keep alive burst (KAB) during silence period and multiple data rates.

16 Claims, 54 Drawing Sheets

(56) References Cited

U.S. PATENT DOCUMENTS

| | | | |
|---|---|---|---|
| 2004/0120349 A1* | 6/2004 | Border et al. | 370/474 |
| 2004/0147257 A1* | 7/2004 | Phillips et al. | 455/427 |
| 2004/0192201 A1* | 9/2004 | Febvre et al. | 455/13.2 |
| 2005/0026621 A1* | 2/2005 | Febvre et al. | 455/450 |
| 2008/0043860 A1 | 2/2008 | Moffatt | |
| 2008/0043861 A1 | 2/2008 | Moffatt | |
| 2008/0056229 A1 | 3/2008 | Gholmeih et al. | |
| 2008/0089441 A1* | 4/2008 | Hwang et al. | 375/299 |
| 2008/0130560 A1 | 6/2008 | Khandekar et al. | |
| 2009/0073934 A1 | 3/2009 | Tzavidas et al. | |
| 2009/0310575 A1 | 12/2009 | Gandham et al. | |
| 2010/0046383 A1 | 2/2010 | Williams et al. | |
| 2010/0080312 A1 | 4/2010 | Moffatt et al. | |

OTHER PUBLICATIONS

Prolog to Perceptual Coding of Digital Audio: An introduction to the paper by Painter and Spanias, Proceedings of the IEEE, vol. 88, No. 4, Apr. 2000.*

Overcoming Co-channel Interference in TDMA, Systems Using SOM Equalizer, Jiang Li, Dongdong Li, Jaber A. Khoja, Qilian Liang, Michael T. Manry and Vasant K. Prabhu, Department of Electrical Engineering, 2003 IEEE.*

\* cited by examiner

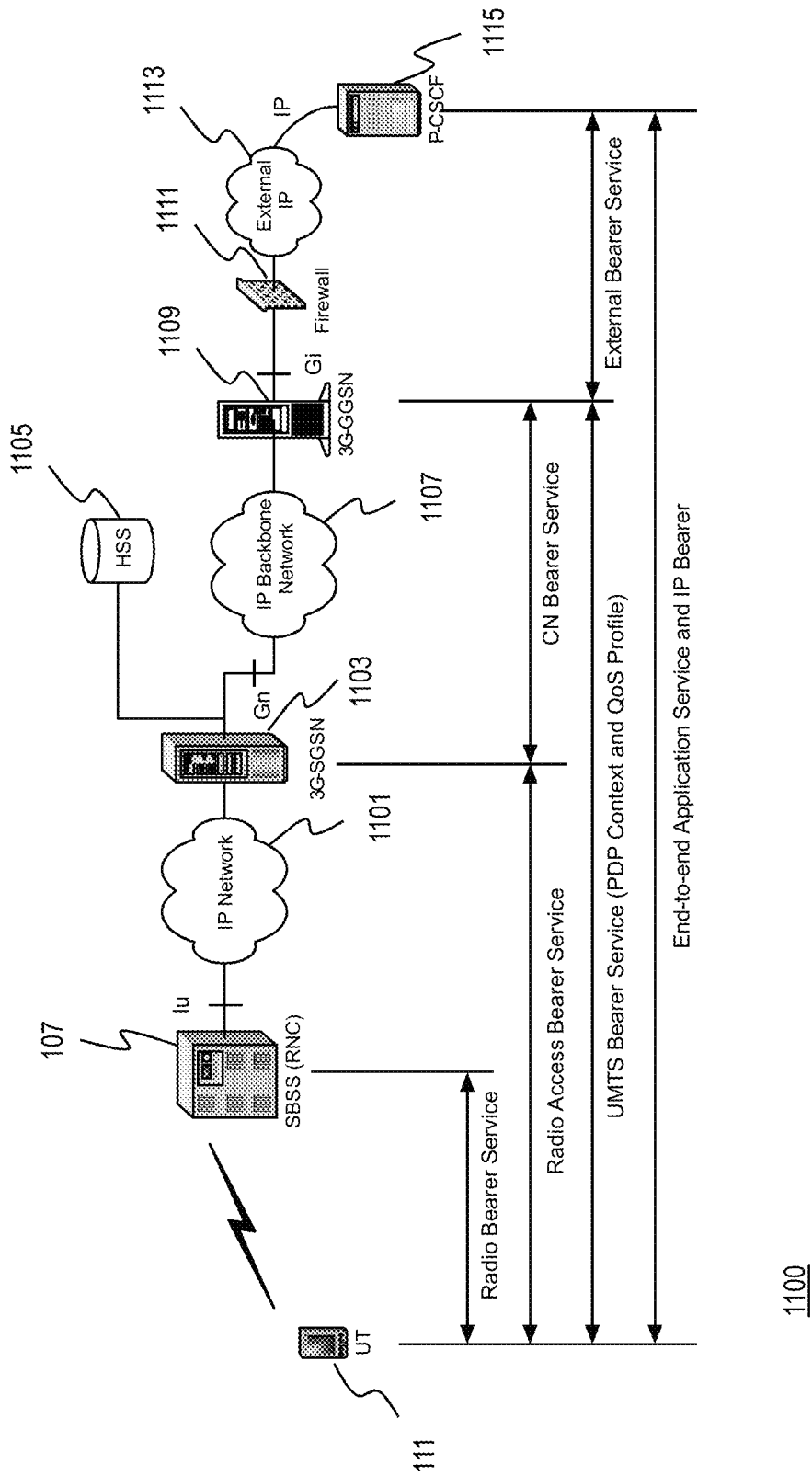

- UT1 MAC ID
- Payload for UT1
- UT2 MAC ID
- Payload for UT2
- UT3 MAC ID
- Payload for UT3

- UT1 Flow ID1
- Payload for Flow1
- UT1 Flow ID2
- Payload for Flow2
- UT1 Flow ID3
- Payload for Flow3

FIG. 54

5 ms (585 symbols)

| G | PUI | UW | PUI | UW | UL MAP | No Trans-mission | UW | No Transmission | G |
|---|---|---|---|---|---|---|---|---|---|
| 2.5 | 20 | 25 | 24 | 5 | 64 | 80 | 14 | 335 | 2.5 |

FIG. 55

10 ms duration: 468 π/4 QPSK Symbols

| G | UW | PUI | UW | No Trans-mission | No Trans-mission | No Transmission | G |
|---|---|---|---|---|---|---|---|
| 2.5 | 9 | 40 | 9 | 195 | 8 | 194 | 2.5 |

FIG. 56

10 ms duration: 234 π/4 QPSK Symbols

| G | UW | PUI | No Trans-mission | UW | No Transmission | No Trans-mission | G |
|---|---|---|---|---|---|---|---|
| 2.5 | 7 | 24 | 80 | 8 | 103 | 7 | 2.5 |

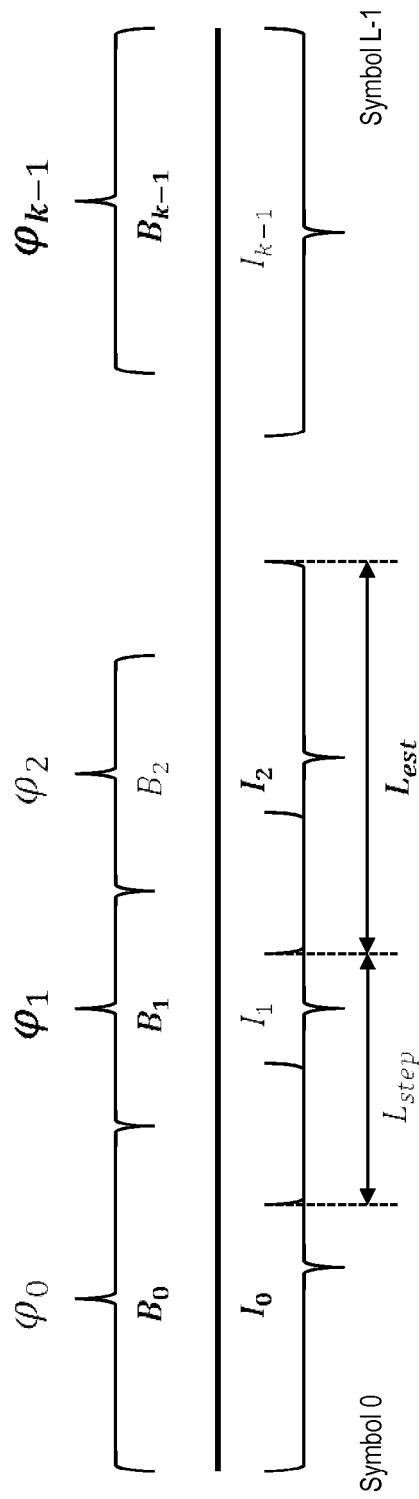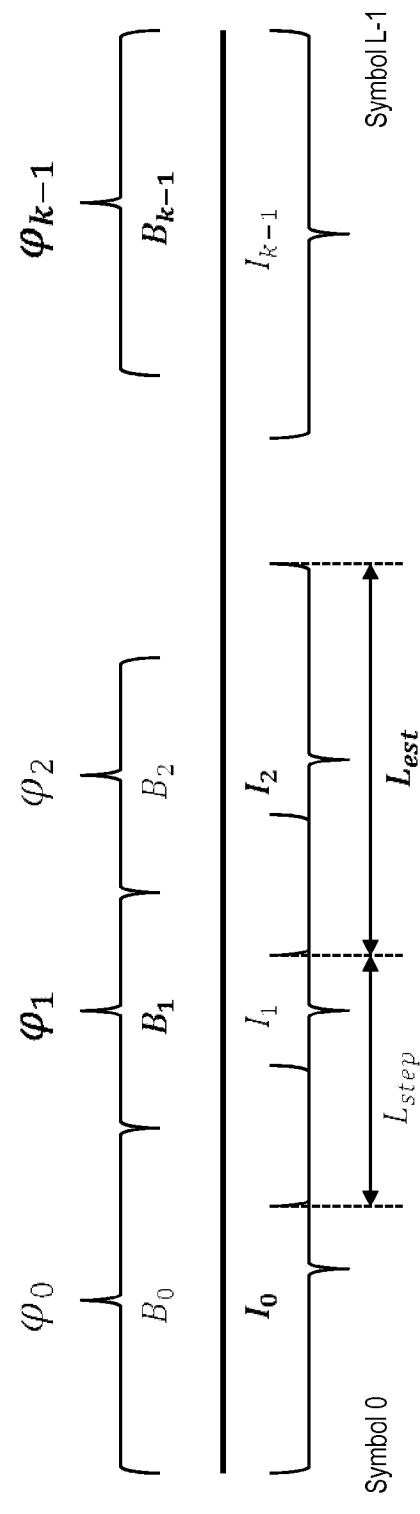

METHOD AND SYSTEM OF PROVIDING EFFICIENT PACKETIZED VOICE COMMUNCATIONS AND DATA BEARERS IN MOBILE SATELLITE SYSTEMS

CROSS-REFERENCE TO RELATED APPLICATIONS

This application is a continuation of U.S. patent application Ser. No. 12/626,511 filed on Nov. 25, 2009, which is related to and claims the benefit of priority under 35 U.S.C. §119(e) to U.S. Provisional Application Ser. No. 61/118,155 filed Nov. 26, 2008; the entirety of which is incorporated herein by reference.

BACKGROUND

Terrestrial communication systems continue to provide higher and higher speed multimedia (e.g., voice, data, video, images, etc.) services to end-users. Such services (e.g., Third Generation (3G) services) can also accommodate differentiated quality of service (QoS) across various applications. To facilitate this, terrestrial architectures are moving towards an end-to-end all-Internet Protocol (IP) architecture that unifies all services, including voice, over the IP bearer. In parallel, mobile satellite systems are being designed to complement and/or co-exist with terrestrial coverage depending on spectrum sharing rules and operator choice. With the advances in processing power of desktop computers, the average user has grown accustomed to sophisticated applications (e.g., streaming video, radio broadcasts, video games, etc.), which place tremendous strain on network resources. The Web as well as other Internet services rely on protocols and networking architectures that offer great flexibility and robustness; however, such infrastructure may be inefficient in transporting Web traffic, which can result in large user response time, particularly if the traffic has to traverse an intermediary network with a relatively large latency (e.g., a satellite network). To promote greater adoption of data communication services, the telecommunication industry, from manufacturers to service providers, has agreed at great expense and effort to develop standards for communication protocols that underlie the various services and features.

Satellite systems possess unique design challenges over terrestrial systems. That is, mobile satellite systems have different attributes that make terrestrial designs either not applicable or inefficient for satellite systems. For example, satellite systems are characterized by long delays (as long as 260 ms one-way) between a user-terminal device and a base-station compared to the relatively shorter delays (e.g., millisecond or less) in terrestrial cellular systems—this implies that protocols on the satellite links have to be enhanced to minimize impact of long propagation delays. Additionally, satellite links typically have smaller link margins than terrestrial links for a given user-terminal power amplifier and antenna characteristics; this implies that higher spectral efficiency and power efficiency are needed in satellite links.

Some Exemplary Embodiments

Therefore, there is a need for an approach for providing efficient use of spectral resources of a satellite system when operating with terrestrial systems.

According to certain embodiments, a broadband satellite communications system comprises forward error correction (FEC) encoder/decoder, interleaver/deinterleaver, puncturing/de-puncturing, scrambler/descrambler, bit to symbol mapping/de-mapping devices, modulator/demodulator, transmit and receive filter; operating in a time-division multiple access (TDMA) system where information is sent in a burst-by-burst fashion during the assigned time slot; supporting diverse traffic types such as voice over internet protocol (VOIP), control messages (DACCH) and keep alive burst (KAB) during silence period and multiple data rates.

In one embodiment, a receiver structure includes timing estimation and tracking, frequency estimation and tracking, phase estimation, amplitude correction and scaling.

In another embodiment, an approach is provided for inserting signature sequence of bits or unique words into the burst structure that is unique for each type of traffic and data rate.

In another embodiment, an approach is provided for uses different protection levels for perceptually important and perceptually unimportant bits received from the vocoder. The encoded important and unimportant bits along with said unique words (signature sequence) are further segmented and rearranged before placing into the burst structure to combat channel-induced fading.

In another embodiment, an approach is provided for identifying each burst (traffic type and data rate) based on the said unique words that uniquely corresponds to this burst. The burst classification is performed at the physical layer without any assistance from the upper layers.

In another embodiment, an approach is provided for successfully handling both initial acquisition and steady-state tracking of timing and frequency parameters.

In another embodiment, an approach is provided for using first-order loops to implement timing and frequency tracking.

In another embodiment, an approach is provided for supporting both polarization diversity and satellite diversity.

In another embodiment, an approach is provided for supporting the burst classification and decoding that utilizes diversity receptions wherein maximal ratio combining (MRC) is used as a method to implement diversity output.

In another embodiment, an approach is provided for using a signal-to-noise ratio (SNR) measurement method on diversity output that sets the metric for power control algorithms.

In another embodiment, an approach is provided for successfully handling outage conditions when the receiver is temporally shadowed by large physical structures e.g., buildings. The receiver controls the said timing and frequency tracking loops so that transitions between non-outage and outage and vice-versa are performed efficiently.

In another embodiment, an approach is provided for scaling estimated bits in accordance with signal strength and said SNR values.

In another embodiment, an approach is provided for generating soft decision bits in accordance with a quantization having at least eight bits.

In another embodiment, an approach is provided for reducing overhead for upper layers paving the way for zero-byte header compression.

In another embodiment, an approach is provided for using tail-biting decoding using said Viterbi decoder with optimum repetition length.

In another embodiment, an approach is provided for using a convolutional encoder to implement FEC and the receiver structure comprises Viterbi decoders.

In another embodiment, an approach is provided for accommodating control bits comprising power control bits and link quality indicator bits.

In another embodiment, an approach is provided for protecting said perceptually important bits and said control bits using cyclic-redundancy-check (CRC) codes.

In another embodiment, an approach is provided for increasing effective code rate by using puncturing bits at the transmitter and de-puncturing corresponding bits at the said receiver.

In another embodiment, an approach is provided for supporting variable coding rates of 4.0 kbps and 2.45 kbps of user information over a time frame of 40 msec.

In another embodiment, an approach is provided for supporting variable burst length of 5 msec, 10 mesec, and 13.333 msec of time duration.

In another embodiment, an approach is provided for successfully operating at a very low signal to noise ratio (SNR).

In another embodiment, an approach is provided for supporting Packet Data Channel (PDCH) with multiple data rates. PDCH can be classified as either a Packet Common Control Channel (PCCCH), Packet Associated Control Channel (PACCH), or as a Packet Data Traffic Channel (PDTCH). Such a system comprises of forward error correction (FEC) encoder/decoder, interleaver/deinterleaver, scrambler/descrambler, bit-to-symbol mapping/demapping, modulator/demodulator and transmit and receive filter. Time-division multiple access is employed where information is sent in a burst-by-burst fashion during the assigned slot for transmission.

In another embodiment, an approach is provided for providing a receiver structure that includes symbol timing estimation and correction, burst timing estimation and correction, burst detection, frequency estimation and correction, phase estimation and correction, amplitude estimation and correction, signal-to-noise ratio (SNR) estimation and soft bit generation and scaling.

In another embodiment, an approach is provided for inserting signature sequence of bits that is unique for each type of traffic and data rate. They are referred to as Unique Words (UW's) and they assist in burst synchronization such as timing, phase, and frequency estimation.

In another embodiment, an approach is provided for using a public user information (PUI) field in each burst which carries the keep-alive burst indicator (downlink only), and link adaptation control message (uplink only), burst modulation and coding information, and access permission to the uplink timeslots associated with the downlink timeslots where the burst is received.

In another embodiment, an approach is provided for using an optional Uplink MAP (ULMAP) field in the downlink which provides the user terminals with the uplink transmission opportunities/resource.

In another embodiment, an approach is provided for supporting 2-path and 4-path diversity receptions.

In another embodiment, an approach is provided for generating efficient channel state information (CSI) for use in Turbo coded receiver operating in fast fading channels.

In another embodiment, an approach is provided for using scales estimated bits in accordance with estimated CSI and estimated SNR.

In another embodiment, an approach provides two stage phase estimation can be employed where in the tentative symbol decisions obtained by phase estimates obtained from UW's in first stage is used for block phase estimation in second stage.

In another embodiment, an approach is provided for generating soft decision bits in accordance with a quantization that is dependent on the FEC employed for the particular burst field. For fields that are encoded by convolutional codes or Golay codes 8 bit quantization is employed, whereas when Turbo codes are used, 6 bit quantization is employed.

In another embodiment, an approach is provided for supporting variable transmission rates from 23.4 ksps to 234 ksps and supports variable burst length of 5 ms, 10 ms and 20 ms.

In another embodiment, an approach is provided for supporting transmission rate of 23.4 ksps, using a tail-biting convolutional encoder and a receiver that comprises of a Viterbi decoder.

In another embodiment, an approach is provided for supporting transmission rate greater than 23 ksps comprises of a Turbo encoder and a receiver that comprises a Turbo decoder.

In another embodiment, an approach is provided for increasing effective code rate by puncturing encoded bits at the transmitter and de-puncturing corresponding bits at the receiver.

In another embodiment, an approach is provided for successfully operating at a very low signal to noise ratio (SNR).

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the FIG.s of the accompanying drawings.

Figure 1A:
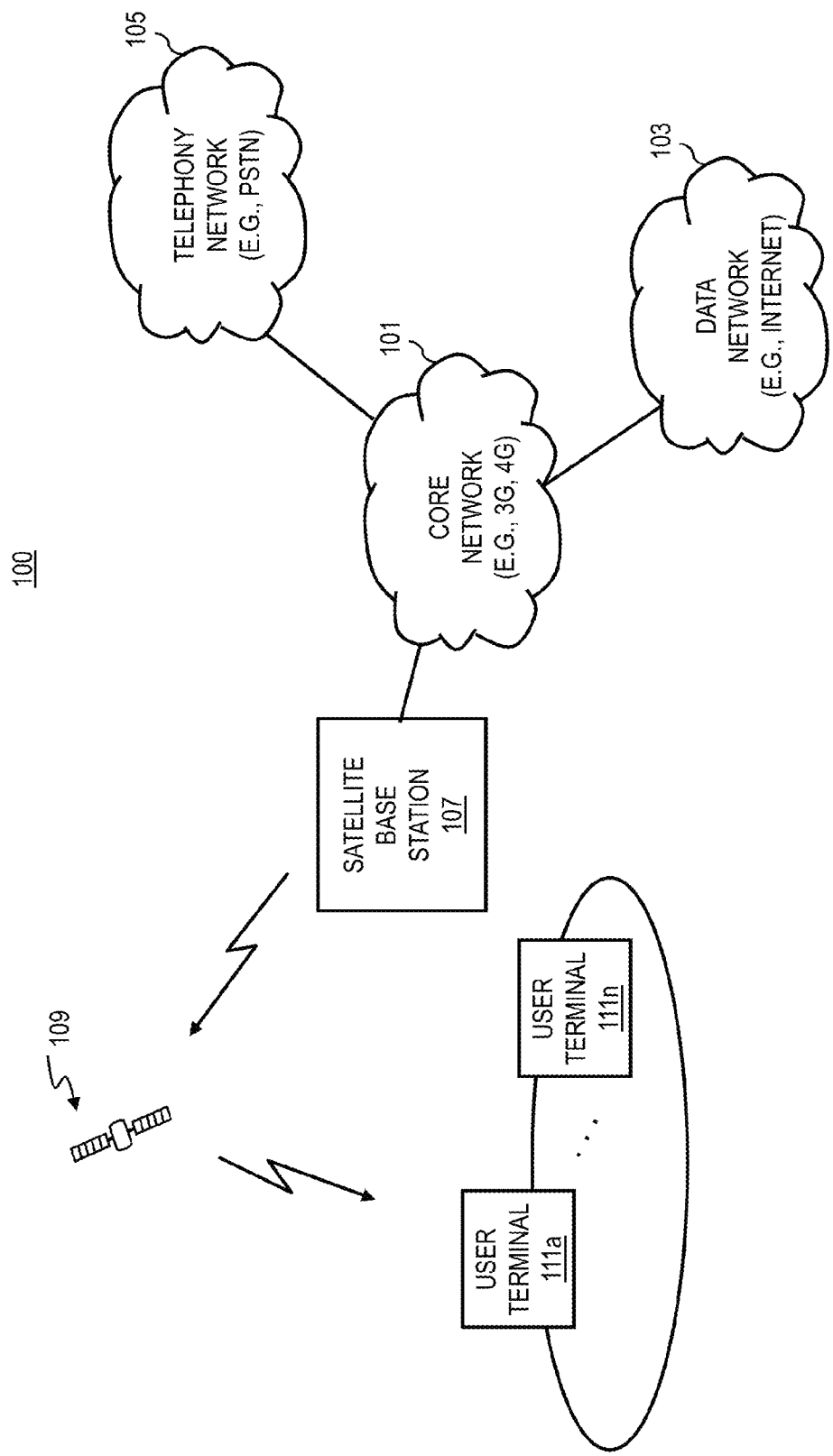
FIGS. 1A and 1B are diagrams of communication systems capable of providing Internet Protocol (IP)-based communication sessions from a terrestrial domain to a satellite domain, according to various exemplary embodiments.
Figure 1B:
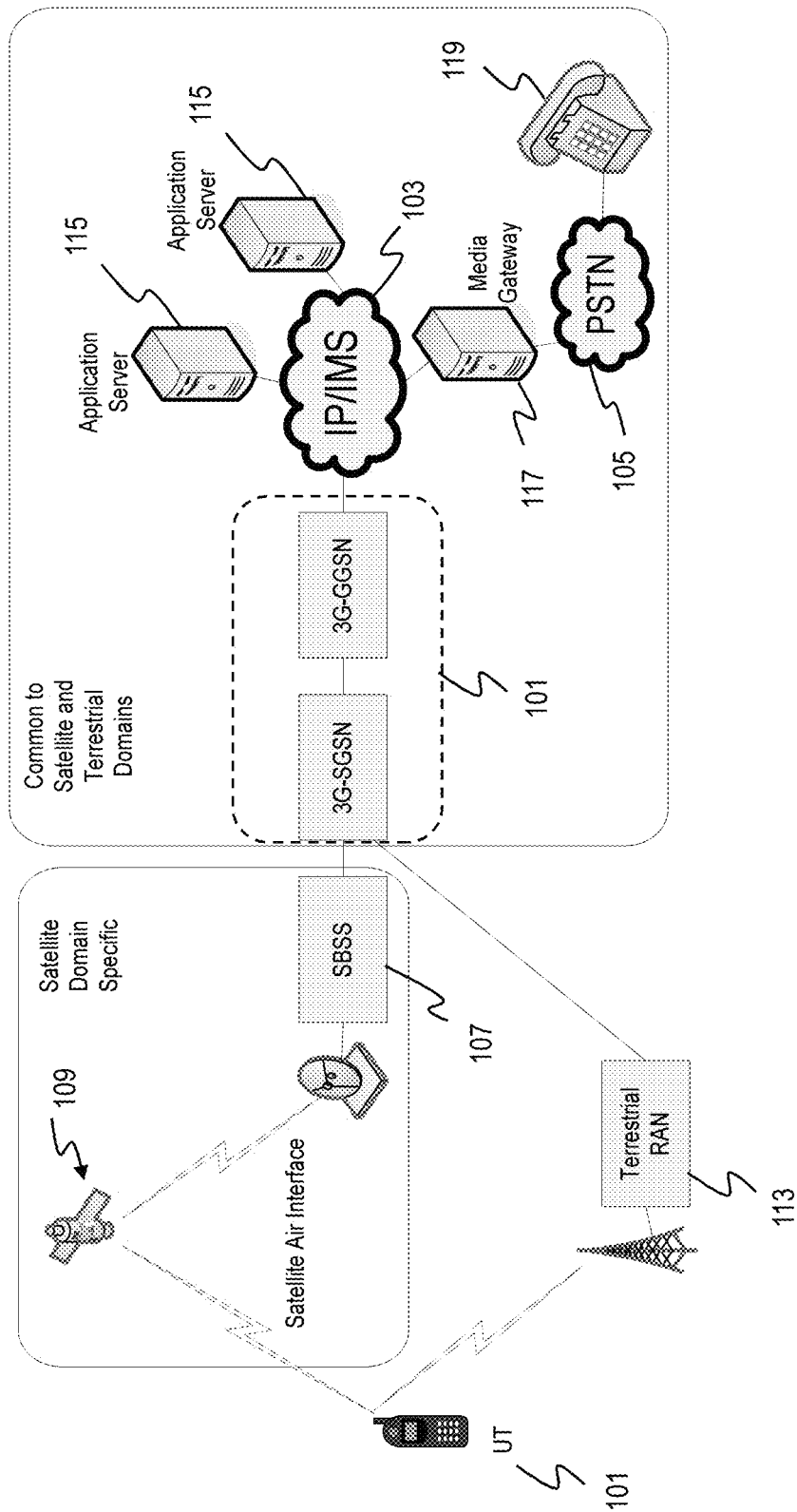
Figure 12:
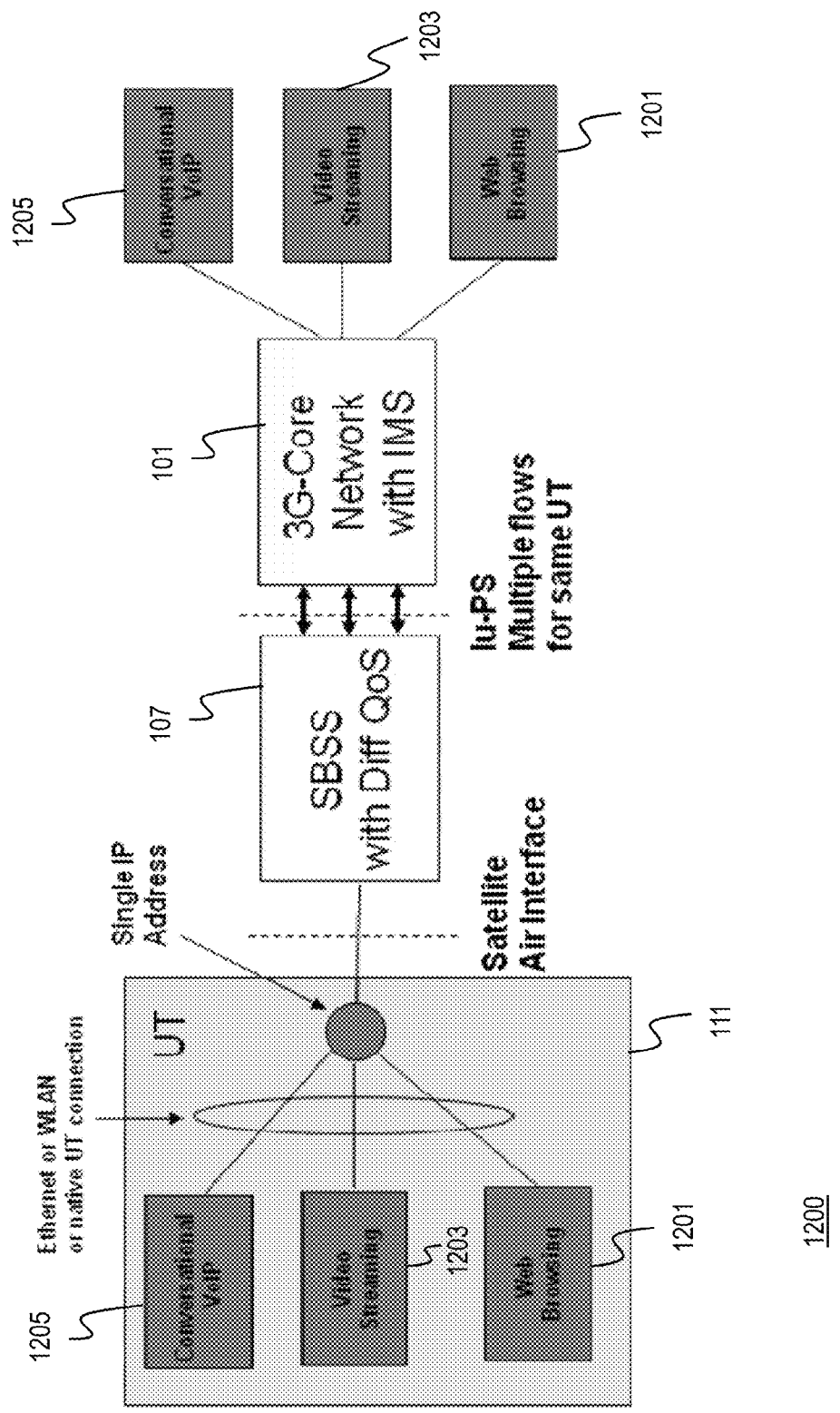
Figure 13:
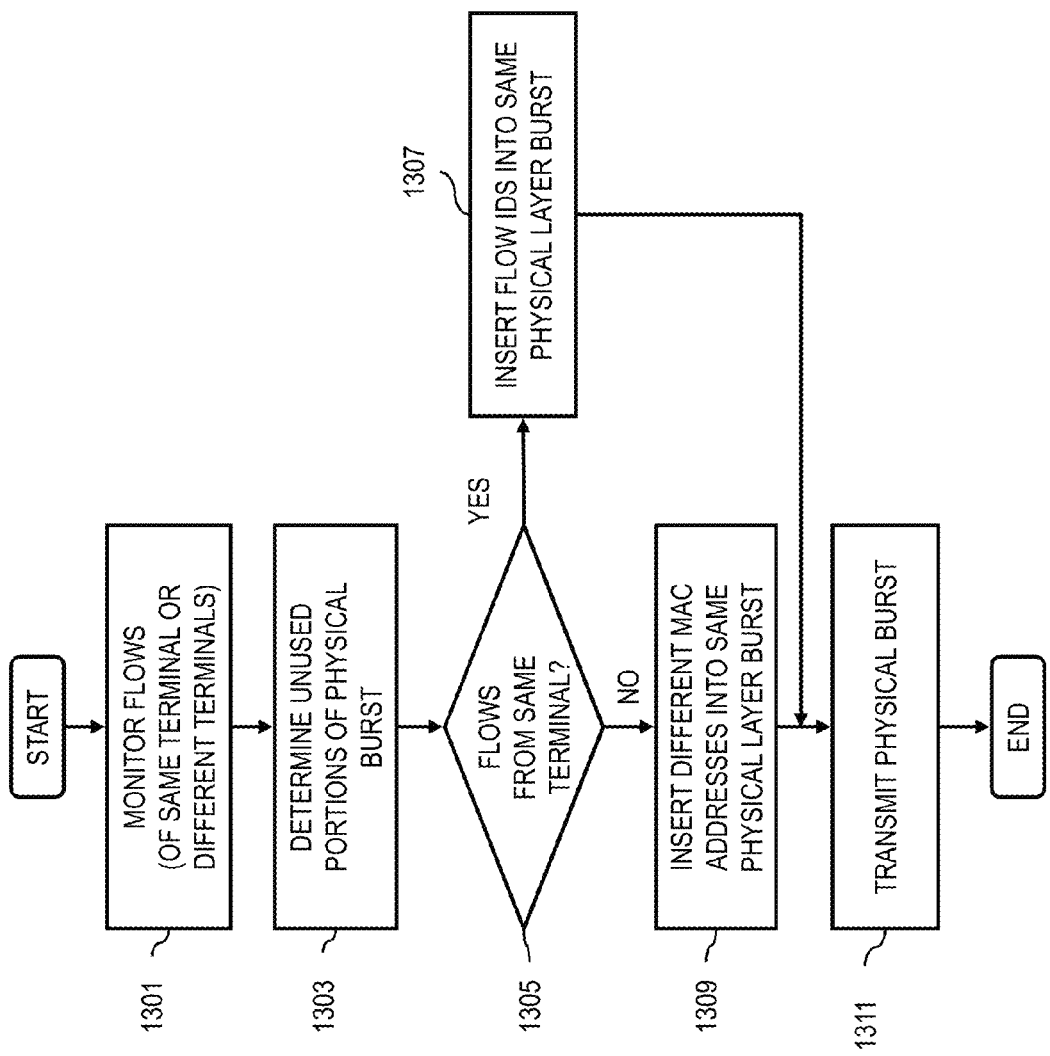
Figure 14C:
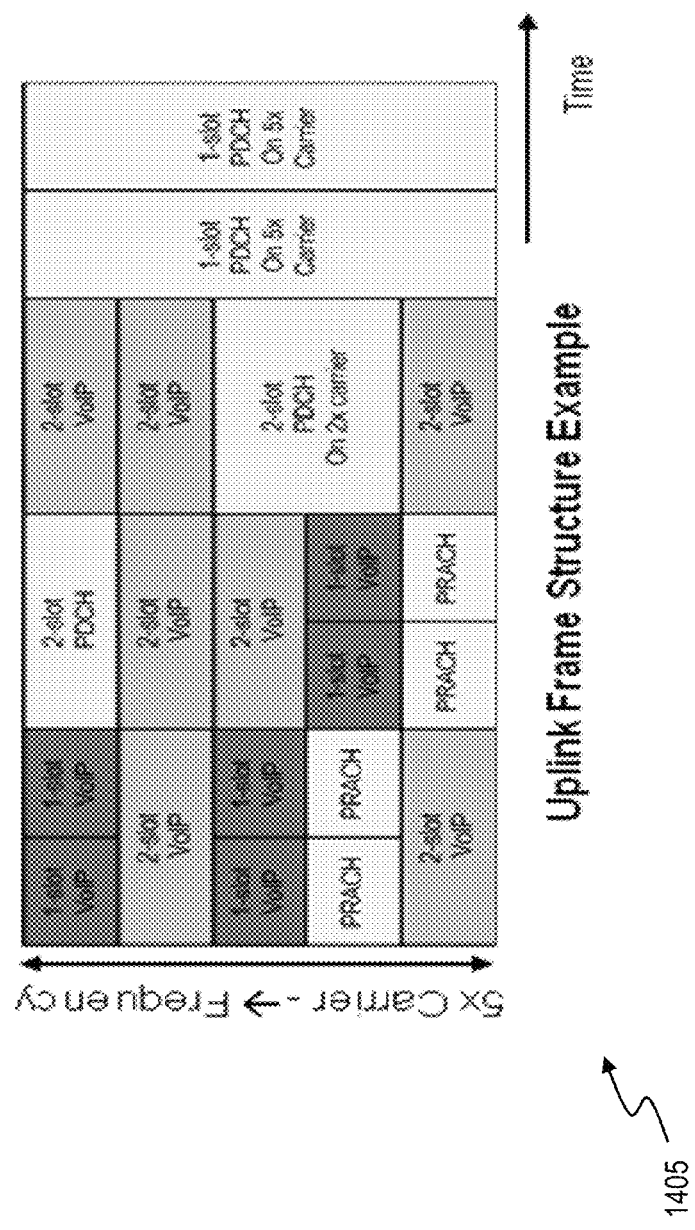
Figure 15:
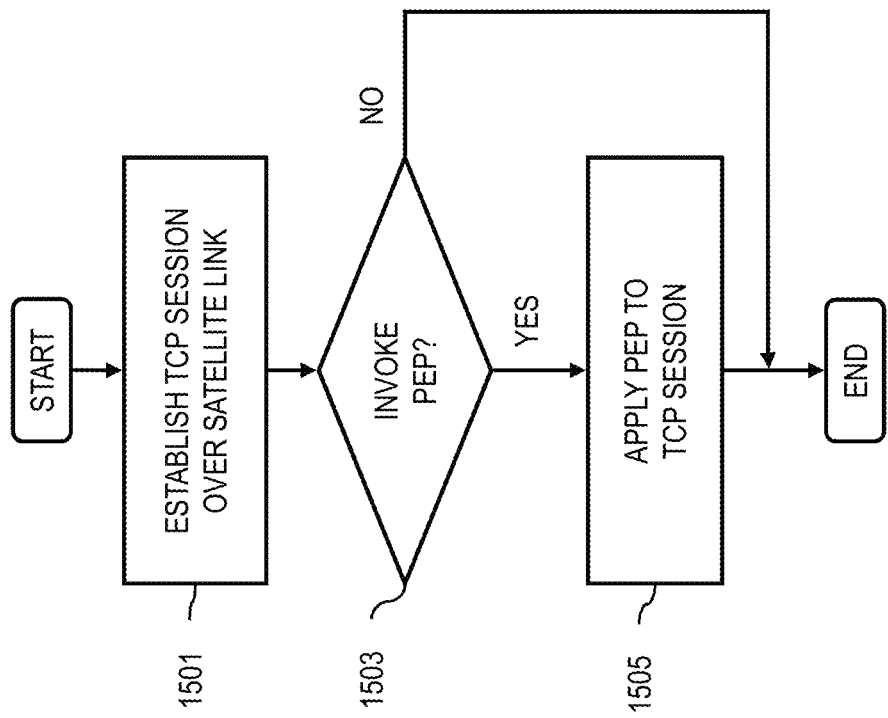
Figure 16:
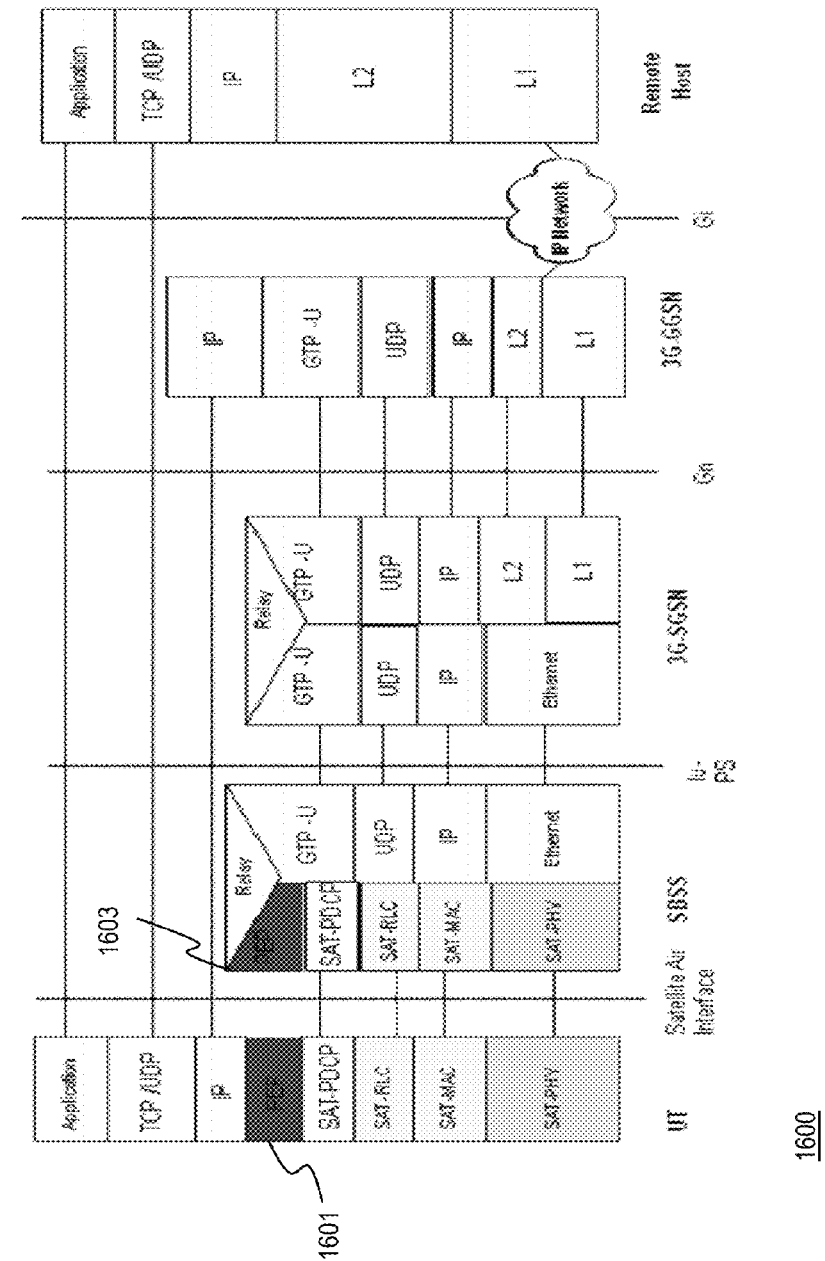
Figure 17:
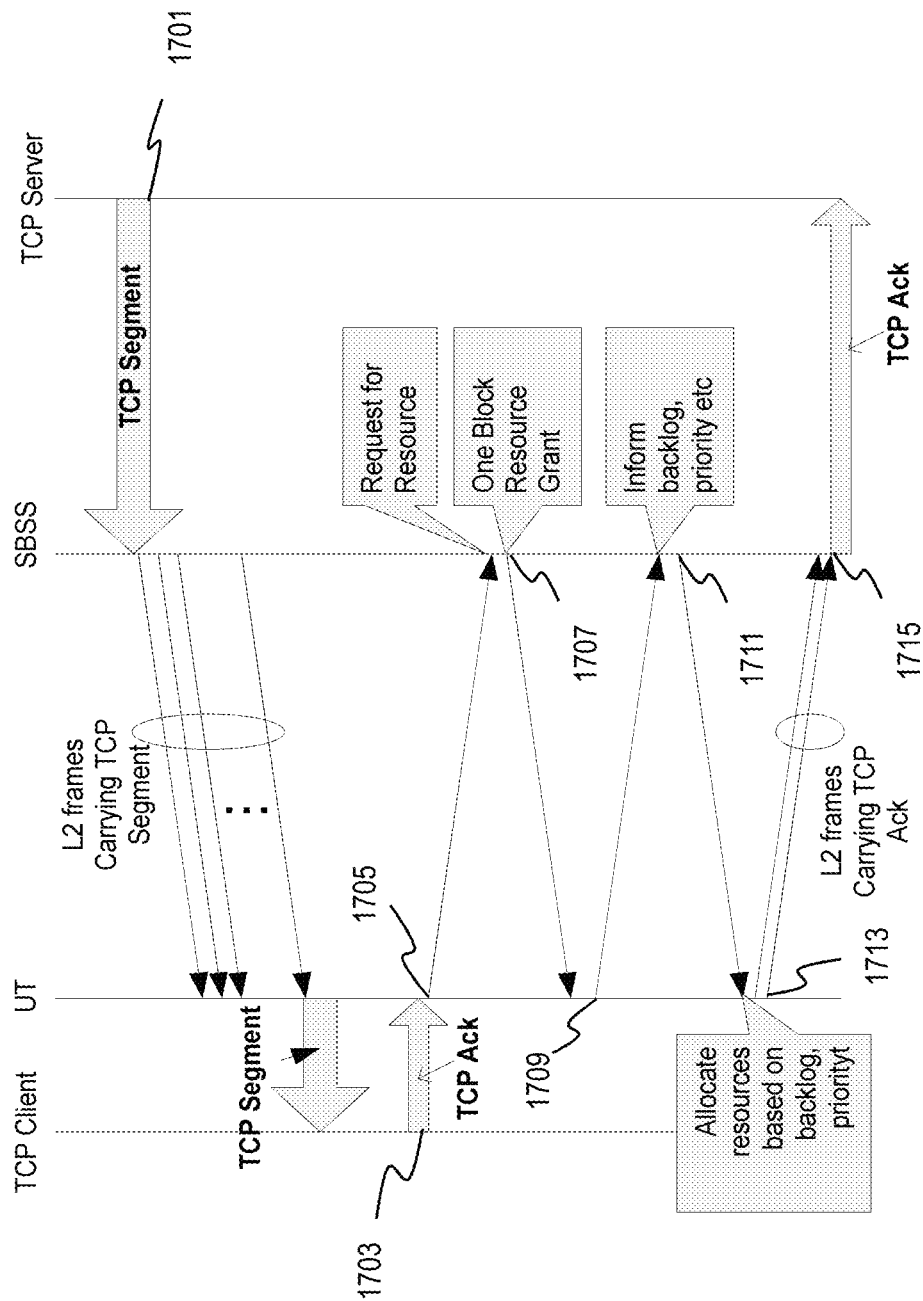
Figure 18:
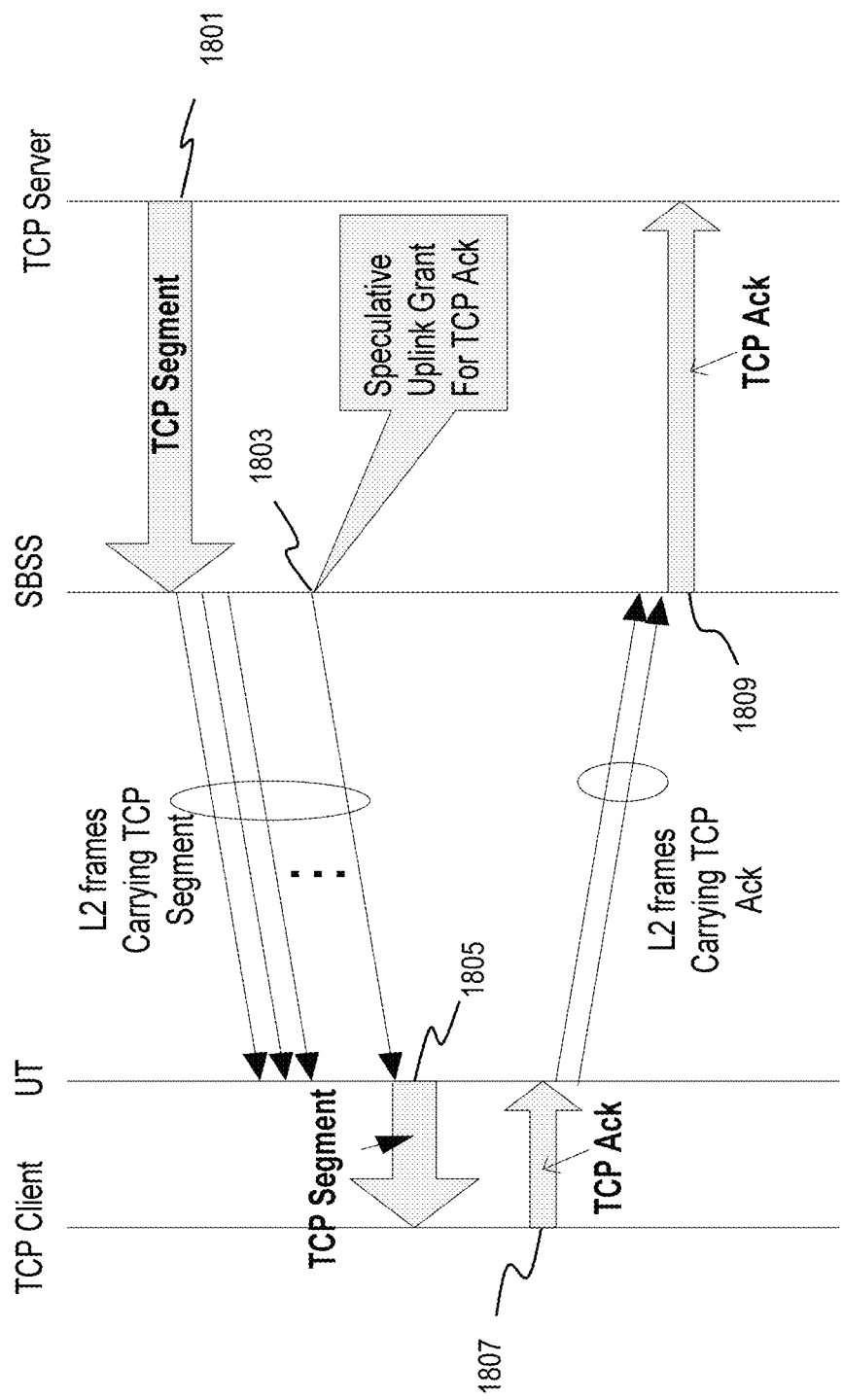
Figure 19:
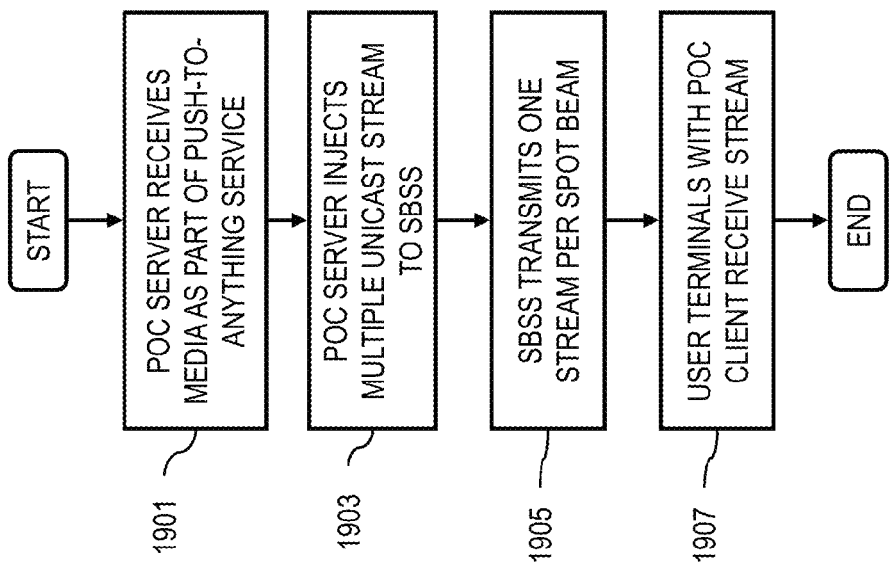
Figure 20:
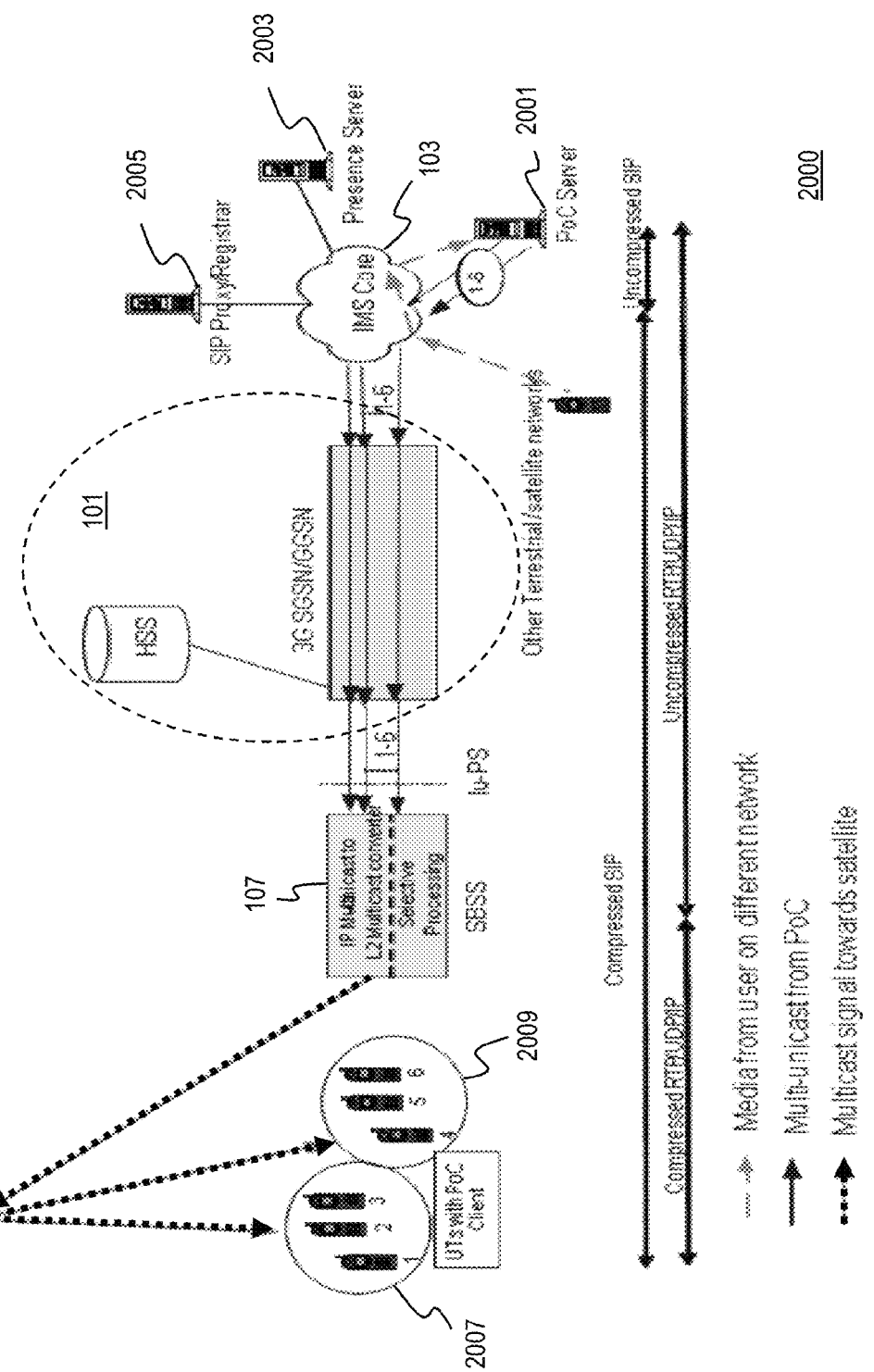
Figure 21:
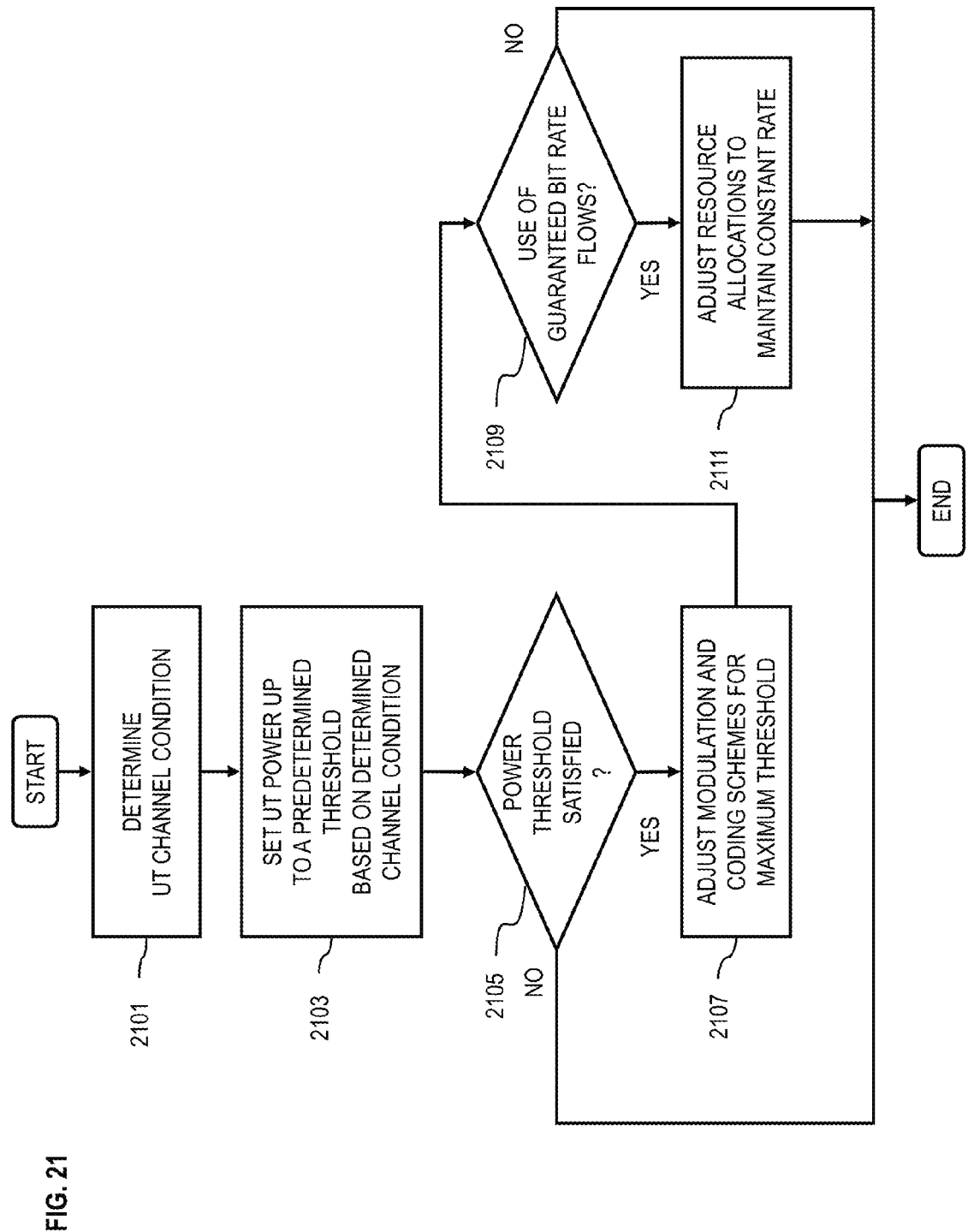
Figure 22:
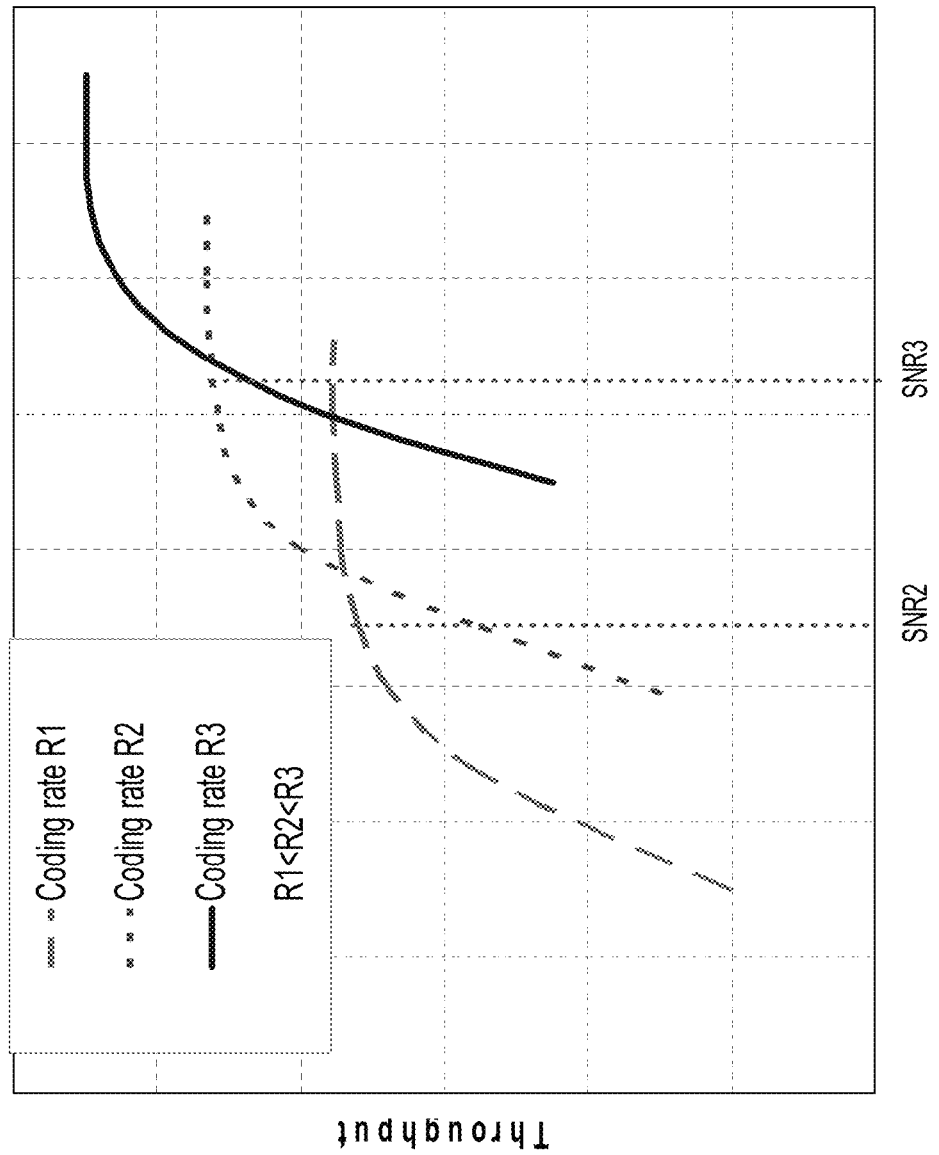
Figure 23:
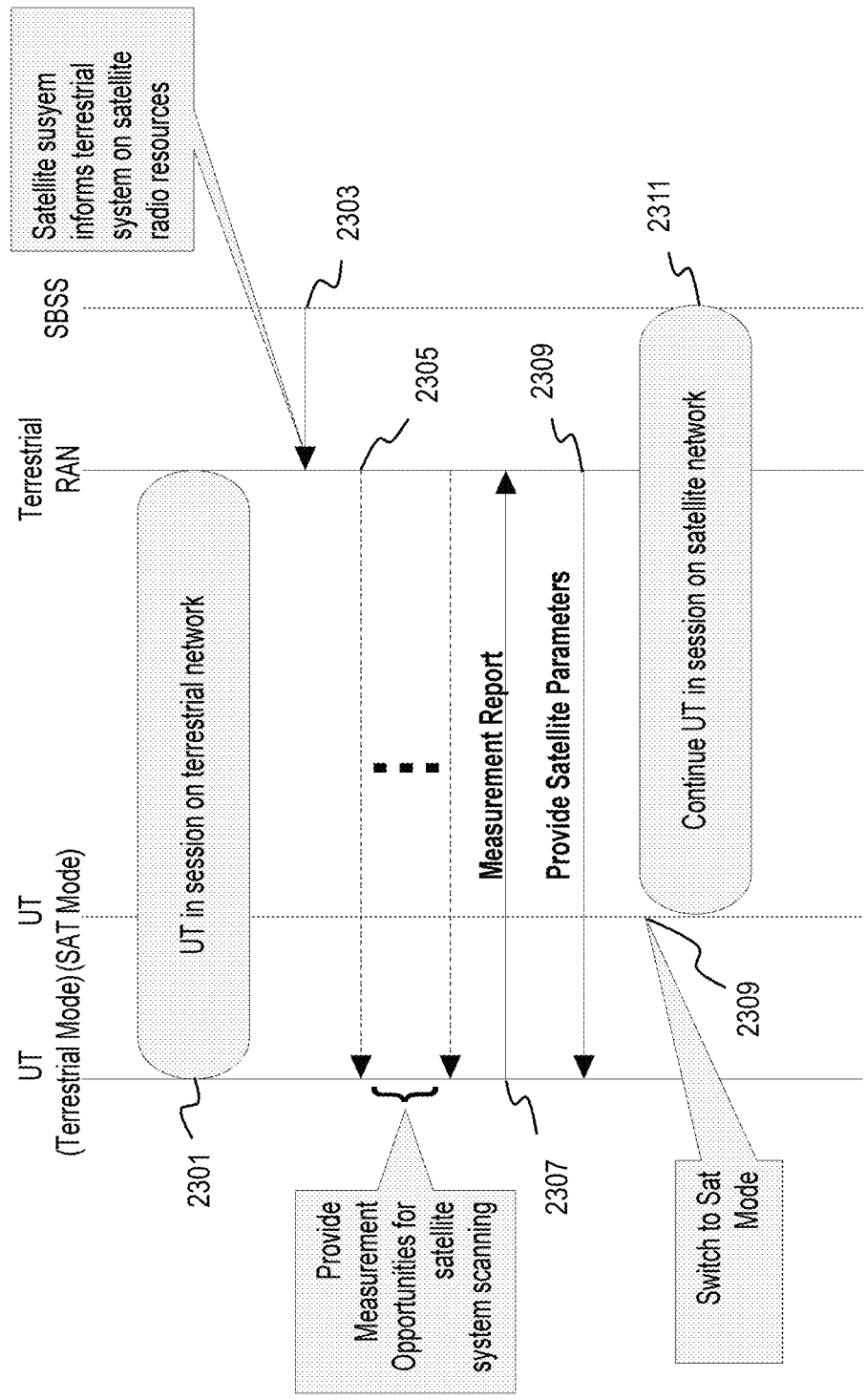
Figure 24:
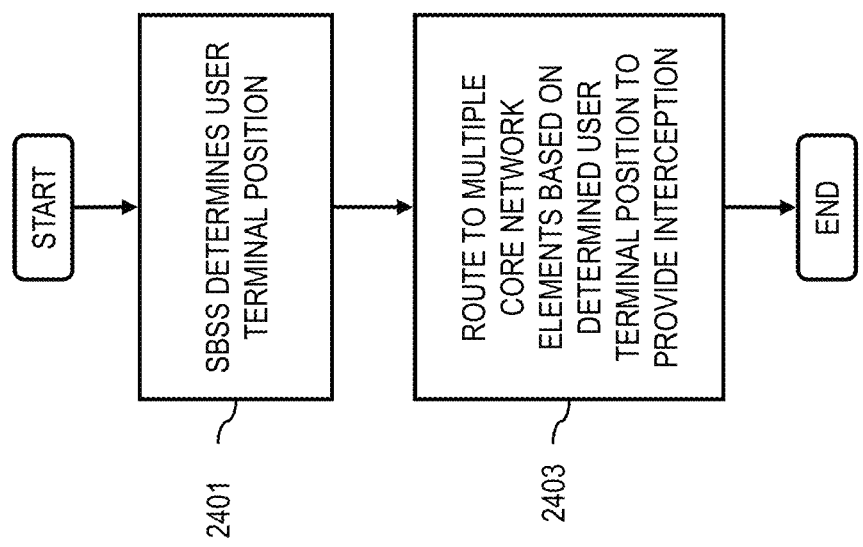
Figure 25:
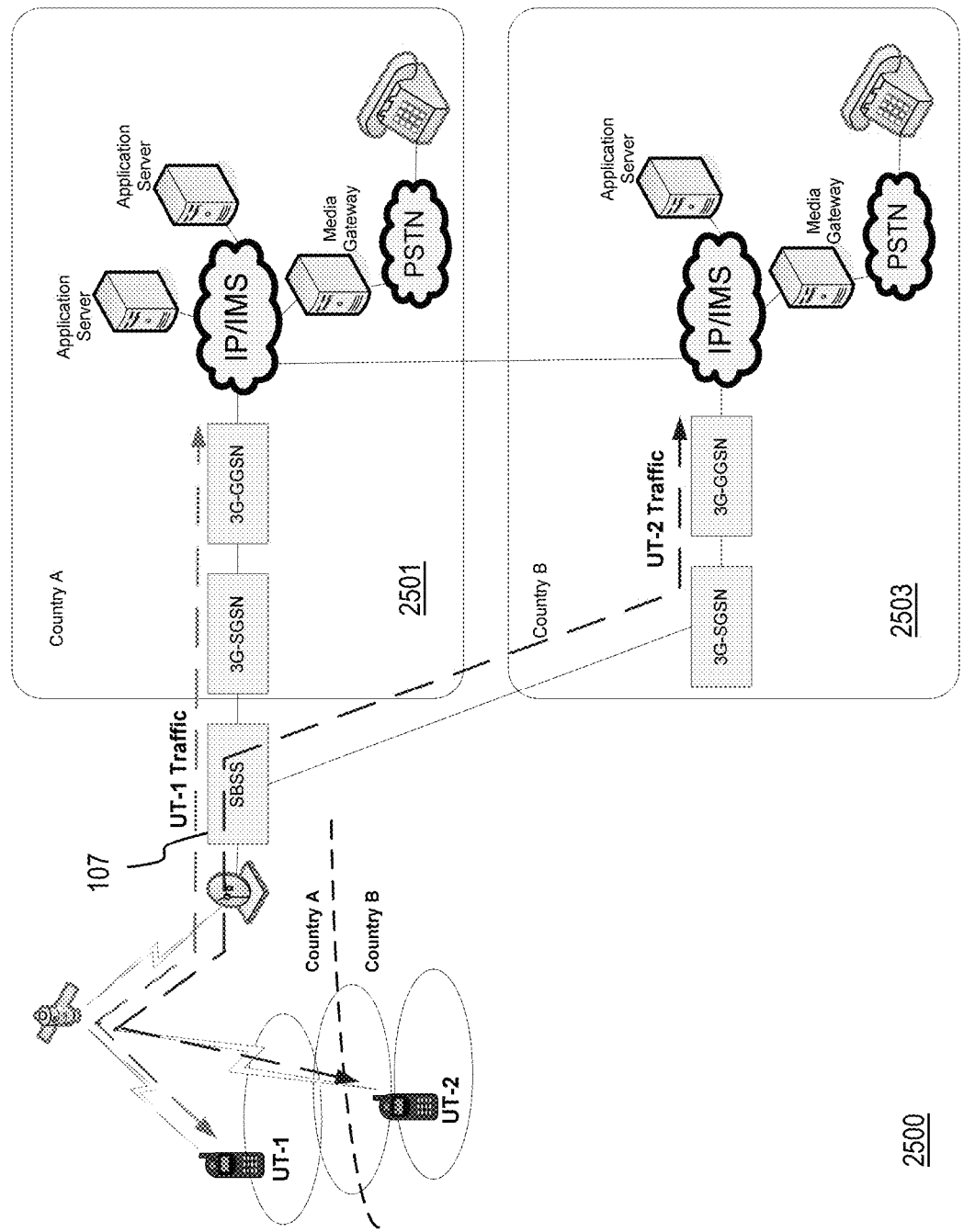
Figure 26:
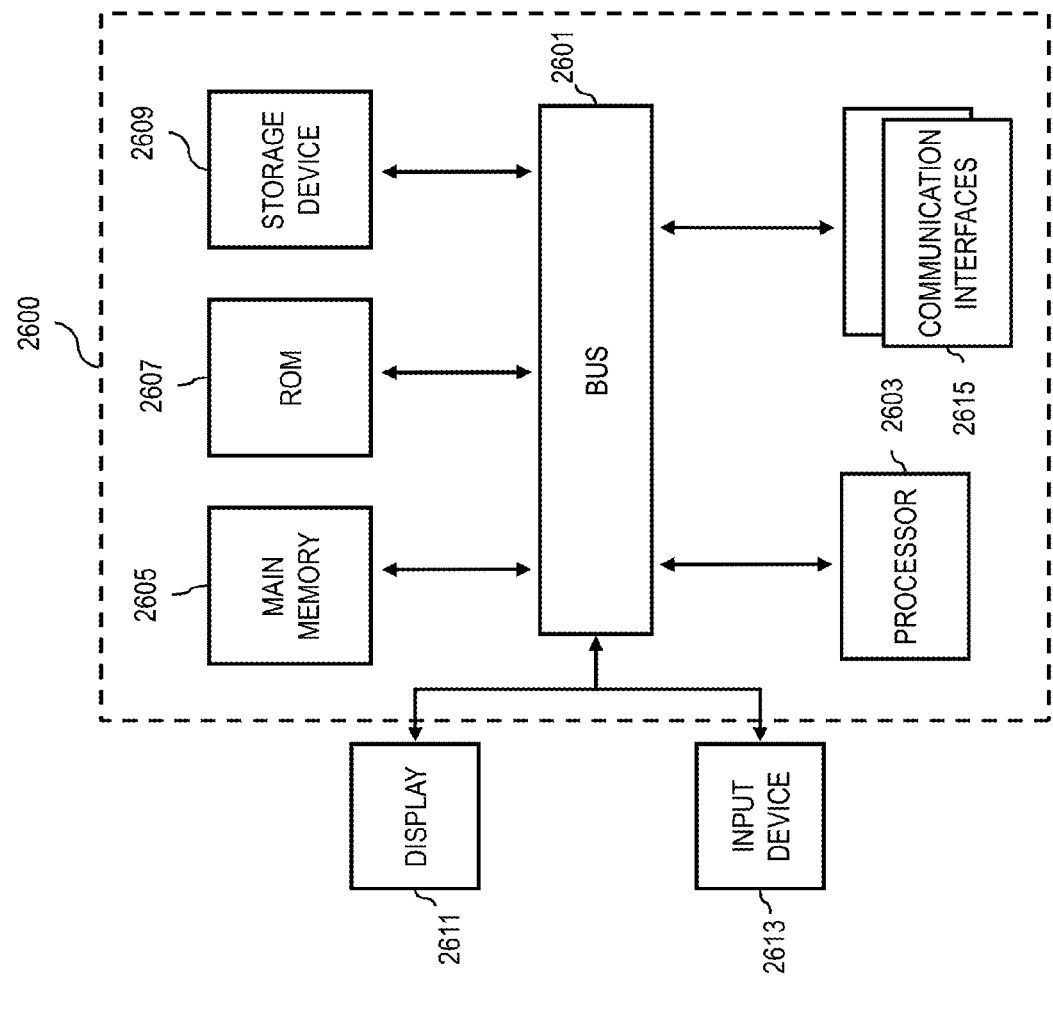
Figure 27:
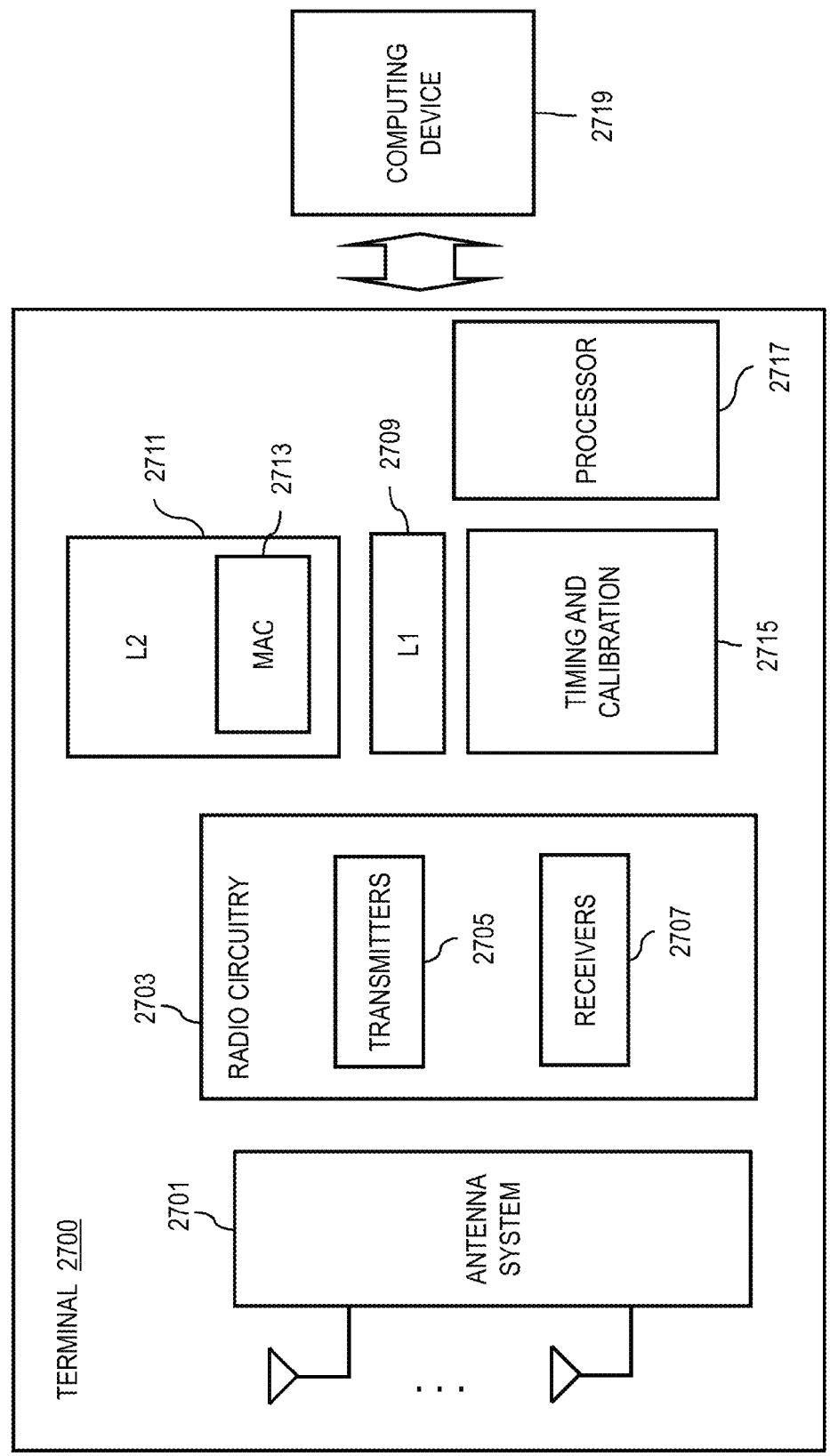
Figures 28, 29:
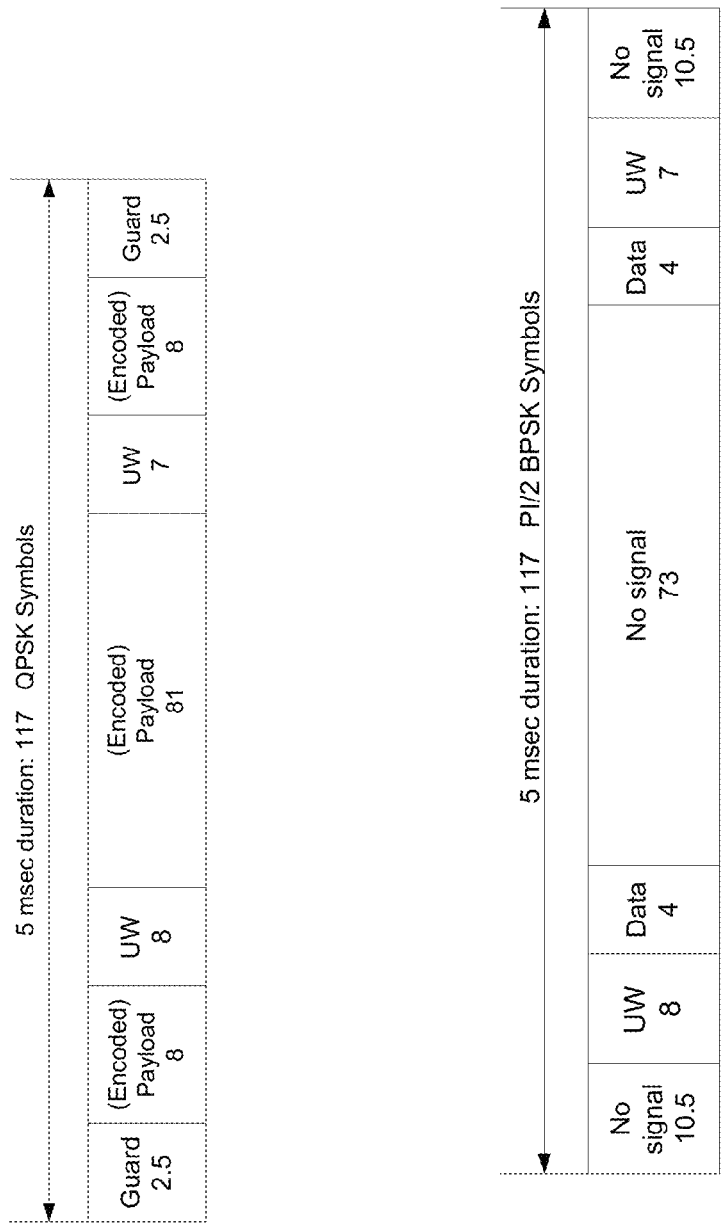

over User Datagram Protocol (UDP) handling, and a ladder diagram of an enhanced process for SIP over UDP handling according to an exemplary embodiment;

FIG. 11 is a diagram of a communication system having a quality of service (QoS) architecture, according to an exemplary embodiment;

FIG. 12 is a diagram of a communication system for supporting multiple simultaneous flows for a user terminal with different QoS requirement, according to an exemplary embodiment;

FIG. 13 is a flowchart of a process for efficiently multiplexing flows, according to various exemplary embodiments;

FIGS. 14A-14C are diagrams of exemplary frame structures for providing multiplexing of multiple flows, according to various exemplary embodiments;

FIG. 15 is a flowchart of a process for utilizing performance enhancing proxy (PEP) functions, according to an exemplary embodiment;

FIG. 16 is a diagram of a protocol architecture including PEP functions, according to an exemplary embodiment;

FIG. 17 is a ladder diagram of a typical Medium Access Control (MAC) protocol exchange over a satellite link;

FIG. 18 is a ladder diagram of a MAC protocol exchange over a satellite link in which delay is reduced, according to an exemplary embodiment;

FIG. 19 is a flowchart of a process for efficiently utilizing resources to provide push-to-anything, according to an exemplary embodiment;

FIG. 20 is a diagram of a communication system capable of providing push-to-anything, according to an exemplary embodiment;

FIG. 21 is a flowchart of a process for providing dynamic link adaptation, according to an exemplary embodiment;

FIG. 22 is a diagram of a graph show performance of a dynamic link adaptation mechanism, according to an exemplary embodiment;

FIG. 23 is a ladder diagram of a handover process between a terrestrial domain and a satellite domain, according to an exemplary embodiment;

FIG. 24 is a flowchart of a process for providing legal interception handling, according to an exemplary embodiment;

FIG. 25 is a diagram of a communication system capable of providing legal interception handling, according to an exemplary embodiment;

FIG. 26 is a diagram of hardware that can be used to implement certain embodiments;

FIG. 27 is a diagram of exemplary components of a user terminal conFIG.d to operate in the systems of FIGS. 1A and 1B, according to an exemplary embodiment;

FIG. 28 is a diagram of a timing flow of the return link power control, according to certain embodiments; and FIGS. 29-61 are diagrams of systems and processes for providing physical layer methods for robust and efficient packetized voice communications and data bearers in mobile satellite systems, according to various embodiments.

DETAILED DESCRIPTION

An apparatus, method, and software for providing a satellite interface to support mobile communication services are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although certain embodiments are discussed with respect to an Internet Protocol (IP)-based architecture, it is recognized by one of ordinary skill in the art that these embodiments have applicability to any type of packet based communication system and equivalent functional capabilities.

FIGS. 1A and 1B are diagrams of communication systems capable of providing Internet Protocol (IP)-based communication sessions from a terrestrial domain to a satellite domain, according to various exemplary embodiments. For the purposes of illustration, a system 100 of FIG. 1A supports multimedia services using an Internet Protocol (IP) architecture, such that end-to-end communication sessions are packetized. By way of example, a terrestrial core network 101 is a wireless core network that is compliant with a Third Generation (3G) or Fourth Generation (4G) architecture; e.g., Third Generation Partnership Project (3GPP)-based. For example, the system 100 can utilize a satellite air interface denoted as GMR-1 3G, which is an evolution of the GMR-1 air interface standards; GMR-1 3G has been submitted to and is currently under consideration for adoption by European Telecommunications Standards Institute (ETSI) and the International Telecommunication Union (ITU). The wireless core network 101 may also have connectivity to a data network 103 and a telephony network 105.

Networks 101, 103, and 105 may be any suitable wireline and/or wireless network. For example, telephony network 105 may include a circuit-switched network, such as the public switched telephone network (PSTN), an integrated services digital network (ISDN), a private branch exchange (PBX), an automotive telematics network, or other like network. Wireless network 101 (e.g., cellular system) may employ various technologies including, for example, code division multiple access (CDMA), enhanced data rates for global evolution (EDGE), general packet radio service (GPRS), global system for mobile communications (GSM), IP multimedia subsystem (IMS), universal mobile telecommunications system (UMTS), etc., as well as any other suitable wireless medium, e.g., microwave access (WiMAX), wireless fidelity (WiFi), satellite, and the like. Moreover, data network 103 may be any local area network (LAN), metropolitan area network (MAN), wide area network (WAN), the Internet, or any other suitable packet-switched network, such as a commercially owned, proprietary packet-switched network having voice over Internet Protocol (VoIP) capabilities, e.g., a proprietary cable or fiber-optic network.

Within the satellite domain, a satellite base station subsystem (SBSS) 107 is introduced that implements the necessary modifications and enhancements for efficient operation over a satellite 109 to one or more user terminals 111a-111n. These terminals 111a-111n can be of various types with different form factors and transmit capabilities; e.g., sleek hand-held terminals, personal digital assistants (PDAs), vehicular terminals, portable terminals, fixed terminals, automotive telematics terminals, etc.

The SBSS 107 communicates with the wireless network 101, which includes a core network (e.g., 3G/4G) that is unchanged from terrestrial core network. This consequently permits operators to reuse existing 3G/4G core network elements. The interface between the SBSS 107 and the 3G/4G core network 101 can be a standard terrestrial interface.

It is also noted that the architecture of the system 100 permits the same core network element to simultaneously communicate with a terrestrial base station (not shown) and the SBSS 107. This capability is illustrated in FIG. 1B. As seen, the system 100 enables handover procedures between terrestrial base-station and the SBSS 107 to be executed via a core network with standard procedures defined in terrestrial systems. In this example, the UT 111 has the capability to communicate over a satellite link or directly communicate with a terrestrial radio access network 113 to the wireless network 101. By way of example, the data network 103 is conFIG.d as an IP/IMS (IP Multimedia Subsystem) with multiple application servers 115 supplying multimedia content. The data network 103 couples to the PSTN 105 via a media gateway 117; the PSTN 105 can serve one or more voice terminals 119.

In the system 100, a radio access bearer (RAB) is associated with Packet Data Protocol (PDP) context maintained between the user terminal (UT) 111 and the core network (CN) 101. For instance, one RAB can be established for Session Initiation Protocol (SIP) call signaling, and be maintained as long as the user wishes to make and receive calls. Another RAB is established on demand for the transport of the voice media while a call is in session. The satellite radio access network establishes and maintains Radio Bearers (RBs) between the UT 111 and the S-BSS 107 necessary to satisfy, for example, Quality of Service (QoS) requirements of the SIP call signaling and Voice over IP (VoIP) user plane RABs. The signaling radio bearer supports signaling connectivity between the UT 101 and the satellite radio access network.

While specific reference will be made thereto, it is contemplated that system 100 may embody many forms and include multiple and/or alternative components and facilities.

Figure 2:
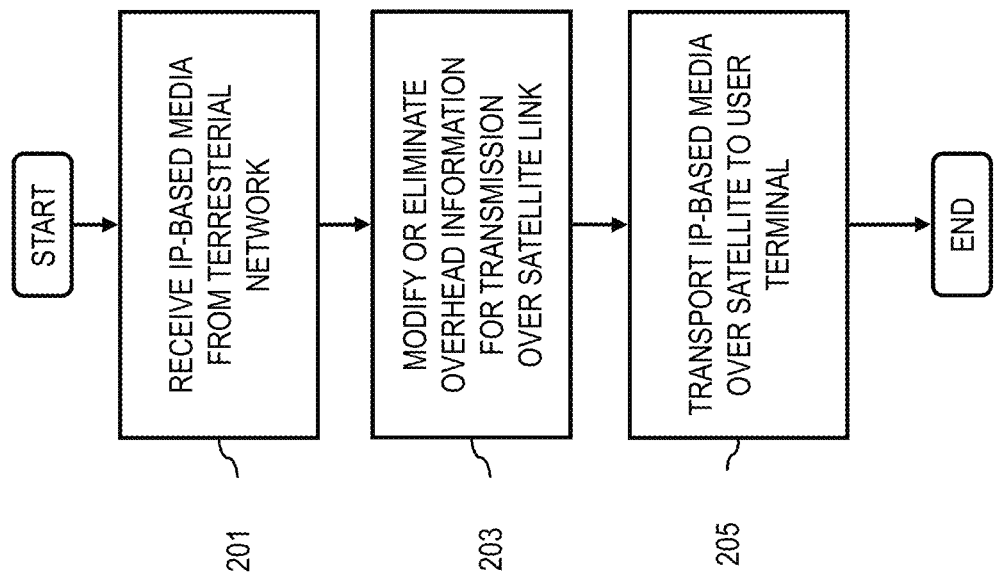
FIG. 2 is a flowchart of a process for providing IP-based communication sessions from a terrestrial network over a satellite link, according to various exemplary embodiments.

FIG. 2 is a flowchart of a process for providing IP-based communication sessions from a terrestrial network over a satellite link, according to various exemplary embodiments. In step 201, IP-based media is received at the SBSS 107 from a terrestrial network (e.g., network 101). The SBSS 107 can then process the media flow to optimize transmission of the IP-based media in terms of, e.g., overhead signaling, delay, or throughput. In step 203, overhead information of the media flow is modified or eliminated altogether for transmission over the satellite link. This processing can occur on a packet-by-packet basis or by segments of packets. Thereafter, the IP-based media is transported over a satellite link to the UT 111, as in step 205.

Figure 3A:
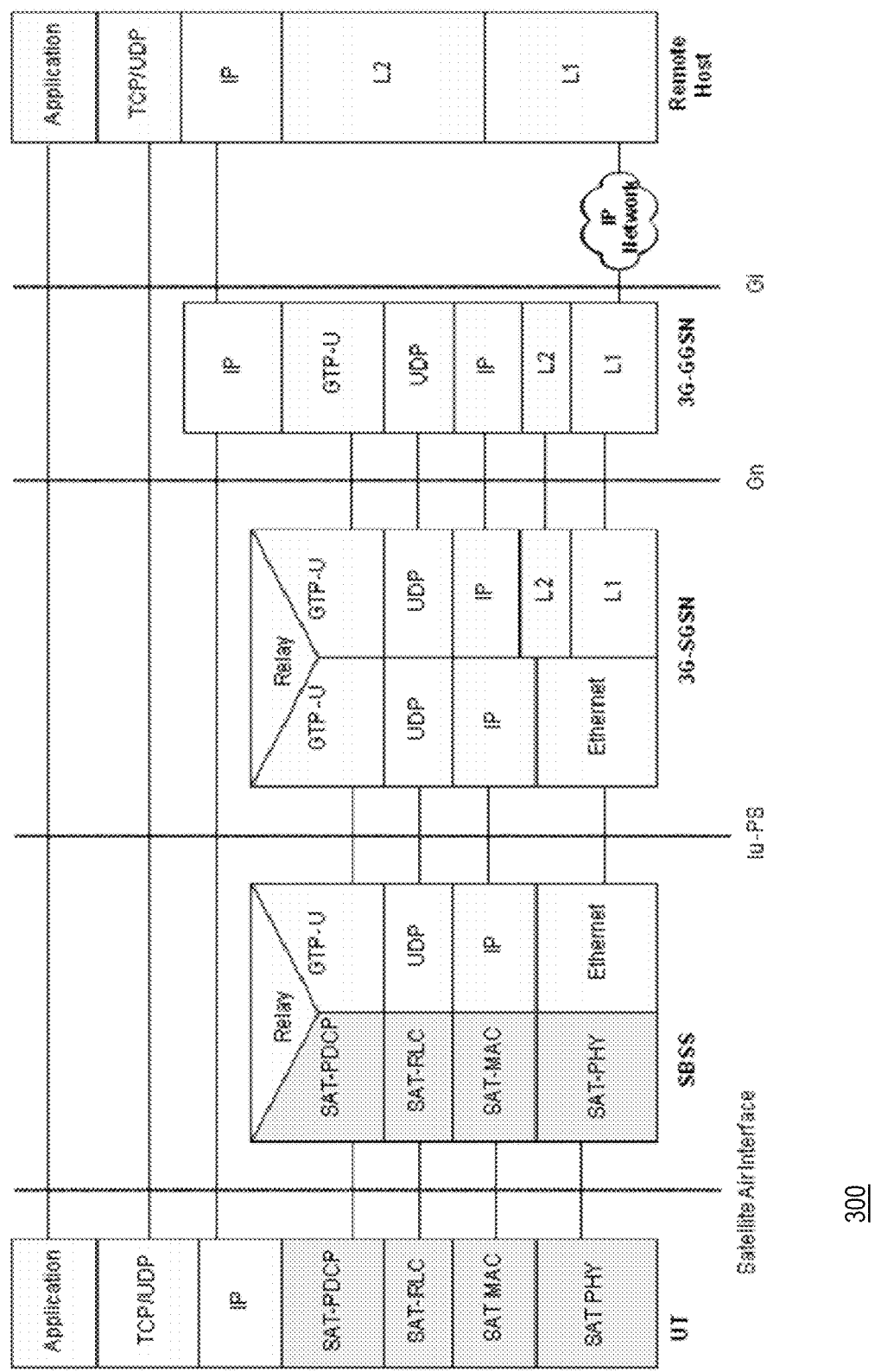
FIGS. 3A and 3B are, respectively, a diagram of a user plane protocol architecture for providing a satellite air interface and a diagram of a system supporting different core network choices, according to various exemplary embodiments.
Figure 3B:
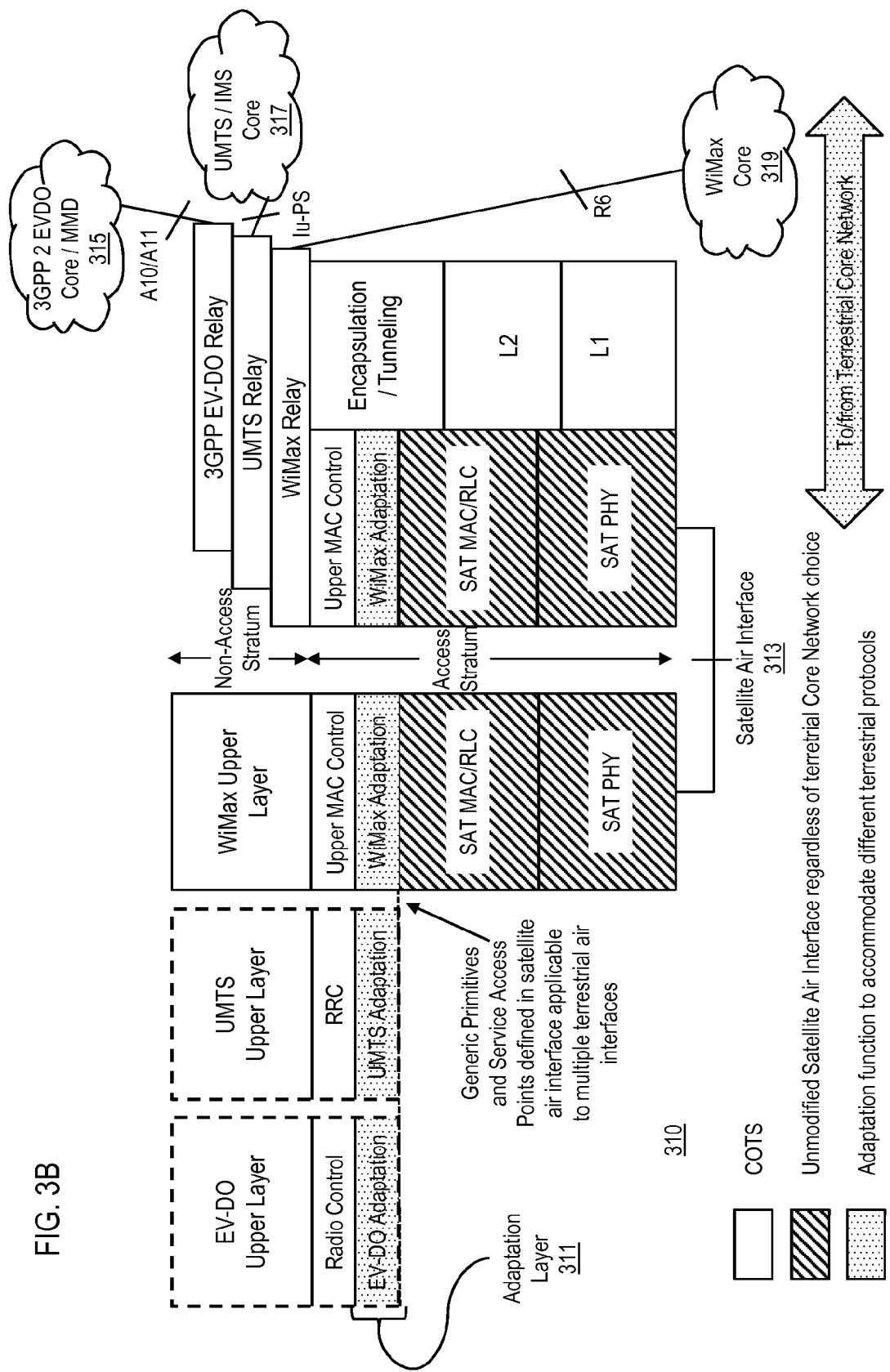

FIGS. 3A and 3B are, respectively, a diagram of a user plane protocol architecture for providing a satellite air interface and a diagram of a system supporting different core network choices, according to various exemplary embodiments. A user plane protocol architecture 300 employs the following higher protocols at the end terminals (e.g., UT and a remote host): an application layer, a TCP/UDP layer, and an IP layer. The UT 111, according to one embodiment, includes the following satellite domain specific protocols to communicate with the SBSS 107: SAT-PDCP (Packet Data Convergence Protocol), SAT-RLC (Radio Link Control), SAT-MAC (Medium Access Control), and SAT-PHY (Physical). To interface with the terrestrial systems, the SBSS 107 provides the following protocols: GTP-U (GPRS Tunneling Protocol—User Plane), UDP (User Datagram Protocol), IP, and Ethernet. On the terrestrial side, the 3G-SGSN (Serving GPRS Support Node) utilizes GTP-U, UPD, IP, L2, and L1 to communicate with the 3G-GGSN (Gateway GPRS Support Node), which employs an IP layer to link to the remote host. Therefore, in the user plane, PDCP, RLC, MAC and PHY layers are optimized for satellite operation. Next, the control plane is described.

As seen in FIG. 3B, a communication system 310 utilizes an adaptation layer 311 to insulate the satellite air interface 313. Consequently, the satellite air interface 313 permits the interoperation with various core networks; e.g., 3GPP2 EVDO (Evolution Data Optimized) core/MMD (Multimedia Domain) network 315, Universal Mobile Telecommunications System/IP Multimedia Subsystem (UMTS/IMS) core network 317, and a WiMax core network 319.

Figure 4:
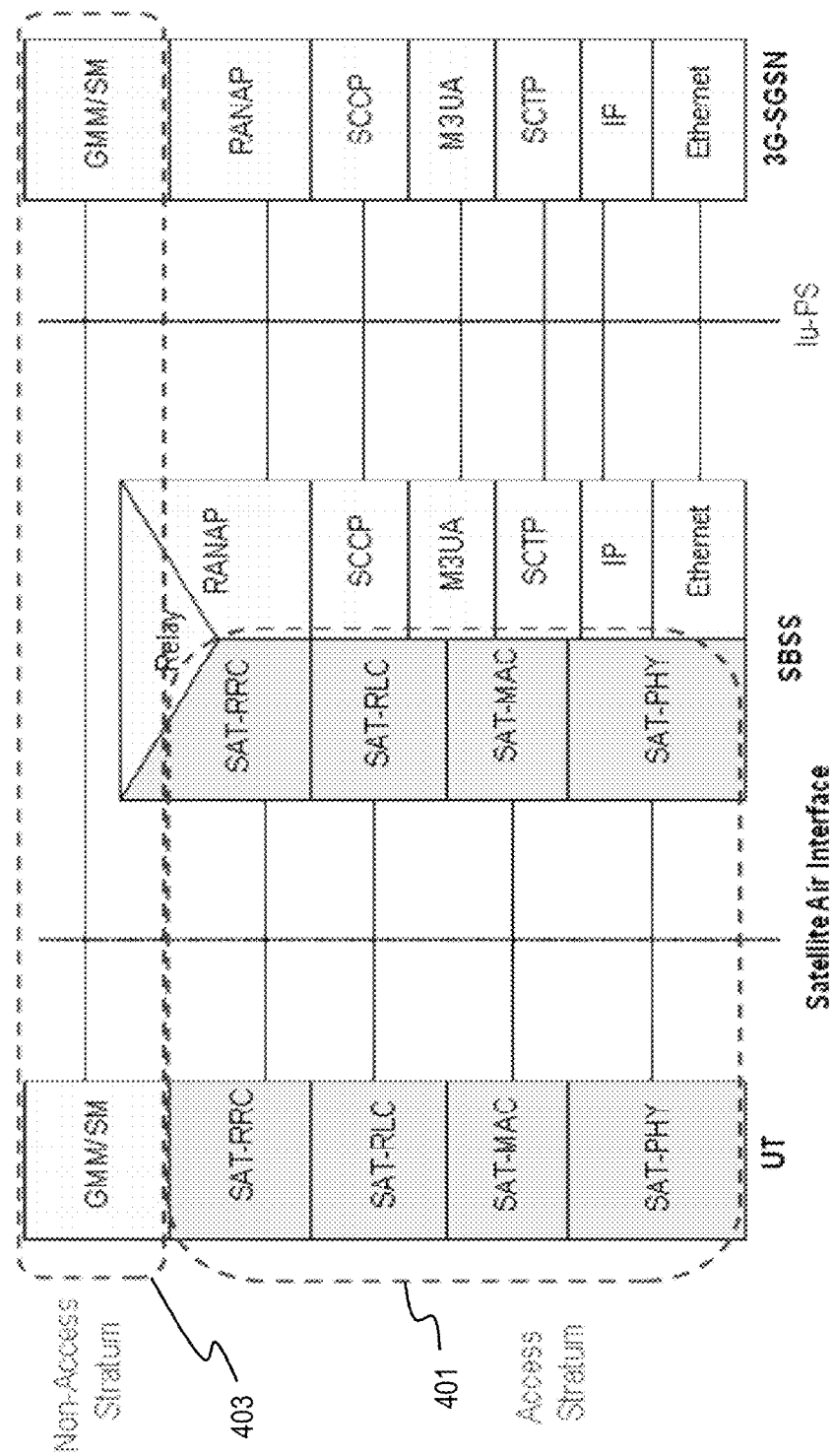
FIG. 4 is a diagram of a control plane protocol architecture for providing a satellite air interface, according to various exemplary embodiments.

FIG. 4 is a diagram of a control plane protocol architecture for providing a satellite air interface, according to various exemplary embodiments. As shown, the SBSS 107 communicates with user terminals (UT) 111 whose radio layer (also called as Access Stratum 401) functionality is consistent with that implemented at the SBSS 107. In this architecture 400, protocol functions and layers above the Access Stratum 401, also referred to as Non-Access Stratum 403 in the UTs 111 are unchanged. Accordingly, these protocols communicate with the core network elements without any modifications to the core network elements. Regardless of what core network elements are chosen by the operator, the satellite-specific access stratum enhancements and modifications between SBSS and UT will remain the same.

In the control plane, the RRC, RLC, MAC and PHY layers are optimized for satellite operation.

According to one embodiment, at the physical layer, the waveforms can be designed to permit operation in multiples of 31.25 kHz and with multiple slot durations. Power efficiency is achieved via use of such waveforms as pi/2 BPSK (Binary Phase Shift Keying), pi/4 QPSK (Quadrature Phase Shift Keying) and 16-APSK (Amplitude Phase Shift Keying) that have lower peak-to-average ratios than their counterparts of BPSK, QPSK and 16-QAM (Quadrature Amplitude Modulation). Bit rates from, e.g., 2.4 kbps to 1 Mbps can be achieved via the use of appropriate channel bandwidth, modulation scheme, coding rate and burst length.

Figure 5A:
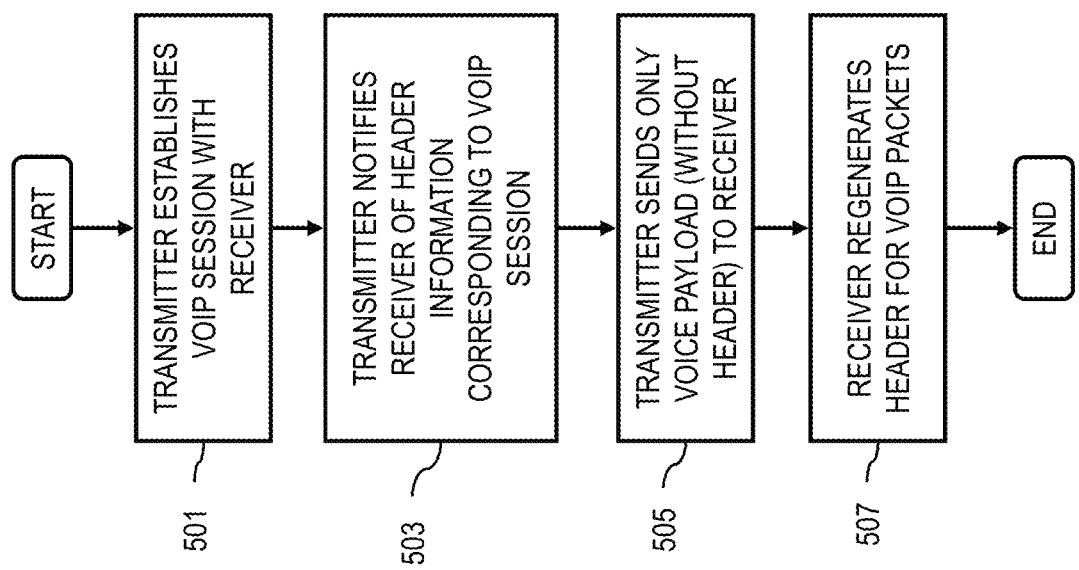
FIGS. 5A and 5B are, respectively, a flowchart and a ladder diagram of processes for providing spectrally efficient Voice over IP (VoIP) sessions, according to various exemplary embodiments.
Figure 5B:
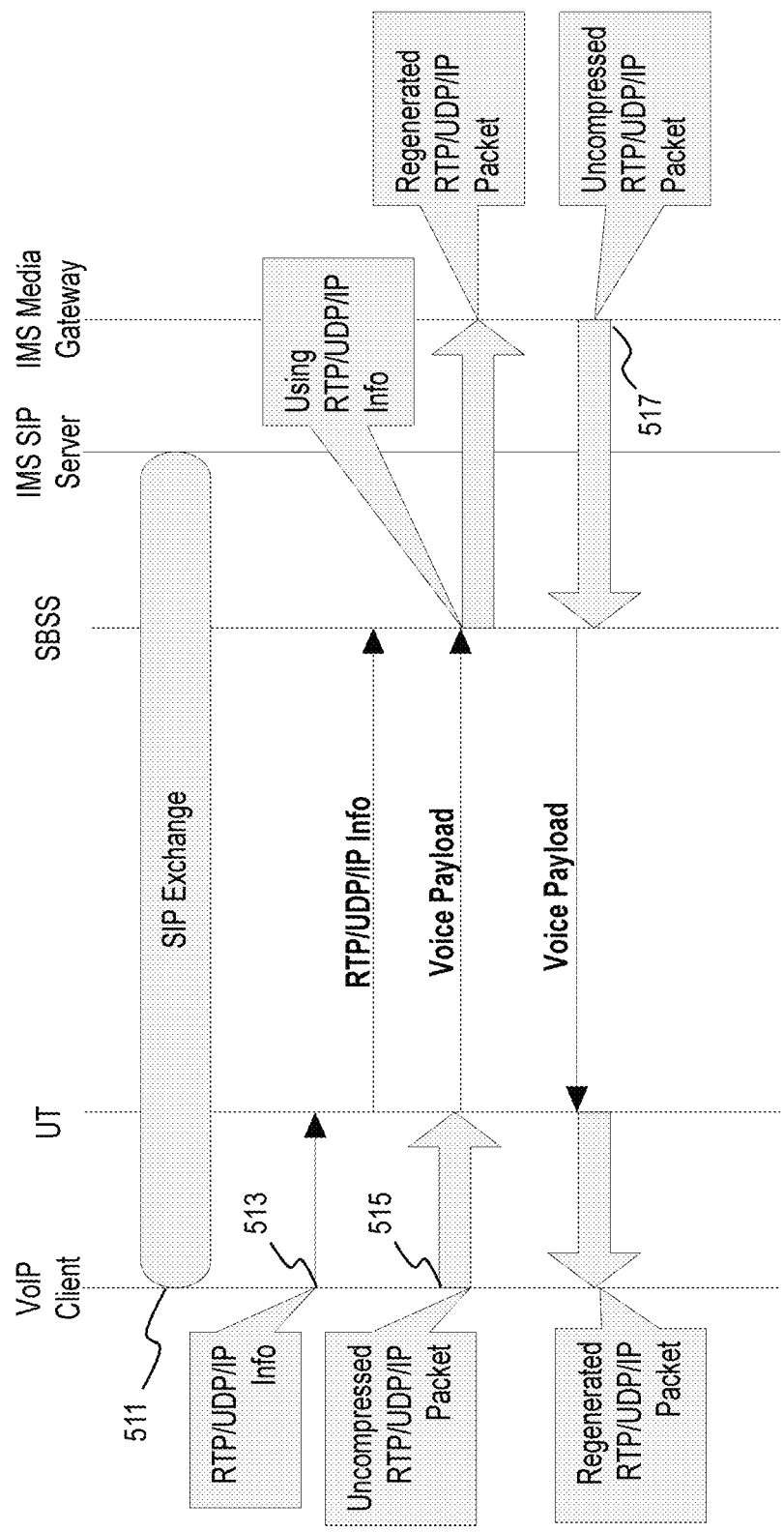

FIGS. 5A and 5B are, respectively, a flowchart and a ladder diagram of processes for providing spectrally efficient Voice over IP (VoIP) sessions, according to various exemplary embodiments. A key attribute of an all-IP system is that, all services including voice is carried over IP—i.e., Voice over IP or VoIP. That is, encoded voice is transmitted across the satellite system as IP packets. Unlike circuit-switched voice, VoIP packets carry header information whose size can be 40 or 60 bytes for IPv4 and IPv6, respectively. The percentage overhead is a function of the payload that the VoIP packet carries; therefore lower rate vocoders that are typically used in satellite systems will incur significantly higher percentage of overhead compared to terrestrial systems. As an example, a terrestrial system with a 12.2 kbps Adaptive Multi-Rate (AMR) vocoder will incur a overhead of about 66% for IPv4 (100% for IPv6), whereas a 4 kbps vocoder used in satellite systems will incur an overhead of about 200% (300% for IPv6). Moreover, this does not take into account Layer 2 overhead that is typically used in packet systems with bandwidth on demand, in which the overhead can be between 5 to 6 bytes leading to additional degradation in efficiency. Therefore, VoIP sessions are costly with respect to signaling overhead.

By way of example, the VoIP session utilizes Session Initiation Protocol (SIP) to establish voice communication between two parties. SIP protocol serves as the call control protocol for establishing, maintaining and teardown of VoIP calls. SIP provides a flexible framework for handling multimedia services, affording the end user with flexibility in influencing network behavior to suit their needs. This call control protocol further provides seamless interoperability across wireline and wireless networks.

A detailed discussion of SIP and its call control services are described in IETF RFC 2543, IETF RFC 3261 and IETF Internet draft "SIP Call Control Services", Jun. 17, 1999; these documents are incorporated herein by reference in their entireties. SIP messages are either requests or responses. The user terminal 111 can be a user agent that behaves as either a user agent client (UAC) or a user agent server (UAS), depending on the services that the system 100 is executing. In general, a user agent client issues requests, while a user agent server provides responses to these requests.

SIP defines various types of requests, which are also referred to as methods. The first method is the INVITE method, which invites a user to a conference. The next method is the ACK method, which provides for reliable message exchanges for invitations in that the client is sent a confirmation to the INVITE request. That is, a successful SIP invitation includes an INVITE request followed by an ACK request. Another method is a BYE request, which indicates to the UAS that the session should be released. In other words, BYE terminates a connection between two users or parties in a conference. The next method is the OPTIONS method; this method solicits information about capabilities and does not assist with establishment of a session. Lastly, the REGISTER provides information about a user's location to a SIP server.

According to one embodiment, the system 100 provides delivery of media sessions using an IP-based approach. Specifically, the system 100 uses a signaling protocol (e.g., SIP) in conjunction with a standard data packet format (e.g., Real-time Transport Protocol (RTP)) to deliver communication services. More specifically, the signaling protocol is used to establish, modify, and terminate a media session, while the standard data packet format serves as the conduit for carrying audio and video over the system 100.

To address the issue of costly overhead in support VoIP traffic, an approach is introduced that eliminates the overhead all together. As seen in FIG. 5A, in step 501, a transmitter (UT 111 or SBSS 107 depending on the direction of information transfer) establishes a VoIP session with a receiver (SBSS 107 or UT 111). To support voice service, according to one embodiment, the user data stream includes the following: IP multimedia subsystem (IMS) signaling stream, Real-Time Control Protocol (RTCP) stream, and Real-Time Protocol (RTP) speech stream. These streams can be transported over the same bearer (the same Packet Data Protocol (PDP) Context/radio access bearer (RAB)) or over different bearers.

To ensure that quality of service (QoS) differentiation can be afforded to the voice media stream relative to that of IMS signaling a separate PDP Context/RAB can be established for IMS signaling. This enables the optimization of bandwidth usage over the satellite link in the system 100 (of FIG. 1) by providing the real-time, low latency guarantees to the voice media stream. For example, session control signaling (e.g., Session Initiation Protocol (SIP)/Session Description Protocol (SDP)) can be utilized over User Datagram Protocol (UDP)/IP for application control between the terminals 111. SIP signaling can be used for multimedia session control.

In step 503, the transmitter notifies the receiver of the header information corresponding to the VoIP session. Voice payload (media) are carried over RTP/UDP/IP. The coded speech is carried alongside the payload descriptor in the media/RTP payload. Dual Tone Multi-frequency (DTMF) and Silence Insertion Descriptor (SID) packets are also carried alongside the speech packets. Thus, the overhead includes the RTP/UDP/IP header. Subsequently, the transmitter need only transmit the voice payload without the header information to the receiver, as in step 505. The receiver, upon receiving the voice payload, regenerates the header for the VoIP packets for further routing to the end user (step 507). This process thus completely eliminates the RTP/UDP/IP header at the transmitter and regenerates headers at the receiver. In other words, the transmitting entity informs the receiving entity about the details of the header at the beginning of a VoIP call.

In the scenario of FIG. 5B, the VoIP session utilizes Session Initiation Protocol (SIP) to establish voice communication between two parties. SIP protocol serves as the call control protocol for establishing, maintaining and teardown of VoIP calls. SIP provides a flexible framework for handling multimedia services, affording the end user with flexibility in influencing network behavior to suit their needs. This call control protocol further provides seamless interoperability across wireline and wireless networks.

For the purposes of illustration, only one party is depicted to highlight the satellite link between the SBSS 107 and the UT 111. In step 511, the SIP exchange necessary to establish a communication session is performed between a VoIP client (in communication with the UT 111) and a SIP server. In an exemplary embodiment, the VoIP client can reside within the UT 111. Next, in step 513, the VoIP client transmits header information, e.g., RTP/UDP/IP information, to the SBSS 107, which then stores this information. The SBSS 107 provides the association of this header information with the particular VoIP session. In one embodiment, the scheme also takes advantage of the periodic nature of resource allocation for transmission of VoIP payloads in order to regenerate RTP headers.

In step 515, the VoIP client generates a voice packet with uncompressed RTP/UDP/IP information. The UT 111 strips this information from the voice packet, leaving only the voice payload to be transmitted to the SBSS 107 over the satellite link. In this manner, overhead information is eliminated from utilizing precious satellite capacity. At the SBSS 107, the RTP/UDP/IP information is retrieved and used to regenerate the entire voice packet for forwarding to the media gateway 117, for example. The media gateway 117 can then terminate the call to the voice station 119 over the PSTN 105. In step 517, the media gateway 117 generates a voice packet conveying information from the voice station 119; this packet includes uncompressed RTP/UDP/IP information, which the SBSS 107 strips off. The SBSS 107 generates a satellite frame with only the voice payload to transport to the UT 111. At the UT 111, the voice packet is regenerated with the corresponding RTP/UDP/IP information.

In the above process, the physical channel is defined such that a known number of VoIP payloads are carried in each burst. The receiver is able to extract the VoIP payloads at the physical layer and attach a header based on information received at the beginning of the VoIP session. Media handling is illustrated in FIG. 6.

To provide maximum spectrally efficiency over the satellite interface 313, all packet overhead is removed and only the payload voice frames are transmitted. Any header information used for communications between the vocoders are thus removed prior to transmission on the satellite link and regenerated following reception. The PHY layer provides indications of the channel as well as the transmission content that allows for the indirect communication of information across the satellite link and necessary regeneration of header information. Before entry into the terrestrial network, e.g., core network 101, the header information is put back.

Figure 6:
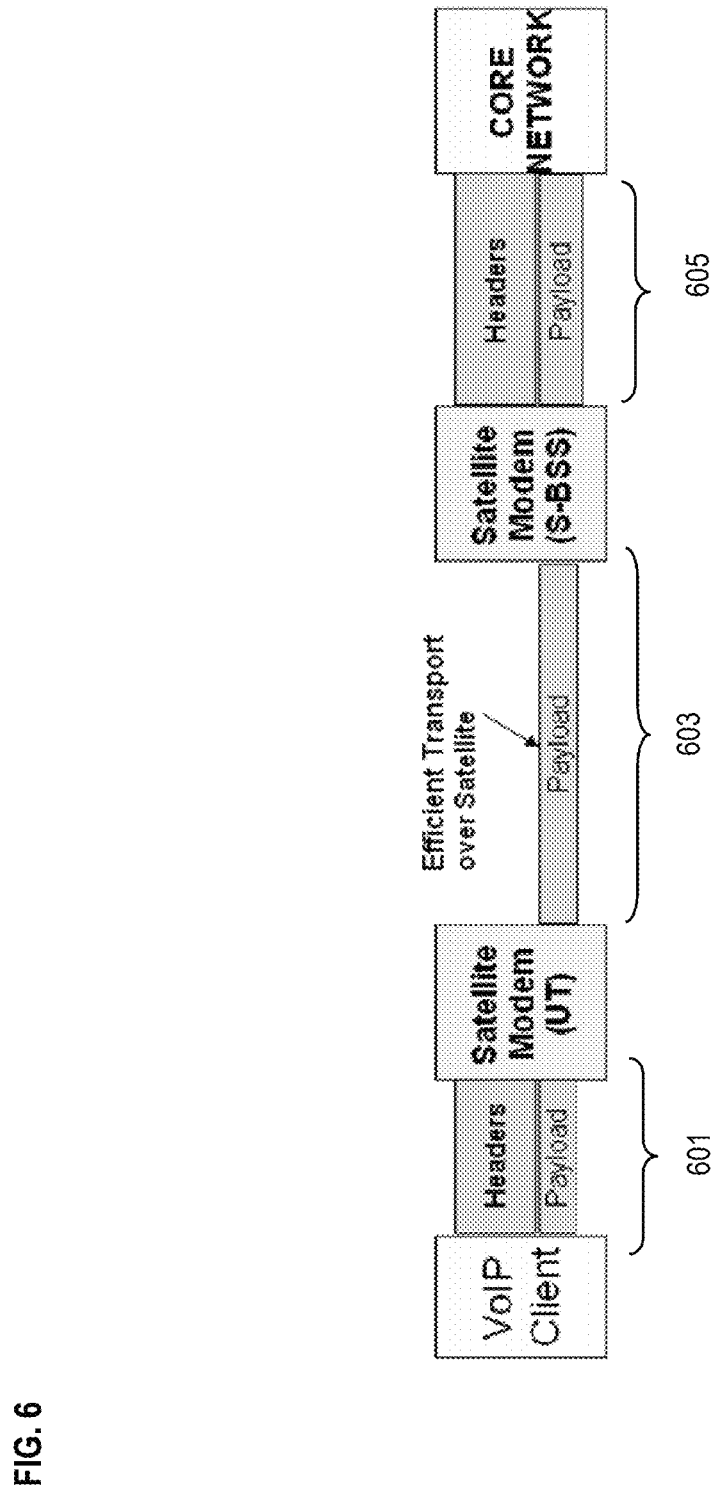
FIG. 6 is a diagram of a communication system for providing media handling to achieve circuit-switched efficiency for VoIP, according to various exemplary embodiments.

FIG. 6 is a diagram of a communication system for providing media handling to achieve circuit-switched efficiency for VoIP, according to various exemplary embodiments. As shown, in the segment 601, header information is exchanged. In segment 603 (i.e., satellite link), the satellite link carries only payload. The process of FIG. 5 involves elimination of the need to transfer details of header information in the direction from SBSS 107 to UT 111. In this example, the UT 111 is able to regenerate, in an exemplary embodiment, the RTP/UDP/IP headers purely based on the knowledge of what the application is using in terms of source IP address, destination IP address, source port and destination port. Also, the SBSS 107 can regenerate the voice packets for communication with the core network (e.g., network 101 of FIGS. 1A and 1B); segment 605 from the SBSS 107 to the core network 101 utilize headers as well as the payload.

In addition to the above arrangement, the satellite interface can be further optimized in support of voice communications.

Figure 7A:
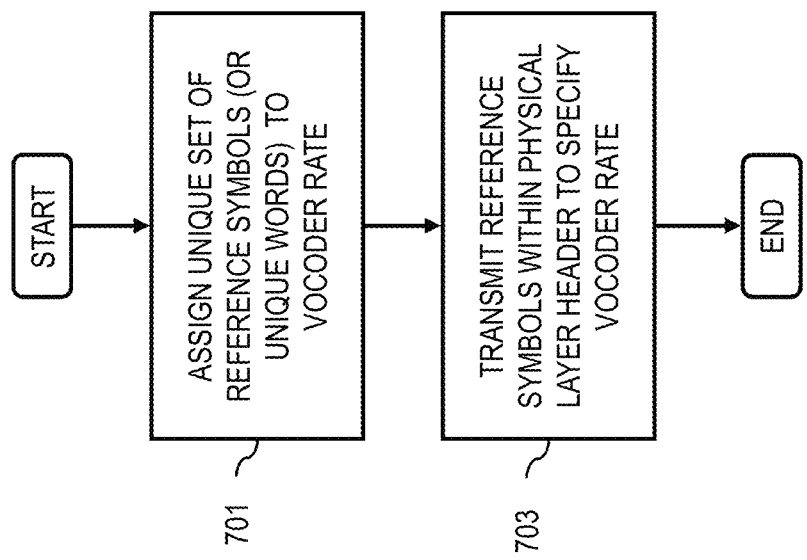
FIGS. 7A and 7B are, respectively, a flowchart of a process for providing multiple vocoder rate operation, and a diagram of a frame structure for supporting the process, according to various exemplary embodiments.
Figure 7B:
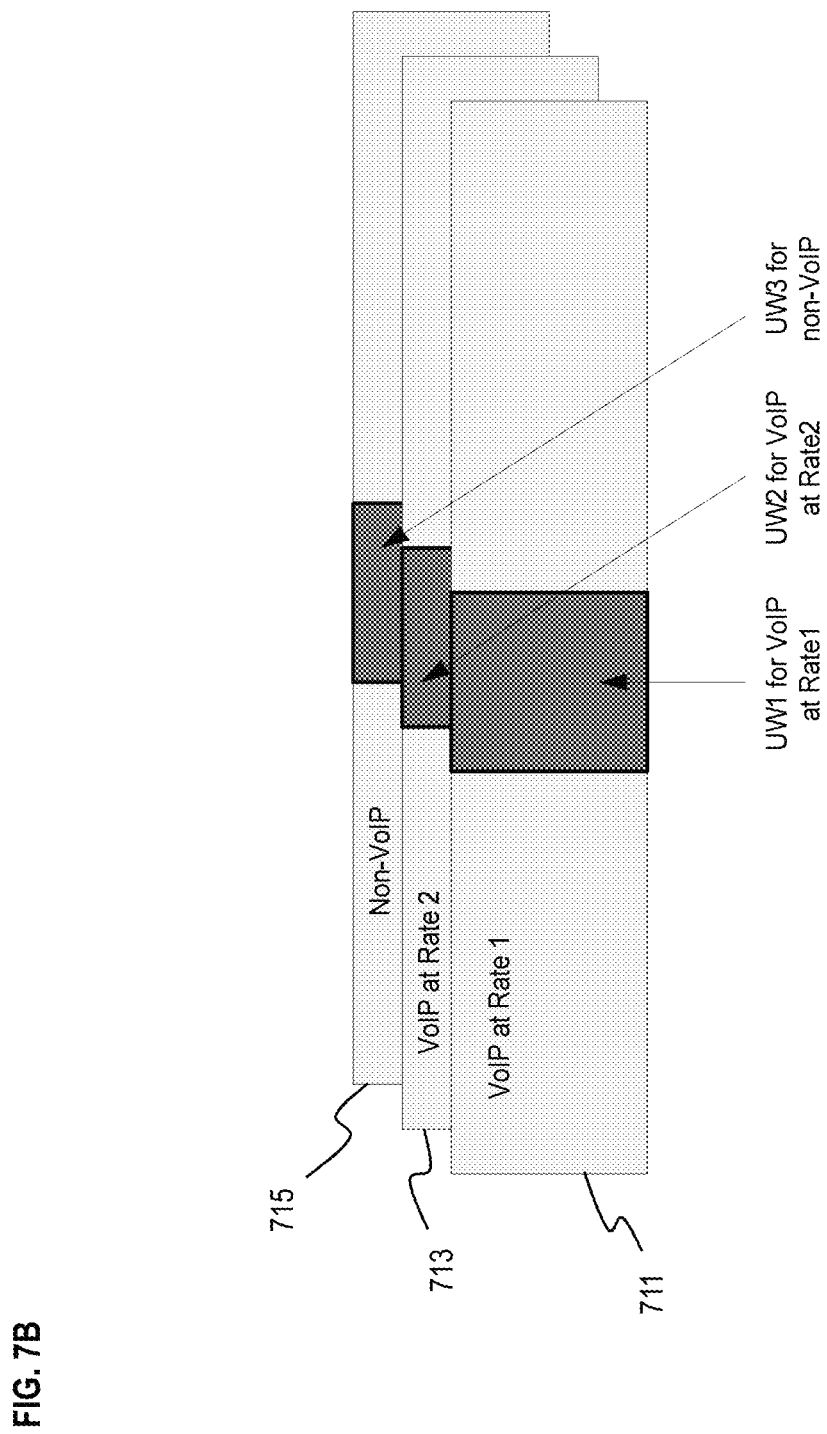

FIGS. 7A and 7B are, respectively, a flowchart of a process for providing multiple vocoder rate operation, and a diagram of a frame structure for supporting the process, according to various exemplary embodiments. Vocoder rate adaptation maintains voice quality when channel conditions degrade. According to one embodiment, the system 100 is also capable of carrying VoIP with circuit-switched spectral efficiency even when the vocoder is operating at multiple rates. By contrast, conventionally vocoder rate changes are indicated explicitly within the header—e.g., via a 1-byte header. To avoid such costly overhead, the system 100 utilizes a physical layer assisted method to determine the rate at which the voice encoder operates. Also, a physical layer assisted header compression scheme permits transmission of non-VoIP information on the same channel as provided for VoIP.

FIG. 7A shows the physical layer assisted approach. In step 701, a unique set of reference symbols (or Unique Words) are used for determining the rate at which voice encoder operated at the transmitter. These reference symbols can also be used to determine whether a received burst carries voice information or non-voice information. In step 703, these reference symbols are transmitted within the physical layer header, thereby negating signaling such information at a higher layer.

In the example of FIG. 7B, the physical frame structures 711, 713, 715. Frame 711 includes a unique word, UW1, corresponding to a particular rate, Rate 1, while frame 713 provides a different unique word, UW2, for a different rate, Rate 2. Furthermore, yet another unique word, UW3, can be specified, as shown in frame 715, to indicate a non-VoIP communication session.

Within the core network 101, the Media/RTP flow carries coded speech for voice services; e.g., the overall packets for the media flow carrying speech are Codec/RTP/UDP/IPv6. Voice traffic within the system 100 can be based, for instance, on Adaptive Multi-Rate (AMR) and DVSI vocoders. The RTP payload size for AMR 12.2 kbps coded speech is 32 bytes, and for the DVSI 4 kbps coded speech it is 10 bytes. Such flow can support Real Time/Conversational communications. In the case of a fixed packet size of 70 bytes, 60 bytes of uncompressed RTP/UDP/IPv6 header is provided every 20 ms (for 4 kbps coded speech with Silence Insertion Descriptor (SID) packets during voice inactivity). With the vocoder conFIG.d for two voice frames per packet, 80 bytes is generated every 40 ms. Alternatively, if the flow utilizes a fixed packet size of 50 bytes, 40 bytes of uncompressed RTP/UDP/IPv4 header are provided every 20 ms (for 4 kbps coded speech with SID packets during voice inactivity). With the vocoder conFIG.d for two voice frames per packet, 60 bytes is generated every 40 ms.

The voice payload from the DVSI vocoder is formed every 20 ms. However, to reduce end-to-end overhead, the vocoder can also be conFIG.d to concatenate two voice frames within a single vocoder payload, i.e. two voice frames per IP/UDP/RTP packet. The two 20 ms frames will form a single packet transmitted across the satellite air interface (e.g., using a 40 ms frame).

Figure 8A:
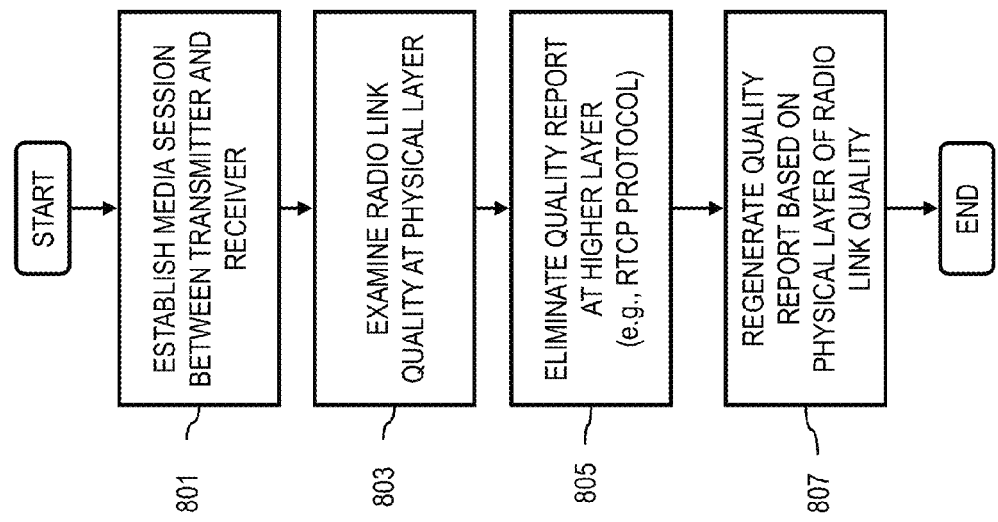
FIGS. 8A and 8B are, respectively, a flowchart and a ladder diagram of processes for providing link quality reports in support of a communications session, according to various exemplary embodiments.
Figure 8B:
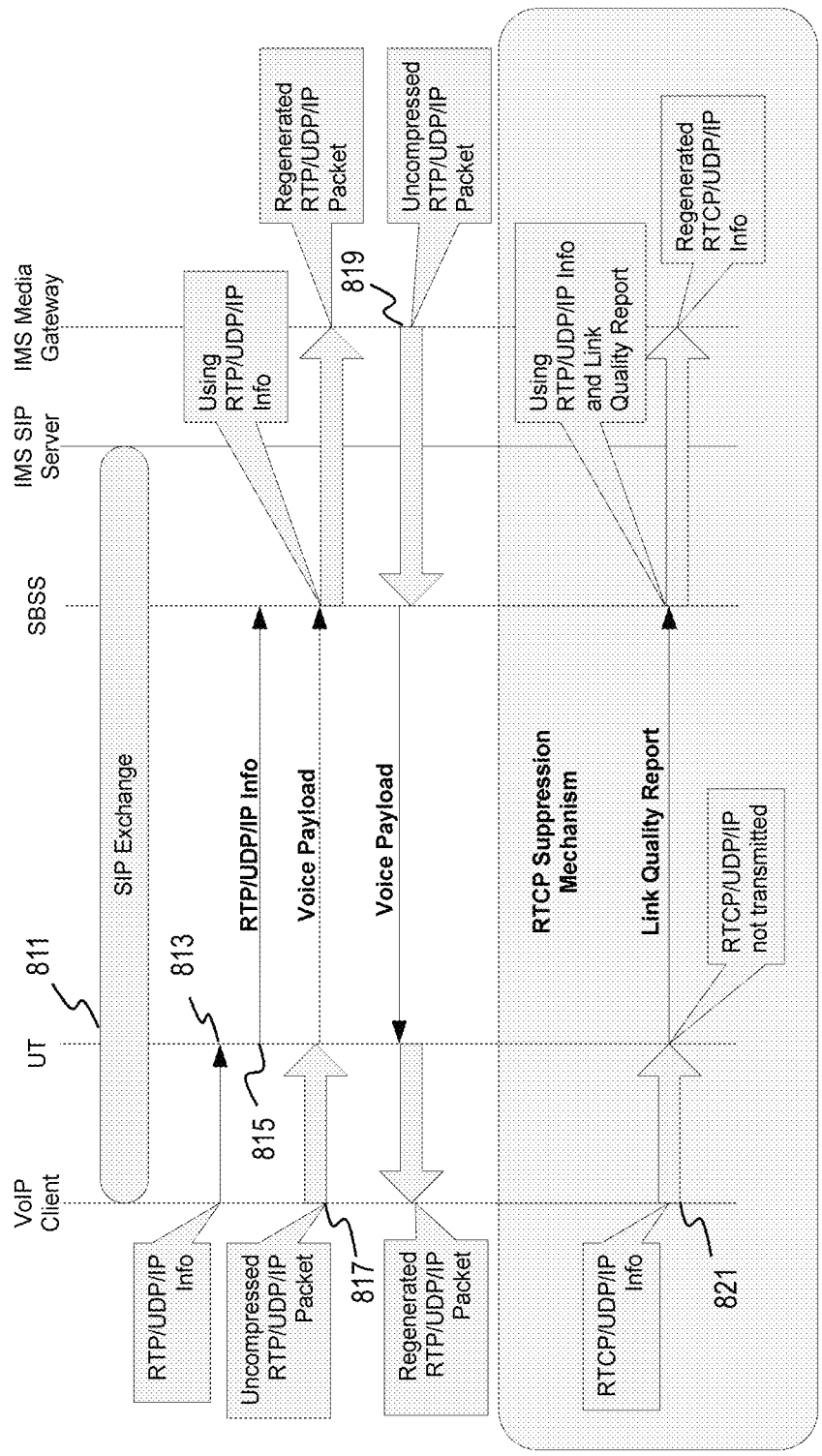

FIGS. 8A and 8B are, respectively, a flowchart and a ladder diagram of processes for providing link quality reports in support of a communications session, according to various exemplary embodiments. In a VoIP transaction utilizing SIP, in addition to transfer of media via Real-Time Protocol (RTP), there is transfer of side information, such as quality reports, via Real-Time Control Protocol (RTCP) protocol. For example, RTCP over UDP/IP can be employed for media control, wherein the RTCP provides feedback quality information to the source for the media carried within the RTP flow. Transfer of side information using RTCP requires additional bandwidth on the scarce mobile links. As described, the system 100 relies upon an approach that completely eliminates transfer of side information between transmitter (UT or SBSS depending on direction of media transfer) and receiver (SBSS or UT), thereby conserving resources on mobile links. The receiver creates these RTCP packets towards the client or server based on radio link quality, as seen at the physical layer.

RTCP is transported over UDP/IP and typically carries media control information. The characteristics of this flow are a Variable Packet Size (can be longer than the RTP payload) and that messages are transferred infrequently. RTCP defines different packet types—Sender Report, Receiver Report, Source Description, BYE and APP.

In step 801, a media session is established between the transmitter and the receiver. Next, the process examines the radio link quality at the physical layer, per step 803. Accordingly, this eliminates the need for providing radio link quality reports at the higher layer, such as the RTCP protocol (step 805). In step 807, the quality reports are regenerated based on the physical layer of the radio link.

In the exemplary scenario of FIG. 8B, the steps of 811-819 are similar to those steps 511-517 of the process of FIG. 5B. In addition, the process employs an RTCP suppression mechanism, whereby the VoIP client transmits, per step 821, a link quality report. As with the process of FIG. 5B, the packet(s) specifying such link quality report do not include the header information (e.g., RTCP/UDP/IP).

As another example of how VoIP sessions, particularly those involving the use of SIP, can be supported more efficiently relates to transmission errors, as next described.

Figure 9:
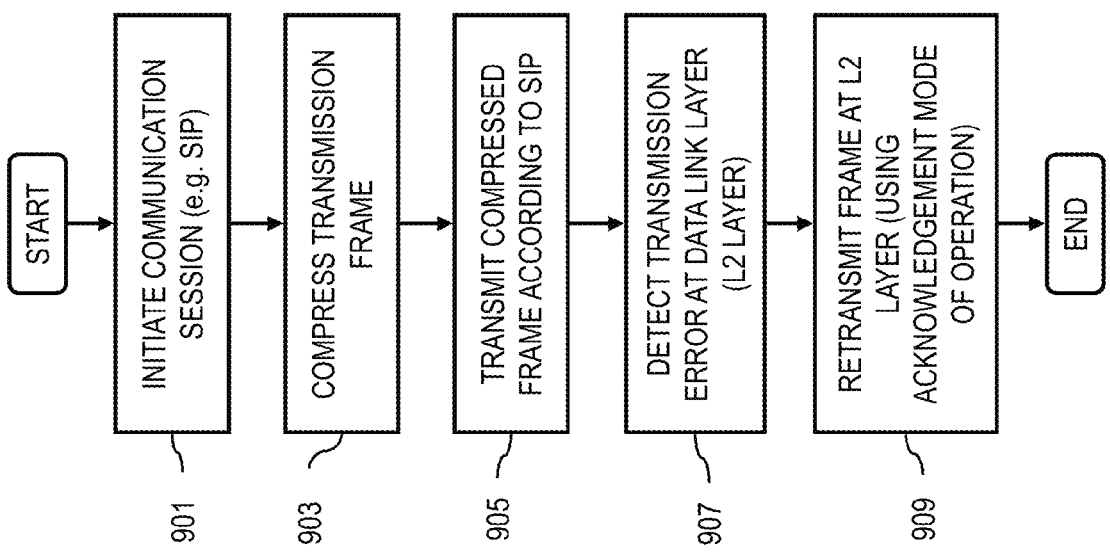
FIG. 9 is a flowchart of a process for handling transmission errors associated with a packetized voice call, according to various exemplary embodiments.

FIG. 9 is a flowchart of a process for handling transmission errors associated with a packetized voice call, according to various exemplary embodiments. SIP messages are textual in nature, resulting in long message lengths. Therefore, the transfer of these lengthy messages across the air interface (e.g., satellite air interface) results in a long call setup time. Traditionally, use of compression techniques such as SIGCOMP have been implemented to reduce the size of SIP messages, which can typically be about several hundred bytes long.

In step 901, a communication session (e.g., SIP session) is initiated; in which a transmission frame is generated. The process then compresses the transmission frame, as in step 903. This compressed frame is then transmitted according to SIP, per step 905. It is noted that typically SIP is carried over UDP, and messages carried over UDP are carried in unacknowledged mode at the data link layer. In step 907, a transmission error is detected at the data link layer (i.e., Layer 2 ("L2")). Rather than rely on the higher layer protocols to address the errors (i.e., using a retransmission scheme), the process retransmits at L2 using an acknowledgement mode of operation (step 909).

Figure 10A:
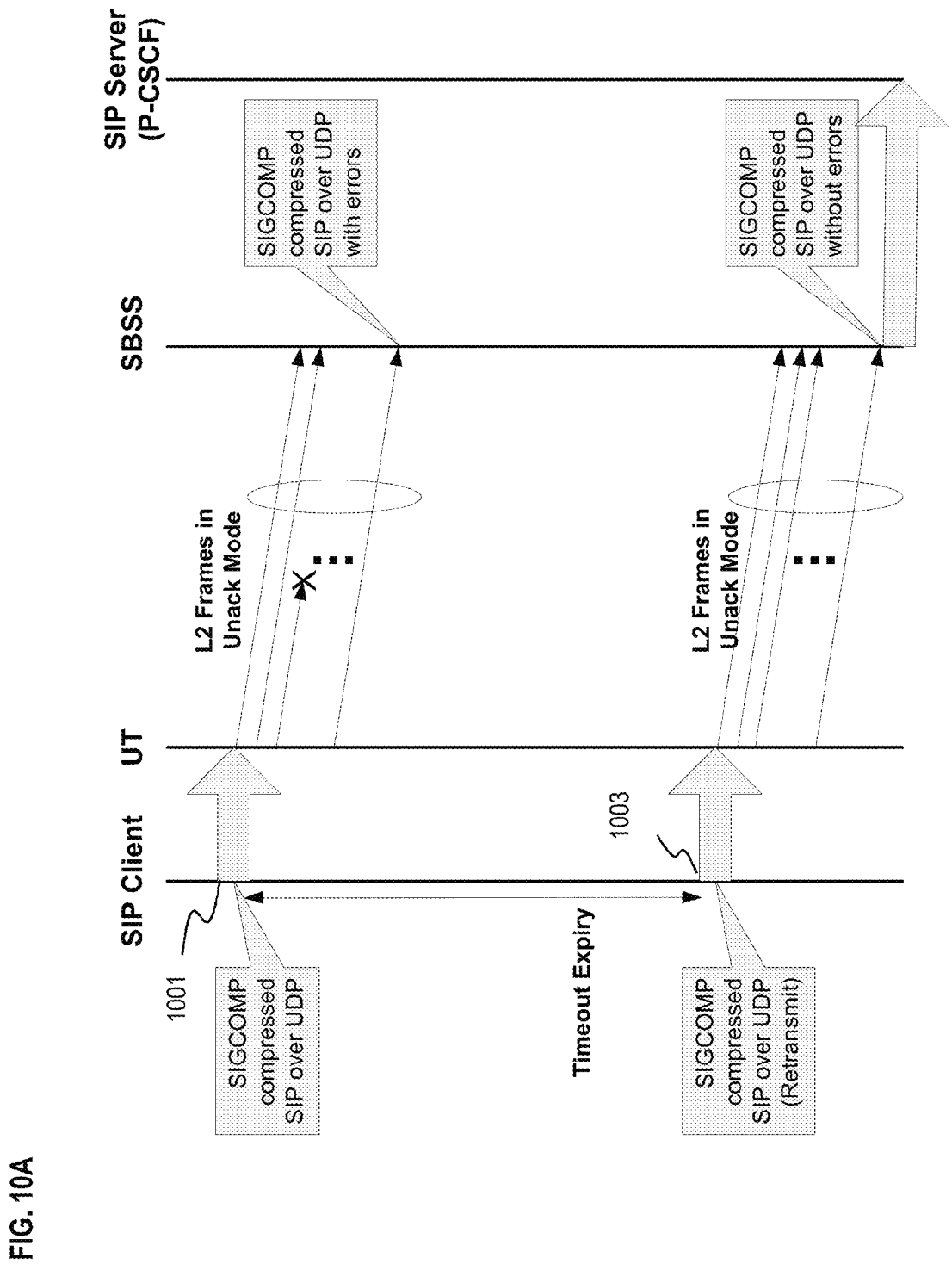
FIGS. 10A and 10B are, respectively, a ladder diagram of a conventional process for Session Initiation Protocol (SIP)

To better appreciate this process, a conventional process for handling SIP over UPD is described with respect to FIG. 10A.

Figure 10B:
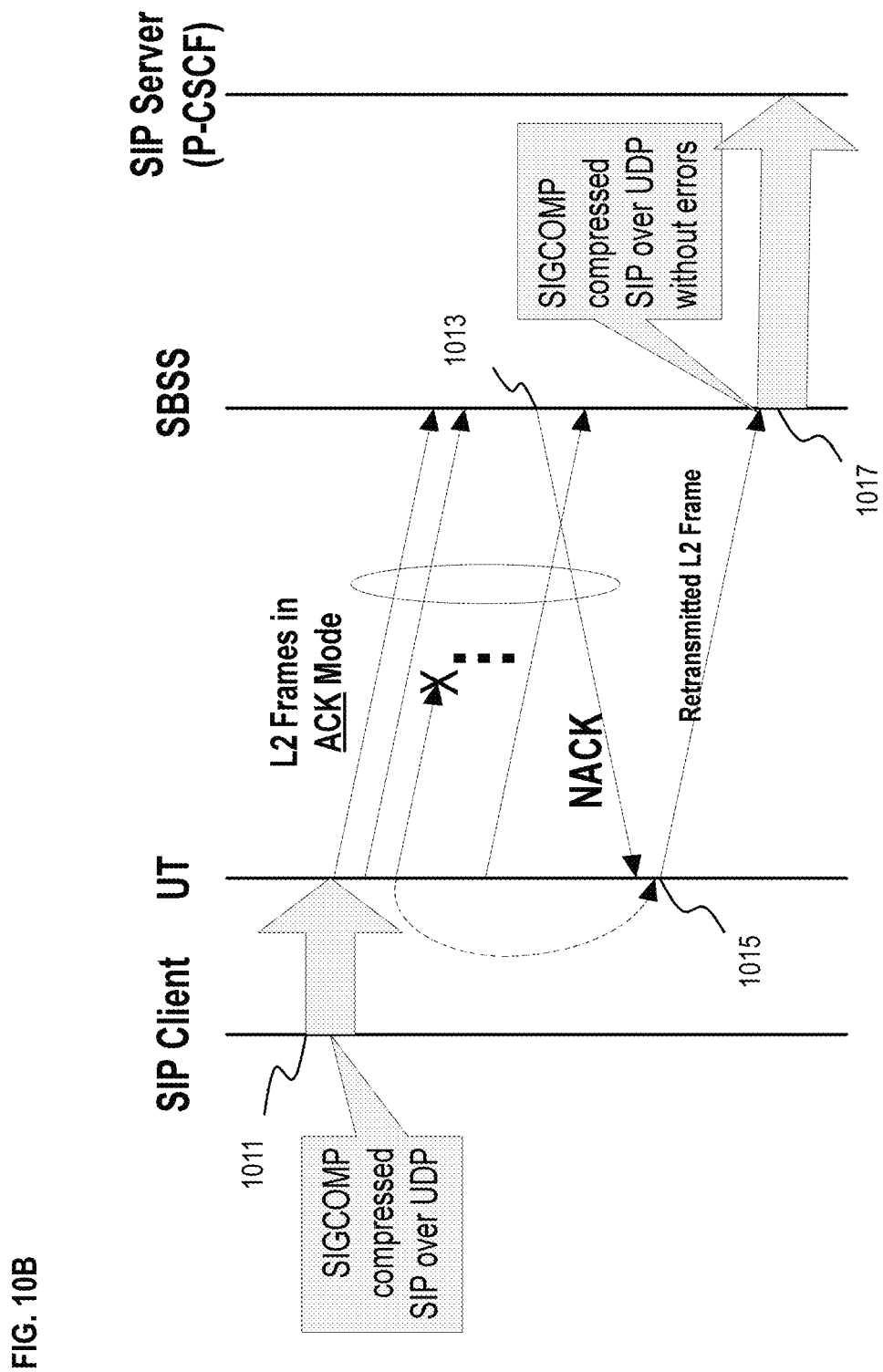

FIGS. 10A and 10B are, respectively, a ladder diagram of a conventional process for Session Initiation Protocol (SIP) over User Datagram Protocol (UDP) handling, and a ladder diagram of an enhanced process for SIP over UDP handling according to an exemplary embodiment. As shown in FIG. 10A, conventionally, the SIGCOMP compression is performed on the SIP message, which, as mentioned, are transported over UDP in unacknowledged mode at the data link layer (step 1001). The compressed SIP message is generally larger than a typical data link layer frame size. As a result, a single frame in error will result in the entire compressed SIP message to be retransmitted (step 1003). This not only results in increased call setup delay, but also wastes UT battery life because of power necessary to retransmit.

By contrast, the process of FIG. 10B relies upon the acknowledged mode operation at data link layer for SIP messages. In step 1011, the SIP client compresses the SIP messages, and the UT 111 sends the corresponding L2 frames in the acknowledgement mode to the SBSS 107. Consequently, upon detection of a transmission error at the data link layer, the SBSS 107 need only signal a negative acknowledgement (NACK) for the erroneous frame (step 1013). In response to the NACK signal, the UT 111 retransmits, as in step 1015, only the particular frame in error, as opposed to all the frames encompassing the SIP message. In step 1017, the SBSS 107 forwards the SIP message to the SIP server.

This process minimizes the impact of frame errors on the channel, thereby extending battery life in comparison to the conventional approach of FIG. 10A.

FIG. 11 is a diagram of a communication system having a quality of service (QoS) architecture, according to an exemplary embodiment. Under this scenario, communication system 1100 provides Quality of Service (QoS) differentiation across various applications and users. The system 1100 provides an end-to-end QoS architecture. For delay sensitive traffic, the system 1100 provides resource reservation in the return link (link between UT 111 and SBSS 107). The UT 111 maps IP service application requirements to UMTS QoS parameters. The SBSS 107 implements admission control and maps radio access bearer (RAB) QoS to radio bearer QoS (L1/L2 parameters).

The SBSS 107 communicates over an IP network 1101 to a 3G-SGSN 1103, which maps QoS request to RAB QoS (RAB assignment parameters) based QoS profile. Home Subscriber System (HSS) 1105 stores information about the subscriber, including QoS profiles. 3G-SGSN 1103 has connectivity to an IP backbone network 1107 for communicating with a 3G-GGSN 1109, which maps IP packets to PDP context with different QoS characteristics using, for example, TFT packet filters (e.g., address, protocol, port, SPI, TOS). The GGSN 1109 interfaces with a firewall 1111 to reach an external IP network 1113. A Proxy Call Session Control Function (P-CSCF) 1115 (e.g., SIP server) has access to the external IP network 1113.

For guaranteed bit rate traffic, the system 1100 provides resource guarantees when actual traffic has enough backlog to warrant use of guaranteed resources—when actual traffic rate requirement is lower than guaranteed bit rate, the system 1100 distributes available bandwidth to other flows in the system in a manner proportional to the weight associated these other flows.

Multiple simultaneous flows in the mobile satellite system based on terrestrial 3G architecture are illustrated FIG. 12.

FIG. 12 is a diagram of a communication system for supporting multiple simultaneous flows for a user terminal with different QoS requirement, according to an exemplary embodiment. Under this scenario, communication system 1200 provides for flows associated with different applications: a web browsing application 1201, a video streaming application 1203, and a VoIP application 1205. These applications 1201, 1203, and 1205, for the purposes of illustration, utilize different QoS parameters and are served by a common UT 111. As such, multiple flows can arrive simultaneously at the SBSS 107 according to differing QoS requirements, and be supplied to the UT 111.

Given the fact that multiple flows are transported over the satellite air interface, such flows can processed to achieve better spectral efficiency, as detailed below.

FIG. 13 is a flowchart of a process for efficiently multiplexing flows, according to various exemplary embodiments. The system 100 permits multiplexing of multiple flows belonging to different users in the same physical burst to maximize spectral efficiency. In step 1301, the flows are monitored; these flows can be for the same terminal or different terminals). The process determines any unused portions of the physical burst, per step 1303. It is then determined whether the flows are for the same (or common) terminal, as in step 1305. If the flows are for the same terminal, flow identifiers (IDs) are inserted into the same physical layer burst (step 1307). However, if the flows are not from the same terminal, different identifiers (e.g., MAC addresses) corresponding to the terminals are inserted, as in step 1309, into the same physical layer burst. The burst is subsequently transmitted, per step 1311. The formats of this physical layer burst is shown in FIGS. 14A and 14B.

FIGS. 14A-14C are diagrams of exemplary frame structures for providing multiplexing of multiple flows, according to various exemplary embodiments. By way of example, in FIG. 14A, unused portions of a physical (PHY) burst 1401 in, e.g., the downlink (from the SBSS 107 to the UT 111) can be allocated to eligible flows belonging to potentially different UTs 111 as determined by a scheduler. Physical bursts in this case may carry multiple unique identifiers (e.g., MAC addresses) if the flows correspond to different UTs 111. In this example, the physical burst 1401 supports three different UTs 111. Accordingly, the burst 1401 provides each UT 111 (e.g., UT1, UT2, and UT3) with an identifier (e.g., MAC address) and associated payload. Thus, burst 1401 includes the following fields: UT1 MAC ID and payload for UT1; UT2 MAC ID and payload for UT2; and UT3 MAC ID and payload for UT3.

As seen in FIG. 14B, in the uplink (i.e., in the direction of UT to SBSS), the system 100 permits multiplexing of multiple flows belonging to same user terminal 111 in a PHY burst 1403. In this case, unused portion of the physical burst 1403 is allocated to suitable flows of the same UT 111, as determined by the scheduler. The physical burst 1403 can specify multiple flow identifiers (e.g., addresses) for three flows to UT1: Flow ID1, Flow ID2, and Flow ID3.

In another embodiment, a frame structure 1405 of FIG. 14C can support efficient multiplexing of flows belonging to different traffic classes, terminal types (e.g., with different transmit capabilities), and burst types.

FIG. 15 is a flowchart of a process for utilizing performance enhancing proxy (PEP) functions, according to an exemplary embodiment. The system 100, as a 3G mobile satellite system, can be designed to employ Performance Enhancing Proxies (PEP) to improve throughput for various applications—e.g., Transmission Control Protocol (TCP) based applications. Because much of today's networks are either operating with or are required to interface with the Transmission Control Protocol/Internet Protocol (TCP/IP) suite, attention has been focused on optimizing TCP/IP based networking operations. As the networking standard for the global Internet, TCP/IP has earned such acceptance among the industry because of its flexibility and rich heritage in the research community. The transmission control protocol (TCP) is the dominant protocol in use today on the Internet. TCP is carried by the Internet protocol (IP) and is used in a variety of applications including reliable file transfer and Internet web page access applications.

PEP functions perform a general class of functions termed "TCP spoofing," in order to improve TCP performance over impaired (i.e., high latency or high error rate) links. TCP spoofing involves an intermediate network device (the performance enhancing proxy (PEP)) intercepting and altering, through the addition and/or deletion of TCP segments, the behavior of the TCP connection in an attempt to improve its performance. Conventional TCP spoofing implementations include the local acknowledgement of TCP data segments in order to get the TCP data sender to send additional data sooner than it would have sent if spoofing were not being performed, thus improving the throughput of the TCP connection. Generally, conventional TCP spoofing implementations have focused simply on increasing the throughput of TCP connections either by using larger windows over the link or by using compression to reduce the amount of data which needs to be sent, or both.

Under this exemplary application, in step 1501, a TCP session is established over the satellite link (i.e., from the SBSS 107 to the UT 111). Depending on the direction of traffic, the SBSS 107 or the UT 111 can invoke the PEP function. In step 1503, it is determined whether to apply PEP. If so, the PEP function is invoked, as in step 1505. The PEP functionality is invoked when the SBSS 107 has visibility to TCP headers (since this is necessary for protocol spoofing).

However, in situations where IPSec is used and TCP headers are not visible, the system 100 relies on MAC layer protocol enhancements that does not require visibility to TCP headers. In this embodiment, the MAC layer provides speculative grants to the UT 111 when resources are available in the system 100. These speculative grants are used by UT 111 to transmit in, e.g., the uplink without explicitly requesting for radio resources. This eliminates the round-tip delay involved in request/grant exchange between UT 111 and SBSS 107.

FIG. 17 illustrates impact of using typical terrestrial GPRS MAC protocols, and FIG. 18 illustrates the enhancement in performance due to the PEP functionality. TCP provides reliable, in-sequence delivery of data between two TCP entities. These entities set up a TCP connection, using a conventional TCP three-way handshake and then transfer data using a window based protocol with the successfully received data acknowledged.

FIG. 16 is a diagram of a protocol architecture including PEP functions, according to an exemplary embodiment. A protocol architecture 1600 resembles that of architecture 300 of FIG. 3, and can be adopted by the system 100. As seen, a PEP layer 1601, 1603 is injected into the protocol architecture 1600 in a manner that does not impact the core network protocol architecture. The PEP function can be entirely absorbed in the Access Stratum protocol architecture. PEP function monitors TCP transactions and speeds up transfer of TCP segments across air interface when resources are available. It also prevents TCP windows from collapsing due to errors on the radio links.

FIG. 17 is a ladder diagram of a typical Medium Access Control (MAC) protocol exchange over a satellite link. This process begins, per step 1701, with a TCP server outputting a TCP segment to the SBSS 107, which generates multiple L2 frames for transmission over the satellite link to the UT 111. These L2 frames are then used to regenerate the TCP segment, which is then provided to the TCP client. The TCP client subsequently acknowledges, as in step 1703, the received TCP segment by issuing a TCP ACK message. This ACK message triggers a resource allocation process, in which the UT 111 requests resources for sending the ACK message to the SBSS 107. In step 1705, the UT 111 submits a request for resource, and the SBSS responds with a resource grant (step 1707). Per steps 1709 and 1711, the UT 111 provides information relating to the resource request (e.g., backlog, priority, etc.) to the SBSS 107, which then sends a grant based on this information. Thereafter, the UT 111 can send the TCP ACK message over the L2 frames to the SBSS 107, as in step 1713. Lastly, the SBSS 107 forwards the TCP ACK message to the TCP server. In this process, the resource allocation procedure for simply forwarding the TCP ACK is expensive, introducing significant delay. In recognition of this drawback, an approach is provided (shown in FIG. 18) that minimizes the delay stemming from the resource allocation procedure.

FIG. 18 is a ladder diagram of a MAC protocol exchange over a satellite link in which delay is reduced, according to an exemplary embodiment. In step 1801, the TCP server sends a TCP segment, resulting in the generation and transmission of L2 frames from the SBSS 107 to the UT 111 as in the process of FIG. 17. Unlike this process, in step 1803, recognizing that an acknowledgement message will be forthcoming, the SBSS 107 submits a speculative uplink grant for the anticipated TCP ACK.

In step 1805, the UT 111 forwards the TCP segment to the TCP client. After receipt of the TCP segment, the TCP client, per step 1807, submits a TCP ACK. At this point, the UT 111 can immediately forward the TCP ACK over the satellite link, as resources had been pre-allocated. In step 1809, the TCP ACK is received by the SBSS 107 and forwarded to the TCP server. The typical resource allocation procedure is avoided in this process, thereby reducing delays associated with such a procedure.

FIG. 19 is a flowchart of a process for efficiently utilizing resources to provide push-to-anything, according to an exemplary embodiment. The system 100, in certain embodiments, also permits carriage of resource efficient Push-to-Anything services. Under this scenario, the end-to-end architecture of system 100 relies upon terrestrial IP multimedia subsystem (IMS) elements such as PoC servers (as shown in FIG. 20). By way of example, the push-to-anything process of FIG. 19 is explained with respect to the architecture of FIG. 20.

With the architecture 2000, the IMS core 103 includes one or more PoC servers 2001, a presence server 2003, and a SIP proxy/registrar server 2005. The presence server 2003 provides information on the availability of a particular user to receive the PoC communication. The SIP proxy/registrar server 2005 assists with establishing SIP sessions.

In step 1901, the POC server 2001 receives media as part of the push-to-anything service. Next, the PoC server 2001 injects, as in step 1903, multiple unicast streams towards the SBSS 107. It is recognized that the radio resource usage can be made significantly more efficient for the satellite link. Namely, the SBSS 107 need only transmit one such stream, per step 1905, in a given spot-beam (e.g., beams 2007 and 2009), thereby significantly saving radio resources and satellite power. In step 1907, the user terminal (with the PoC client) receives the single stream.

A further mechanism for achieving spectral efficiency over the satellite air interface involves examining the channel conditions.

FIG. 21 is a flowchart of a process for providing dynamic link adaptation, according to an exemplary embodiment. This process utilizes dynamic link adaptation whereby the transmit power, modulation scheme, coding scheme and resource allocation are adjusted based on UT channel condition. In step 2101, the UT channel condition is determined. After this determination, the UT power can be set, as in step 2103. For example, to maximize throughput, UT power is adjusted up to a threshold so as to mitigate an impaired channel condition. When UT transmit power reaches a threshold (as determined in step 2105), modulation and coding schemes are adjusted to maximize throughput, per step 2107. In certain applications, guaranteed bit rate flows may be supported. As such, for guaranteed bit rate flows (as determined in step 2109), resource allocations can also be adjusted so as to keep the information rate constant, as in step 2111.

The performance enhancement obtain through the application of the above scheme is shown in FIG. 22.

FIG. 22 is a diagram of a graph show performance of a dynamic link adaptation mechanism, according to an exemplary embodiment. Specifically, graph 2200 shows three different coding rates, R1, R2, and R3 (in ascending order of rates). As seen, throughput can be maximized for each of the rates after a particular signal-to-noise (SNR) level.

FIG. 23 is a ladder diagram of a handover process between a terrestrial domain and a satellite domain, according to an exemplary embodiment. In the example, the system 100 (of FIG. 1B) supports in-session handovers between terrestrial and satellite domains via coordination of resources via, e.g., a central resource manager (not shown). In step 2301, the UT 111 is in session with terrestrial network 113. In step 2303, the SBSS 107 communicates with the terrestrial network 113 to convey information regarding the satellite radio resources. When the UT 111 is in session on a terrestrial network (e.g., network 113), the terrestrial network 113 provides opportunities for the UT 111 to make measurements of adjacent terrestrial cells as well as the overlaid satellite spot-beams (step 2305). Information about satellite spot-beams is provided to the terrestrial RAN 113 by the central resource manager in form of measurement reports, per step 2307. In turn, the terrestrial network 113 supplies the satellite parameters, as in step 2309.

Based on measurement reports received by the terrestrial network 113 (step 2305), the terrestrial network decides whether the user terminal should be handed over to a terrestrial cell or satellite spot-beam (step 2309). If the decision is a satellite spot-beam, then the network 113 informs user terminal 111 about the details of the satellite spot-beam. The user terminal 111 then continues the session, as in step 2311, with the satellite system and abandons the terrestrial system 113.

FIG. 24 is a flowchart of a process for providing legal interception handling, according to an exemplary embodiment. Satellite spot-beams generally cover a relatively wide area (e.g., several hundred kilometers in radius) compared to a terrestrial cell (e.g., 2-3 km radius). Therefore a satellite spot-beam can span across multiple countries and jurisdictions. Many countries require that a call originated from that country be interceptible in that country. Legal interception points are typically in the core network domain.

To achieve this, the system 100 can utilize the SBSS 107 to determine the position of the UT 111 (step 2401). That is, the SBSS 107 can track where the packets are routed based on UT position, per step 2403. According to one embodiment, the SBSS 107 receives or estimates the UT position at the time of session origination; and this position information is updated in-session upon UT movement. Depending on UT position, the SBSS 107 has a routing functionality to multiple core network elements. This is illustrated in FIG. 25 below.

FIG. 25 is a diagram of a communication system capable of providing legal interception handling, according to an exemplary embodiment. Under the architecture 2500, the SBSS 107 interfaces with two different terrestrial systems 2501 and 2503. The SBSS routing functionality can facilitate legal interception in core network based on the position of the UT. For instance, UT-1 is determined to be in the jurisdiction of country A, and thus, the SBSS 107 forwards traffic, denoted UT-1 traffic, to the terrestrial system 2501 of country A. Also, upon determining that the UT-2 is within the borders of country B, the SBSS 107 routes UT-2 traffic to the terrestrial system 2503 of country B.

One of ordinary skill in the art would recognize that the processes for providing a satellite interface to support mobile communication services may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof. Such exemplary hardware for performing the described functions is detailed below.

FIG. 26 illustrates exemplary hardware that can be used to implement certain embodiments. A computing system 2600 includes a bus 2601 or other communication mechanism for communicating information and a processor 2603 coupled to the bus 2601 for processing information. The computing system 2600 also includes main memory 2605, such as a random access memory (RAM) or other dynamic storage device, coupled to the bus 2601 for storing information and instructions to be executed by the processor 2603. Main memory 2605 can also be used for storing temporary variables or other intermediate information during execution of instructions by the processor 2603. The computing system 2600 may further include a read only memory (ROM) 2607 or other static storage device coupled to the bus 2601 for storing static information and instructions for the processor 2603. A storage device 2609, such as a magnetic disk or optical disk, is coupled to the bus 2601 for persistently storing information and instructions.

The computing system 2600 may be coupled via the bus 2601 to a display 2611, such as a liquid crystal display, or active matrix display, for displaying information to a user. An input device 2613, such as a keyboard including alphanumeric and other keys, may be coupled to the bus 2601 for communicating information and command selections to the processor 2603. The input device 2613 can include a cursor control, such as a mouse, a trackball, or cursor direction keys, for communicating direction information and command selections to the processor 2603 and for controlling cursor movement on the display 2611.

According to various embodiments of the invention, the processes described herein can be provided by the computing system 2600 in response to the processor 2603 executing an arrangement of instructions contained in main memory 2605. Such instructions can be read into main memory 2605 from another computer-readable medium, such as the storage device 2609. Execution of the arrangement of instructions contained in main memory 2605 causes the processor 2603 to perform the process steps described herein. One or more processors in a multi-processing arrangement may also be employed to execute the instructions contained in main memory 2605. In alternative embodiments, hard-wired circuitry may be used in place of or in combination with software instructions to implement the embodiment of the invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the invention are not limited to any specific combination of hardware circuitry and software.

The computing system 2600 also includes at least one communication interface 2615 coupled to bus 2601. The communication interface 2615 provides a two-way data communication coupling to a network link (not shown). The communication interface 2615 sends and receives electrical, electromagnetic, or optical signals that carry digital data streams representing various types of information. Further, the communication interface 2615 can include peripheral interface devices, such as a Universal Serial Bus (USB) interface, a PCMCIA (Personal Computer Memory Card International Association) interface, etc.

The processor 2603 may execute the transmitted code while being received and/or store the code in the storage device 2609, or other non-volatile storage for later execution. In this manner, the computing system 2600 may obtain application code in the form of a carrier wave.

The term "computer-readable medium" as used herein refers to any medium that participates in providing instructions to the processor 2603 for execution. Such a medium may take many forms, including but not limited to non-volatile media, volatile media, and transmission media. Non-volatile media include, for example, optical or magnetic disks, such as the storage device 2609. Volatile media include dynamic memory, such as main memory 2605. Transmission media include coaxial cables, copper wire and fiber optics, including the wires that comprise the bus 2601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the invention may initially be borne on a magnetic disk of a remote computer. In such a scenario, the remote computer loads the instructions into main memory and sends the instructions over a telephone line using a modem. A modem of a local system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 27 is a diagram of exemplary components of a user terminal configured to operate in the systems of FIGS. 1A and 1B, according to an exemplary embodiment. A user terminal 2700 includes an antenna system 2701 (which can utilize multiple antennas) to receive and transmit signals. The antenna system 2701 is coupled to radio circuitry 2703, which includes multiple transmitters 2705 and receivers 2707. The radio circuitry encompasses all of the Radio Frequency (RF) circuitry as well as base-band processing circuitry. As shown, layer-1 (L1) and layer-2 (L2) processing are provided by units 2709 and 2711, respectively. Optionally, layer-3 functions can be provided (not shown). Module 2713 executes all Medium Access Control (MAC) layer functions. A timing and calibration module 2715 maintains proper timing by interfacing, for example, an external timing reference (not shown). Additionally, a processor 2717 is included. Under this scenario, the user terminal 2700 communicates with a computing device 2719, which can be a personal computer, work station, a Personal Digital Assistant (PDA), web appliance, cellular phone, etc.

VoIP BURST FORMAT

Dedicated Channels (DCH)

Dedicated channel (DCH) is used to carry dedicated traffics (VoIP and data) and associated in-band signaling.

DTCH (Dedicated Traffic Channel) is a traffic channel that is allocated to the terminal in packet dedicated mode. It can carry either 2.45 or 4.0 kbps encoded speech.

DACCH (Dedicated Associated Control Channel) transports signaling message between UT and Gateway when UT is in packet dedicated mode. It carries associated control information in forward or return link.

The PNB3(m, n) burst is used to transport the logical channels DTCH and DACCH. The first parameter, m, denotes the carrier bandwidth in multiples of basic bandwidth of 31.25 kHz. The corresponding symbol rate is m times the basic symbol rate of 23.4 ksps. The second parameter denotes the burst duration in multiples of time slot 1.66 (5/3) ms, hence if the burst occupies 3(6) time slots the duration is 5(10) ms.

In GMR-3G, the following PNBs are defined:

TABLE 1-1

| GMR1-3G PNBs | |
| --- | --- |
| Bandwidth | Burst Types |
| 31.25 kHz | PNB3(1, 3), PNB3(1, 6), PNB3(1, 8) |

Packet Normal Bursts: PNB3(1,3), PNB3(1,6),

Packet normal bursts PNB3(1,3), PNB3(1,6) and PNB3(1, 8) are intended to carry either encoded speech or user data in a bandwidth reserved manner over DCH (Dedicated Channel).

Packet normal bursts PNB3(1,3) and PNB3(1,6) supports two pair of speech and data rates.

2.45 kbps voice speech or 2.6 kbps data 4.0 kbps voice speech or 4 kbps data

PNB3(1,8) supports only 4.0 kbps voice speech or data.

The above rates are calculated by the number of information bits divided by 40 ms.

The voice speech consists of perceptually important and unimportant bits. As such, the level of required protection is different. Improved spectrum efficiency can be realized by exploiting this property. Unequal number of parity bits is added to the perceptually important and unimportant bits.

The adopted modulation and FEC schemes for these bursts are summarized in Table 1-2.

TABLE 1-2

PNB3(1,3), PNB3(1,6) Burst Summary

| Burst Type | Vocoder Rate | Symbol Rates (ksps) | Burst Duration (ms) | Modulation | Payload | FEC | Info Bits | Coded Bits | Code Rates |
|---|---|---|---|---|---|---|---|---|---|
| PNB3 (1,3) | 4 kbps | 23.4 | 5 | pi/4-QPSK | Perceptually important bits | TB. Conv. K = 9 | 108 | 130 | 0.83 |
|  |  |  |  |  | Perceptually unimportant bits | No coding | 64 | 64 | 1.00 |
|  |  |  |  |  | Data over VoIP | TB. Conv. K = 9 | 160 | 194 | 0.82 |
| PNB3 (1,3) | 2.45 kbps | 23.4 | 5 | pi/4-QPSK | Perceptually important bits | TB. Conv. K = 9 | 60 | 112 | 0.54 |
|  |  |  |  |  | Perceptually unimportant bits | TB. Conv. K = 5 | 50 | 82 | 0.61 |
|  |  |  |  |  | Data over VoIP | TB. Conv. K = 9 | 104 | 194 | 0.54 |
| PNB3 (1,6) | 4 kbps | 23.4 | 10 | pi/4-QPSK | Perceptually important bits | TB. Conv. K = 9 | 108 | 266 | 0.41 |
|  |  |  |  |  | Perceptually unimportant bits | TB. Conv. K = 5 | 64 | 130 | 0.49 |
|  |  |  |  |  | Data over VoIP | TB. Conv. K = 9 | 160 | 396 | 0.40 |
| PNB3 (1,3) | 4 kbps | 23.4 | 5 | pi/4-QPSK | Perceptually important bits | TB. Conv. K = 9 | 108 | 130 | 0.83 |
|  |  |  |  |  | Perceptually unimportant bits | No coding | 64 | 64 | 1.00 |
|  |  |  |  |  | Data over VoIP | TB. Conv. K = 9 | 160 | 194 | 0.82 |
| PNB3 (1,6) | 2.45 kbps | 23.4 | 10 | pi/2-BPSK | Perceptually important bits | TB. Conv. K = 9 | 60 | 114 | 0.53 |
|  |  |  |  |  | Perceptually unimportant bits | TB. Conv. K = 5 | 50 | 84 | 0.60 |
|  |  |  |  |  | Data over VoIP | TB. Conv. K = 9 | 104 | 198 | 0.53 |
| PNB3 (1,8) | 4 kbps | 23.4 | 13.333 | pi/2 -BPSK | Perceptually important bits | TB. Conv. K = 9 | 108 | 186 | 0.58 |
|  |  |  |  |  | Perceptually unimportant bits | TB. Conv. K = 5 | 64 | 94 | 0.68 |
|  |  |  |  |  | Data over VoIP | TB. Conv. K = 9 | 160 | 280 | 0.57 |

The Keep Alive Bursts (KABs) are transmitted over both downlink and uplink DCH carrier to fill in during a silence period. It only includes UWs and a few symbols. The symbols are placed in a unique way so that they exploit the proximity of UWs in the demodulation process. The reduced number of symbols in the burst save the UT and satellite transmit power. It contains Golay coded power control bits.

VoIP Burst Structure

PNB3 Burst Format and Characteristics

PNB3 bursts consist of three different types of fields. They are summarized as

Payload: Payload carries user data and/or control messages. Payload is modulated either by $\pi/2$-BPSK or $\pi/4$-QPSK and it is encoded with convolutional code for various rates.

Guard: Guard symbols (along with network synchronization) between the consecutive burst allow the period for carrier power ramp up and down.

UW (Unique Words): Unique Words (UW) assists burst synchronization such as timing, phase, and frequency estimation.

The PNB3(1,3) burst is intended to carry either encoded 2.45 kbps or 4 kbps speech or user data. The burst format for this three-slot burst format is illustrated in FIG. 28. Since there are two types of information bits in speech, i.e., perceptually important and perceptually unimportant bits, to maximize interleaving gain the bits are arranged in a specific order. These unique arrangements also yield significant coding gain in fading channels. However, for data no such arrangement is required.

PNB3(1,3), 4 kbps consists of 96 perceptually important bits, 7 control bits, 5 CRC bits and 64 perceptually unimportant bits. The 7 control bits consist of Golay coded power control bits and link quality indicator bits. The 5 CRC bits are appended at the end of the 103(=96+7) perceptually important and control bits to form an input block of length 108 bits. This block is encoded using a rate 1/2 constraint length 9 tail-biting convolutional code to obtain a block of 216 coded bits. Out of this block, 86 bits are punctured to obtain a block of 130 coded bits. The 64 perceptually unimportant bits are not coded or punctured. After coding and puncturing, the 130 perceptually important coded bits and 64 perceptually unimportant bits are converted to 65 and 32 $\pi/4$-QPSK symbols, respectively. In total, these 97 payload symbols are distributed across the burst shown in FIG. 28. The first 8 and the last 8 perceptually unimportant symbols are assigned to the first 8-symbol payload and the last 8-symbol payload, respectively. Of the middle 81-symbol payload, the first 65 bits and the last 65 bits are taken from the first 65 and last 65 perceptually important bits, respectively. The remaining 32 bits in the middle portion of the payload are filled with the middle 32 bits from perceptually unimportant bits.

PNB3(1,3), 2.45 kbps consists of 48 perceptually important bits, 7 control bits, 5 CRC bits and 50 perceptually unimportant bits. The 7 control bits consist of Golay coded power control bits and link quality indicator bits. The 5 CRC bits are appended at the end of the 55(=48+7) perceptually important and control bits to form an input block of length 60 bits. This block is encoded using a rate 1/2 constraint length 9 tail-biting convolutional code to obtain a block of 120 coded bits. Out of this block, 8 bits are punctured to obtain a block of 112 coded bits. The 50 perceptually unimportant bits are encoded using a rate 1/2 constraint length 5 tail biting convolutional code to obtain a block of 100 coded bits. Out of this block 18 bits are punctured to obtain a block of 82 coded bits. After coding and puncturing, the 112 perceptually important coded bits and 82 perceptually unimportant coded bits are converted to 56 and 41 $\pi/4$-QPSK symbols, respectively. As before, these 97 payload symbols are distributed across the burst. The first 8 and the last 8 perceptually unimportant symbols are assigned to the first 8-symbol payload and the last 8-symbol payload, respectively. Of the middle 81-symbol payload, the first 28 symbols and the last 28 symbols are taken from the first 28 and last 28 perceptually important symbols, respectively. The remaining 25 symbols in the middle portion of the payload are filled with the middle 25 symbols from perceptually unimportant symbols.

PNB3(1,3) 4 kbps for data channel consists of 138 data bits, 6 control bits and 16 CRC bits. The 6 control bits consist of Golay coded power control bits and link quality indicator bits. The 16 CRC bits are appended at the end of the 144 (=138+6) information and control bits to form a block of 160 bits. This block is encoded using a rate 1/2 constraint length 9 tail-biting convolutional code to obtain a block of 320 coded bits. Out of this block, 126 bits are punctured to obtain a block of 194 coded bits.

PNB3(1,3) 2.6 kbps, data channel over VOIP consists of 82 data bits, 6 control bits and 16 CRC bits. The 6 control bits consist of Golay coded power control bits and link quality indicator bits. The 16-bit CRC bits are appended at the end of 88(=82+6)) information and control bits to form a block of 104 bits. This block is encoded using a rate 1/2 constraint length 9 tail-biting convolutional code to obtain a block of 208 coded bits. Out of this block, 14 bits are punctured to obtain a block of 194 coded bits.

For data, either 2.45 kbps or 4 kbps, after coding and puncturing, the 194 information bits are converted to 97 $\pi/4$-QPSK symbols which are assigned across the burst (97=8+81+8).

FIG. 28. PNB3(1,3) Uplink and Downlink Burst Format: Number in Units of Symbol

The burst formats for KAB3(1,3) is shown in FIG. 29. After coding, the 8 bits, consisting of Golay coded power control bits and link quality indicator bits, are converted to $\pi/2$-BPSK symbols. Out of 198 payload symbols in PNB3(1,3), only 8 are required to transmit KAB3 as shown in FIG. 29. The 8 symbols are divided into two segments each containing 4 symbols and the segments are placed adjacent to the unique word fields. No signal is transmitted over the rest of the payload portion.

FIG. 29. KAB3(1,3)

At the transmitter, the modulated symbols are phase-rotated for better spectral efficiency. The amount of phase rotation is modulation dependent. To be specific, for BPSK and QPSK, the symbols are progressively rotated by $\pi/2$ and $\pi/4$, respectively. Note that while for BPSK, both the unique word and payload symbols are progressively phase-rotated by $\pi/2$, for QPSK only the payload symbols are progressively phase-rotated by $\pi/4$. In other words, for QPSK, the unique word symbols are transmitted without phase rotation. Since the unique words for QPSK voice and data are chosen in such a way that the maximum phase transition between successive symbols is $\pm\pi/2$, the unique words provide desirable spectral efficiency even without the $\pi/4$-phase rotation. This innovative approach in UW design ensures efficient classification performance when transmitted burst can support both BPSK and QPSK modulation schemes.

Like PNB3(1,3), PNB3(1,6) can also carry either 2.45 kbps or 4 kbps speech or user data.

PNB3(1,6), 4 kbps consists of 96 perceptually important bits, 7 control bits, 5 CRC bits and 64 perceptually unimportant bits. The 7 control bits consist of Golay coded power control bits and link quality indicator bits. The 5 CRC bits are appended at the end of the 103(=96+7) perceptually important and control bits to form an input block of length 108 bits. This block is encoded using a rate 1/3 constraint length 9 tail-biting convolutional code to obtain a block of 324 coded bits. Out of this block, 58 bits are punctured to obtain a block of 266 coded bits. The 64 perceptually unimportant bits are encoded using a rate 1/3 constraint length 5 tail biting convolutional code to obtain a block of 192 coded bits. Out of this block, 62 bits are punctured to obtain a block of 130 coded bits. After coding and puncturing, the 266 perceptually important bits and 130 perceptually unimportant bits are converted to 133 and 65 $\pi/4$-QPSK symbols, respectively. As before, these 198 payload symbols are distributed across the burst. The first 32.5 perceptually unimportant symbols are assigned to the first 8-symbol payload and the middle 24.5 symbols of the next 91-symbol payload. The rest of the 32.5 perceptually unimportant symbols are assigned to the middle 24.5 symbols of the second 91-symbol payload and the last 8-symbol payload. The unused 91-symbol payload portion at the beginning and end are assigned to 33 and 33.5 perceptually important symbols, respectively, for the first one. For the second 91-symbol payload, 33.5 and 33 perceptually important symbols are assigned to the first and the last unused portion, respectively.

PNB3(1,6), 2.45 kbps consists of 48 perceptually important bits, 7 control bits, 5 CRC bits and 50 perceptually unimportant bits. The 7 control bits consist of Golay coded power control bits and link quality indicator bits. The 5 CRC bits are appended at the end of the 55(=48+7) perceptually important and control bits to form an input block of length 60 bits. This block is encoded using a rate 1/2 constraint length 9 tail-biting convolutional code to obtain a block of 120 coded bits. Out of this block, 6 bits are punctured to obtain a block of 114 coded bits. The 50 perceptually unimportant bits are encoded using a rate 1/2 constraint length 5 tail biting convolutional code to obtain a block of 100 coded bits. Out of this block, 16 bits are punctured to obtain a block of 84 coded bits. After coding and puncturing, the 114 perceptually important coded bits and 84 perceptually unimportant coded bits are converted to t/2-BPSK symbols. In total, these 198 payload symbols are distributed across the burst shown in FIG. 30. The first 42 perceptually unimportant symbols are assigned to the first 8-symbol payload and the middle 34 symbols of the next 91-symbol payload. The rest of the 42 perceptually unimportant symbols are assigned to the middle 34 symbols of the second 91-symbol payload and the last 8-symbol payload. The unused 91-symbol payload portion at the beginning and end are assigned to 28 and 29 perceptually important symbols, respectively, for the first one. For the second 91-symbol payload, 29 and 28 perceptually important symbols are assigned to the first and the last unused portion, respectively.

PNB3(1,6) 4 kbps for data channel consists of 138 data bits, 6 control bits and 16 CRC bits. The 6 control bits consist of Golay coded power control bits and link quality indicator bits. The 16 CRC bits are appended at the end of the 144 (=138+6) information and control bits to form a block of 160 bits. This block is encoded using a rate 1/3 constraint length 9 tail-biting convolutional code to obtain a block of 480 coded bits. Out of this block, 84 bits are punctured to obtain a block of 396 coded bits.

PNB3(1,6) 2.6 kbps for data channel consists of 82 data bits, 6 control bits and 16 CRC bits. The 6 control bits consist of Golay coded power control bits and link quality indicator bits. The 16 CRC bits are appended at the end of the 88(=82+6) information and control bits to form a block of 104 bits. This block is encoded using a rate 1/2 constraint length 9 tail-biting convolutional code to obtain a block of 208 coded bits. Out of this block, 10 bits are punctured to obtain a block of 198 coded bits.

For 4 kbps data, after coding and puncturing, the 396 information bits are converted to 198 π/4-QPSK symbols which are assigned across the whole burst (198=8+91+91+8). Similarly, for 2.45 kbps data, after coding and puncturing, the 198 information bits are converted to π/2-BPSK symbols which are assigned across the burst (198=8+91+91+8).

Since there are two different modulation type involved in PNB3(1,6) bursts, the amount of phase rotation is modulation dependent. At the transmitter, the payload symbols are progressively rotated by π/4 for better spectral efficiency. Note that only the payload symbols are progressively phase rotated while the unique word symbols are transmitted without phase rotation. Since the unique words for QPSK voice and data are chosen in such a way that the maximum phase transition between successive symbols is ±π/2, the unique words provide desirable spectral efficiency even without the π/4-phase rotation.

Figures 30, 31:
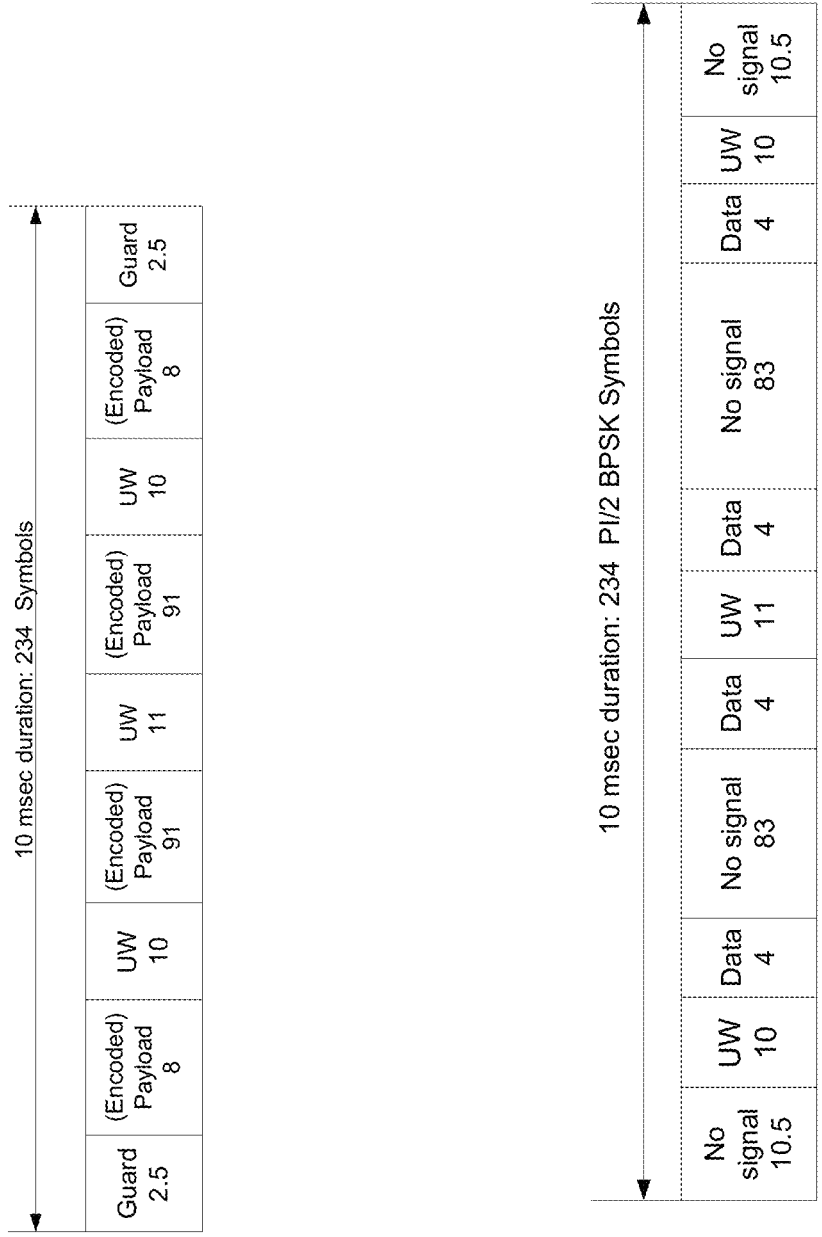

FIG. 30. PNB3(1,6) Uplink and Downlink Burst Format: Number in Units of Symbol

The burst format for KAB3(1,6) is illustrated in FIG. 31. After coding, the 16 bits, consisting of Golay coded power control bits and link quality indicator bits, are converted to π/2-BPSK symbols. Out of 198 payload symbols in PNB3(1, 6), only 16 are required to transmit KAB3. The 16 symbols are divided into four segments each containing 4 symbols and the segments are placed adjacent to the unique word fields. No signal is transmitted over the rest of the payload portion.

FIG. 31. KAB3(1,6)

Figures 32, 33:
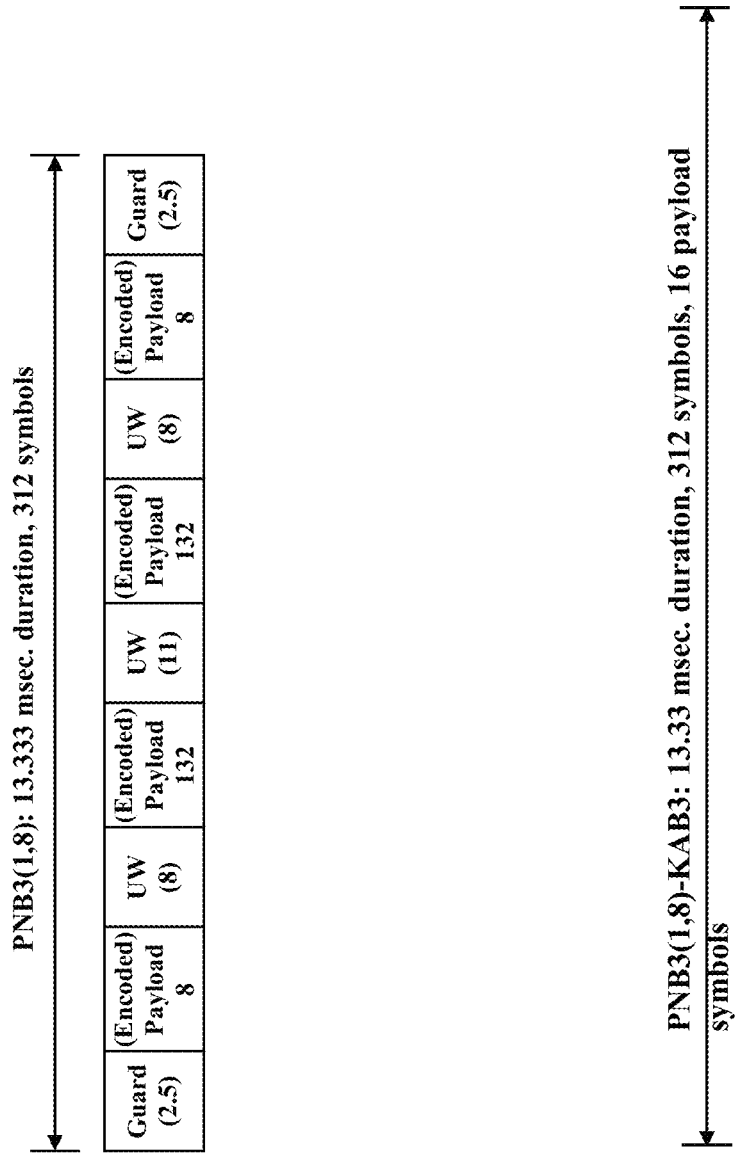

The burst format for PNB3(1,8) is illustrated in FIG. 32. PNB3(1,8), 4 kbps consists of 96 perceptually important bits, 7 control bits, 5 CRC bits and 64 perceptually unimportant bits. The 7 control bits consist of Golay coded power control bits and link quality indicator bits. The 5 CRC bits are appended at the end of the 103(=96+7) perceptually important and control bits to form an input block of length 108 bits. This block is encoded using a rate 1/2 constraint length 9 tail-biting convolutional code to obtain a block of 216 coded bits. Out of this block, 30 bits are punctured to obtain a block of 186 coded bits. The 64 perceptually unimportant bits are encoded using a rate 1/2 constraint length 5 tail biting convolutional code to obtain a block of 128 coded bits. Out of this block, 34 bits are punctured to obtain a block of 94 coded bits. After coding and puncturing, the 186 perceptually important coded bits and 94 perceptually unimportant coded bits are converted to π/2-BPSK symbols. In total, these 280 payload symbols are distributed across the burst. The first 8 and the last 8 perceptually unimportant symbols are assigned to the first 8-symbol payload and the last 8-symbol payload, respectively. Of the first 132-symbol payload, the first 46 symbols and the last 47 symbols are taken from the first 46 and next 47 perceptually important symbols, respectively. The remaining 39 symbols in the middle portion of the payload are filled with 39 symbols from perceptually unimportant symbols counting after the initial 8 symbols. Of the second 132-symbol payload, the first 47 symbols and the last 46 symbols are taken from the next 47 and 46 perceptually important symbols, respectively. The remaining 39 symbols in the middle portion of the payload are filled with the next 39 symbols from perceptually unimportant symbols.

PNB3(1,8) 4 kbps for data channel consists of 138 data bits, 6 control bits and 16 CRC bits. The 6 control bits consist of Golay coded power control bits and link quality indicator bits. The 16 CRC bits are appended at the end of the 144 (=138+6) information and control bits to form a block of 160 bits. This block is encoded using a rate 1/2 constraint length 9 tail-biting convolutional code to obtain a block of 320 coded bits. Out of this block, 40 bits are punctured to obtain a block of 280 coded bits. After coding and puncturing, the 280 information bits are converted to π/2-BPSK symbols which are assigned across the burst (280=8+132+132+8).

FIG. 32. PNB3(1,8) Uplink and Downlink Burst Format: Number in Units of Symbol

The burst format for KAB3(1,8) is illustrated in FIG. 33. The number of bits, modulation, their relative positions around UWs are same as in KAB3(1,6).

FIG. 33. KAB3(1,8) Burst Format: Number in Units of Symbol

Since all the burst types in PNB3(1,8) involve only one type of modulation, both the payload and UW BPSK symbols are progressively phase-rotated by π/2 for better spectral efficiency.

VOIP Unique Word Design

Known sequences of symbols are placed in the structure of a burst along with payload (user data) to help the receiver estimate unknown parameters. Common unknown parameters include timing, frequency, phase and channel coefficient information. Known sequence can also be used to identify a specific type of burst if it is used as a signature sequence pertinent to that burst. This procedure of identification is called burst classification and the known sequence is referred to as unique words.

At the receiver, the signature sequences are matched with the received sequence and the closest match distinguishes the burst type. Usually burst classification is performed to determine the presence of a specific type of burst e.g., random access channel (RACH). However, in the proposed invention we will explain how burst classification can be exploited to determine the vocoder rate as well enabling higher throughput and lower overhead.

For efficient classification of bursts, the unique word sequence should meet the following two criteria The auto-correlation function of the sequence should have very narrow main-lobe and very low side lobe. High auto-correlation provides noise immunity especially at low SNR.

The cross-correlation function between two unique word sequences should be very low especially at small lags. The cross-correlation property helps distinguish correct sequence among all the candidate sequences.

The normalized aperiodic auto-correlation function of a BPSK-modulated unique word sequence $\{x_n\}$, $x \in \{-1, +1\}$, $n=0, 1, \ldots, N-1$, is given by $$\overline{C}_x(\tau) = \begin{cases} \frac{1}{N} \sum_{n=0}^{N-\tau-1} x_n x_{n+\tau}, & 0 \leq \tau \leq N-1 \\ \frac{1}{N} \sum_{n=0}^{N+\tau-1} x_n x_{n-\tau}, & -N+1 \leq \tau < 0 \end{cases} \quad (1)$$

and the normalized cross-correlation two unique word sequences $\{x_n\}$, $x \in \{-1, +1\}$, $n=0, 1, \ldots, N-1$, and $\{y_n\}$, $y \in \{-1, +1\}$, $n=0, 1, \ldots, N-1$, is given by $$\overline{C}_{xy}(\tau) = \begin{cases} \frac{1}{N} \sum_{n=0}^{N-\tau-1} x_n y_{n+\tau}, & 0 \leq \tau \leq N-1 \\ \frac{1}{N} \sum_{n=0}^{N+\tau-1} x_n y_{n-\tau}, & -N+1 \leq \tau < 0 \end{cases} \quad (2)$$

We will use VoIP (Voice over Internet Protocol) burst, PNB3(1,6) (Packet Normal Burst) to illustrate how vocoder rate can be determined from unique words. However, this invention is not limited to any specific VoIP burst and can be extended to any burst structure that carries known sequences.

Both PNB3(1,3) and PNB3(1,6) support five different burst types while PNB3(1,8) supports three different bursts types. The vocoder rates, traffic type and/or modulation are different for these bursts. A list of all burst types are given below.

PNB3(1,3)
1) 2.45 kbps π/4-QPSK modulated voice
2) 2.45 kbps π/4-QBPSK modulated data
3) π/2-BPSK modulated KAB3
4) 4.0 kbps π/4-QPSK modulated voice
5) 4.0 kbps π/4-QPSK modulated data PNB3(1,3)
1) 2.45 kbps π/2-BPSK modulated voice
2) 2.45 kbps π/2-BPSK modulated data
3) π/2-BPSK modulated KAB3
4) 4.0 kbps π/4-QPSK modulated voice
5) 4.0 kbps π/4-QPSK modulated data PNB3(1,8)
1) 2.45 kbps π/2-BPSK modulated voice
2) 2.45 kbps π/2-BPSK modulated data
3) π/2-BPSK modulated KAB3

Note that by assigning a signature set of unique words to each vocoder rate (burst type), we eliminate the overhead required at the upper layer to distinguish different rates. This novel approach enables the upper layer to support multiple vocoder rates with zero byte header compression. At the receiver, the vocoder rate information can be retrieved entirely from burst classification performed at the physical layer. The positions of unique words for different burst types are depicted in FIG. 28, FIG. 30 and FIG. 32 for PNB3(1,3), PNB3(1,6), and PNB3(1,8), respectively. For example, in PNB3(1,3), two-segment unique words of length 8 and 7 are placed on either side of the payload. Similarly, for PNB3(1,6) and PNB3(1,8), unique word set of (10+11+10) and (8+11+8) are used, respectively. Note that unique words are divided into segments and are positioned far apart from one another so that correlation against the signature sequence can combat channel-induced fading across the burst.

For both PNB3(1,3) and PNB3(1,6), a set of five unique words have seen designed to classify five different burst types. For PNB3(1,8) there are three sets of unique words as there are only three bursts to classify. The set of unique words are presented in Table 1-3. Note that the sequences are given in bit format. For PNB3(1,3), only KAB3(1,3) UW bits are π/2-BPSK modulated while the rest of the bursts are QPSK modulated with no extra π/4-rotation. For PNB3(1,6), 2.45 kbps voice, 2.45 kbps data and KAB3 UW bits are π/2-BPSK modulated while 4.0 kbps voice and 4.0 kbps data UW bits are QPSK modulated with no extra π/4-rotation. For PNB3(1,8), UW bits for all the bursts are π/2-BPSK modulated.

TABLE 1-3

PNB3(1,3), PNB3(1,6) and PNB3(1,8) Unique Word Pattern

| Burst Type | Unique Words | Segment 1 | Segment 2 | Segment 3 |
|---|---|---|---|---|
| PNB3(1,3) | UW 4 (2.45k speech) | 1 0 1 1 0 1 0 0 0 1 0 0 1 0 1 1 | 0 0 0 1 0 0 1 0 1 1 1 0 0 0 | N/A |
| | UW 3 (2.45k data) | 0 1 0 0 0 1 0 0 1 0 0 0 1 0 0 0 | 0 0 1 0 1 1 0 1 1 1 0 1 0 0 | N/A |
| | UW 5 (4.0k speech) | 0 1 1 1 0 1 0 0 1 0 1 1 0 1 1 1 | 1 1 1 0 1 1 1 0 0 0 1 0 0 0 | N/A |
| | UW 1 (4.0k data) | 0 1 0 0 0 1 1 1 0 1 1 1 1 0 1 1 | 1 1 0 1 1 1 0 1 1 1 1 0 1 1 | N/A |
| | UW 2 (KAB3) | 0 0 1 1 0 1 1 0 | 1 1 1 0 1 0 0 | N/A |
| PNB3(1,6) | UW 1 (2.45k speech) | 1 0 0 1 1 0 0 1 1 0 | 1 0 0 1 1 0 0 1 1 0 0 | 1 0 0 1 1 0 0 1 1 0 |
| | UW 2 (2.45k data) | 1 1 1 0 1 0 1 0 0 0 | 1 0 1 0 0 0 1 1 1 0 1 | 1 1 1 0 1 0 1 0 0 0 |
| | UW 4 (4.0k speech) | 1 0 1 1 0 1 1 1 0 1 1 1 0 1 0 0 0 1 0 0 | 0 0 0 1 0 0 1 0 1 1 0 1 0 0 0 1 0 0 1 0 1 1 | 1 1 0 1 0 0 0 1 0 0 0 1 0 0 1 0 0 0 1 0 |
| | UW 5 (4.0k data) | 0 1 0 0 1 0 1 1 1 0 0 0 1 0 0 0 0 1 0 0 | 1 1 1 0 0 0 1 0 1 1 1 0 1 1 0 1 0 0 0 1 1 1 | 0 0 1 0 1 1 0 1 1 1 1 0 1 1 1 0 0 0 1 0 |
| | UW 3 (KAB3) | 0 1 0 1 0 1 1 0 1 0 | 0 0 1 1 0 1 0 1 0 0 1 | 0 1 0 1 0 1 1 0 1 0 |
| PNB3(1,8) | UW 1 (4.0k speech) | 1 0 0 0 1 1 1 0 | 1 0 0 1 1 0 0 1 1 0 0 | 1 0 0 0 1 1 1 0 |
| | UW 2 (4.0k data) | 0 0 1 1 0 1 1 0 | 1 0 1 0 0 0 1 1 1 0 1 | 0 0 1 1 0 1 1 0 |
| | UW 3 (KAB3) | 1 0 0 1 0 0 1 1 | 0 0 1 1 0 1 0 1 0 0 1 | 1 0 0 1 0 0 1 1 |

Receiver Design

The received signal after a frequency non-selective fading channel can be expressed as $$r(t)=w(t)\cdot x(t-\tau)\exp(j(2\pi \hat{f}t+\phi_0))+n(t) \quad (1\text{-}1)$$

where w(t) is the fading induced complex multiplicative factor, $\tau$ is timing offset, $\hat{f}$ is the frequency offset, $\phi_0$ is the phase offset, and n(t) is the complex white Gaussian noise with double-sided power spectral density level of $N_0/2$ (watts/Hz). The parameters $\tau$, $\hat{f}$, and $\phi_0$ are assumed to be constant over each received burst duration but unknown a-priori. The accurate estimation of these parameters is a pre-requisite for the successful demodulation of the burst.

The timing offset, $\tau$, is assumed to be in the range of $[-T_s/2, +T_s/2]]$ and the frequency offset, $\Delta f$, is assumed be in the range of $[-200, +200]$ Hz.

Receiver Design

The receiver performs the following functions in a sequential manner:
 Matched Filter and RSSI Estimation
 Timing Estimation
 Timing Correction by Interpolation and Decimation
 Frequency Estimation and Correction
 Phase Estimation and Correction
 Amplitude Estimation and Correction
 SNR Estimation
 Soft Bit Generation and Symbol Decision The parameter values of PNB3(1,3), PNB3(1,6) or PNB3(1,8) demodulator are summarized in Table 1-4.

TABLE 1-4

PNB3(1, n), n = 3, 6 or 8, Demodulator Parameters

| Module | Parameter Values |
|---|---|
| SQRC Matched Filtering | Number of symbols in a burst: N = 39*n<br>Roll-off factor: α = 0.35, Filter window size: L = 8 symbols<br>Number of samples per symbol: M = 4 |
| RSSI Estimation | Number of symbols used in the RSSI calculation: N − 5<br>Number of samples per symbol: M = 4 |
| Timing Acquisition | Number of samples per symbol: M = 2<br>Correlation based acquisition using UW |
| Timing Tracking. | Number of samples per symbol for symbol timing estimation: M = 4 |
| Interpolation and Decimation | Interpolation filter tap length: I = 16<br>Oversampling factor for interpolation: v = 8<br>Timing uncertainty search range [−T₁, T₁]: T₁ ≈ 21 μsec |
| Burst Classification in Acquisition | Number of samples per symbol: M = 2<br>Correlation based acquisition using UW |
| Burst Classification in Tracking | Number of samples per symbol: M = 1<br>Correlation based acquisition using UW |
| Frequency Acquisition | Number of samples per symbol: M = 1<br>Modulation removed frequency search range: $[-f_\Delta, f_\Delta]$ and step size. $f_\Delta$ = 450 Hz (900 Hz) with step size of 50 Hz (100 Hz) for the initial tracking with BPSK (QPSK). |
| Frequency Tracking | Number of samples per symbol: M = 1<br>Modulation removed frequency search range: $[-f_\Delta, f_\Delta]$ and step size. $f_\Delta$ = 450 Hz (180 Hz) with the step size of 10 Hz (20 Hz) for the steady state tracking with BPSK (QPSK) |
| Phase Estimation | Number of samples per symbol: M = 1<br>UW based phase estimation |
| Second Stage Phase Tracking | Number of samples per symbol: M = 1<br>Length of estimation interval: 59, Relative alignment interval: 9 |
| Amplitude Estimation | Number of samples per symbol: M = 1 |

TABLE 1-4-continued

PNB3(1, n), n = 3, 6 or 8, Demodulator Parameters

| Module | Parameter Values |
|---|---|
| SNR Estimation | Number of symbols used in the SNR calculation: N − 5 |
| Soft Decision Generation | 8 bit quantization |

Note that since the frequency offset is assumed to be much smaller than the symbol rate (200 Hz Vs. 23.4 Ksymbol/sec), the symbol timing can be recovered prior to frequency correction. After the timing offset correction, the rest of the process can be performed at a symbol rate of $T_s^{-1}$. For the reliable estimation of timing and frequency offset, recursive loop filters are used across the received bursts during a call. Note that different values shall be used for the filter coefficients, depending on the channel condition and burst type.

Matched Filter

At the receiver, the signal r(t) is sampled at a rate of $M/T_s$ samples per second (i.e., symbol over-sampled by a factor of M=4). The resultant discrete-time signal, r(n), is passed through a discrete time matched filter $h_{trunc}(n)$, to obtain $$z(n)=r(n)*h_{trunc}(n), n=0,1,\ldots,MN-1 \quad (1\text{-}2)$$

where N is the number of symbols per burst. Note that $h_{trunc}(n)$ is the truncated and time shifted version of the pulse shaping filter given in (1-3) in sampled at the sampling rate $M/T_s$, given by $$h_{trunc}(n) = \frac{\left\{\cos\left(\frac{(1+\alpha)\pi n'}{M}\right) + \frac{N}{4\alpha n'}\sin\left(\frac{(1-\alpha)\pi n'}{M}\right)\right\}}{4\alpha\pi(1/(4\cdot\alpha)^2 - (n'/M)^2)} \text{ for } 0 \leq n \leq LM-1 \quad (1\text{-}3)$$

where n'=n−LM/2+½. Note that the above filter is causal and spans L symbol duration. Due to the power ramp up and down, the guard symbols are not used for the further processing (e.g., timing estimation).

Acquisition Mode

Figure 34:
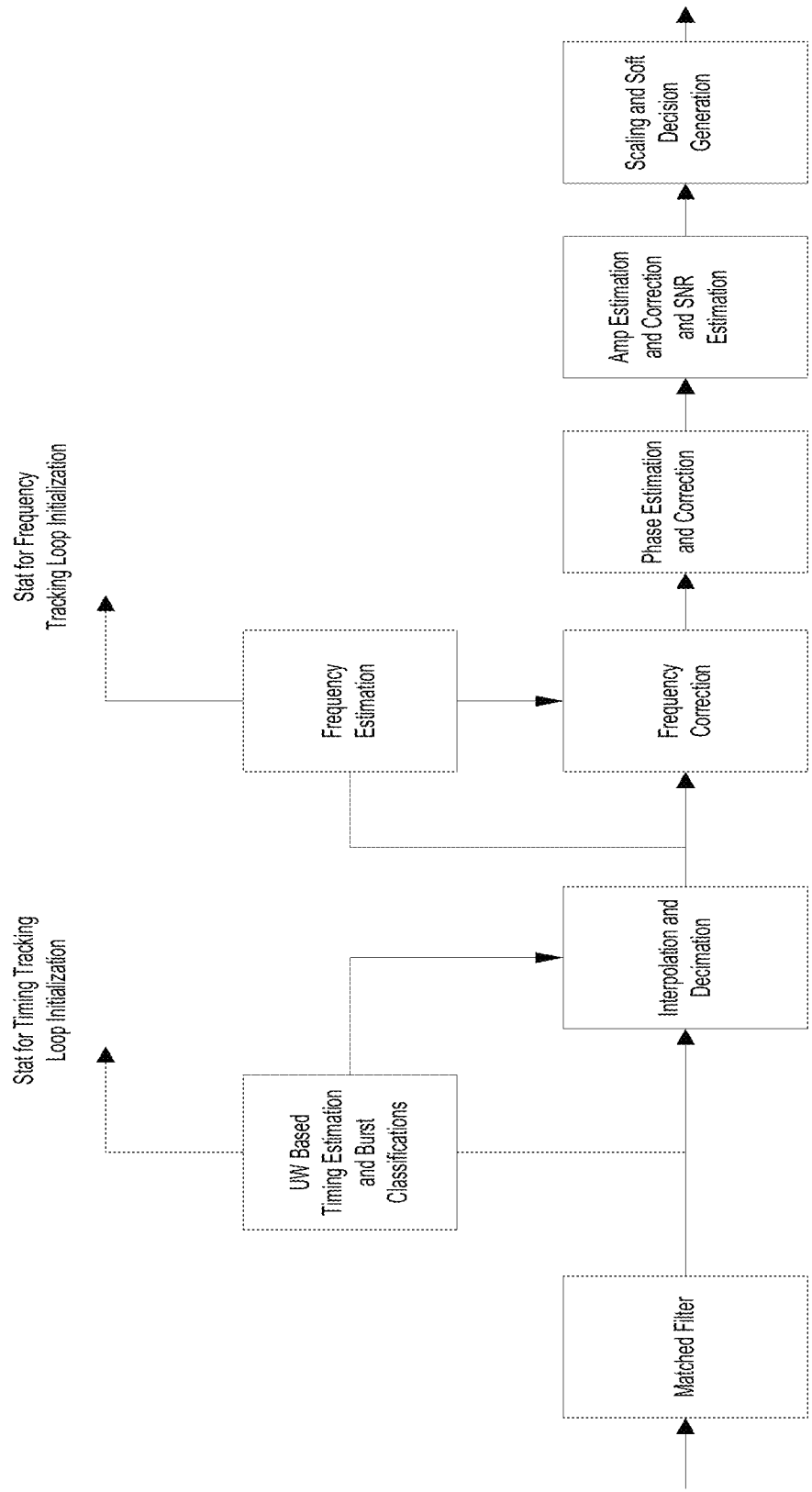

At the beginning of the call setup the receiver operates in the acquisition mode which is depicted in FIG. 34. The acquisition period lasts over the first 50 bursts where receiver attempts to acquire the timing and frequency information and later used for the tracking mode. Burst classification is also performed simultaneously with the timing estimation.

FIG. 34. PNB3(1, n), n=3, 6 or 9, Demodulator in the Acquisition Mode

Timing Acquisition and Burst Classification

In the acquisition mode, the unique word (UW) based correlation approach in employed to retrieve the timing information and burst type simultaneously. The UWs for different burst types are presented in Table 1-3. We will only use PNB3(1,6) as an example burst to explain the algorithm in detail. However, extension to other burst types is straightforward and will not be repeated for brevity.

The unique word portion of the received burst is matched against all the five unique words corresponding to five possible bursts. Let $\{r_0, r_1, \ldots, r_{934}, r_{935}\}$ represent the received burst at the output of the matched filter with 4 samples per symbol. Of this received burst, $\{r_{44}, r_{45}, \ldots, r_{83}\}$, $\{r_{448}, r_{449}, \ldots, r_{491}\}$ and $\{r_{856}, r_{857}, \ldots, r_{895}\}$ represent 4 samples/symbol version of the 1st, 2nd and the 3rd segment of the unique word, respectively. For each burst, the unique word segments are correlated against the corresponding received segments and non-coherently combined according to $$C_{ruw}^i(j) = \left|\sum_{n=0}^{19} r_{2n+44+j} u_n^i\right|^2 + \left|\sum_{n=20}^{41} r_{2n+448+j} u_n^i\right|^2 + \left|\sum_{n=42}^{61} r_{2n+856+j} u_n^i\right|^2, \quad (1\text{-}4)$$

$$1 \leq i \leq 5,$$
$$-2 \leq j \leq 2$$

where $C_{ruw}^i(j)$ denotes the cross-correlation value between the received samples, r, and the i-th unique word samples, $u^i$, for the sample time index j. Note that the indices of the received symbols account for their position in the received burst with respect to the unique word segments. For correlation, uniques word templates of 2 samples/symbol are used which can be generated using the simulator. The received burst is also decimated to have 2 samples/symbol (from 4 samples/symbol) to form the correlation. The sample index j determines the timing offset while the unique word index i determines the burst type by taking the argument of the maximum correlation value.

$$i^*, j^* = \arg\max_{i,j} \{C_{ruw}^i(j)\} \quad (1\text{-}5)$$

where i* denotes the index of the unique word that corresponds to the classified burst and j* determines the timing offset. The coarse timing delay is given by $$\hat{\tau}_{coarse} = \frac{T_s}{4} j^* \quad (1\text{-}6)$$

A fine timing estimation is obtained by 3-point Lagrange interpolator as given by $$\hat{\tau}^{(p)} = (j^* + \Delta t)\frac{T_s}{4} \quad (1\text{-}7)$$

where $$\Delta t = \frac{1}{2} \cdot \frac{C_{ruw}^{i^*}(j^*-1) - C_{ruw}^{i^*}(j^*+1)}{C_{ruw}^{i^*}(j^*-1) + C_{ruw}^{i^*}(j^*+1) - 2C_{ruw}^{i^*}(j^*)} \quad (1\text{-}8)$$

Note that $\Delta t$ should not be greater than 0.5 and has to be set to zero if a numerical error results in a value greater than 0.5.

In the acquisition mode, timing estimates obtained from (1-7) over $N_t$=50 bursts shall be averaged to provide the accurate reference for the tracking mode. During the initial state, the estimate given by (1-7) will be used for the timing compensation.

Symbol Timing Correction by Interpolation and Decimation

Prior to decimation, or symbol sampling, symbol timing adjustment is performed by interpolating the matched filter output. This interpolation is needed since the samples available at the matched filter output for the decimation are only $T_s/M$ apart ($T_s/4$ in our case). To elaborate this point, first let's decompose the estimated symbol timing delay $\hat{\tau}^{(p)}$ in (1-7) as $$\hat{\tau}^{(p)} = \frac{T_s}{M}\hat{k} + \Delta\tau \quad (1\text{-}9)$$

where $0 \leq \Delta\tau < T_s/M$ and $\hat{k}$ is an integer. The expected sample at the symbol timing is $$y(n) = z\left(nT_s + \frac{T_s}{M}\hat{k} + \Delta\tau\right) \quad (1\text{-}10)$$

whereas the available samples are only $$z\left(nT_s + \frac{T_s}{M}\hat{k}\right).$$

Hence the interpolation can be performed to re-construct the sample values at the desired sampling timing $$nT_s + \frac{T_s}{M}\hat{k} + \Delta\tau: \quad (1\text{-}11)$$

$$y(n) = z\left(nT_s + \frac{T_s}{M}\hat{k} + \Delta\tau\right) = \sum_{i=-I}^{I-1} h\left(\frac{T_s}{M}i + \Delta\tau\right) z\left(nT_s + \frac{T_s}{M}(\hat{k}-i)\right)$$

where the truncated sinc filter (I=16) is used for interpolation filter $$h(t) = \frac{\sin(4\pi \cdot t/T_S)}{(4\pi \cdot t/T_S)} \quad (1\text{-}12)$$

To make the interpolation more practical, the interpolation filter are constructed based on the quantized value of $\Delta\tau$, and the interpolation filtering is performed by selecting the closest set of coefficients. Evenly quantizing $\Delta\tau$ to v levels within one sample duration of $T_s/M$ (thus the resolution of $T_s/(\tau M)$), interpolation accuracy down to $T_s/(2 \cdot M \cdot v)$ can be achieved. For the implementation, v=8 shall be used. After symbol timing correction, the rest of the process will be performed at a symbol rate of $T_s^{-1}$ (one complex sample/symbol).

Frequency Estimation

In this function, the followings are performed in the order presented.

De-rotation ($\pi/2$-BPSK to BPSK or $\pi/4$-QPSK to QPSK signal constellation)

Modulation Removal

Frequency offset estimation on modulation removed symbols.

Recursive loop

5. Frequency offset compensation

De-rotation

The output symbols of the interpolator are de-rotated to BPSK or QPSK symbols by $$y_d(n) = y(n)\exp\left(-j\frac{\pi n}{2a}\right) \quad (1\text{-}13)$$

for $n = 0, \ldots, N-6$ where n is an integer denoting the symbol time index, excluding first three guard symbols, a=1(2) for BPSK (QPSK). The first payload symbol index is 0 and this convention will be used for the rest of the document.

Modulation Removal

If we denote the $y_d(n)$ in the polar domain as $$y_d(n)=\rho(n)\cdot \exp(j\phi(n)) \text{ for } n=0,\ldots,N-6 \tag{1-14}$$

The modulation on de-rotated symbols can be removed as follows $$y_m(n)=(\rho(n))^q\cdot \exp(j\cdot r\cdot \phi(n)) \text{ for } n=0,\ldots,N-6 \tag{1-15}$$

where q=2 and r=2a, a=1(2) for BPSK (QPSK). Note that because of the modulation removal process, the frequency offset is effectively doubled and quadrupled for BPSK and QPSK, respectively.

Frequency Estimation on Modulation Removed Symbols and Recursive Loop

The frequency estimation on the modulation removed symbols are performed by DFT around the center frequency of $f_{center}$ with the step size of $\Delta f$ as $$\hat{f}_{DFT}(f_{center}, \Delta f, f_\Delta) = \max_{f_i} \left| \sum_{n=0}^{N-6} y_m(n) \cdot \exp(j2\pi \cdot n \cdot f_i \cdot T_s) \right|^2 \tag{1-16}$$

where the frequency search range is $$f_i \in [f_{center}-f_\Delta,\ldots,f_{center}-\Delta f, f_{center}, f_{center}+\Delta f,\ldots,f_{center}+f_\Delta] \tag{1-17}$$

Note that since the frequency estimate is obtained for the modulation removed signal and $\hat{f}$ is defined for the modulated burst, the output of (1-18) is scaled by a factor of 2a, where a=1(2) for BPSK (QPSK). For the first $N_f$=50 bursts, $f_{center}$=0, $\Delta f$=50a, $f_\Delta$=450a are used for the raw frequency estimation in the acquisition mode, that is $$\hat{f}^{(p)} = \frac{1}{2} \cdot \hat{f}_{DFT}^{(p)}(0, 50a, 450a) \tag{1-18}$$

where a=1(2) for BPSK (QPSK). The majority vote of these $N_f$ raw frequency estimate shall be used for the initial value for the loop initialization (denoted as $\hat{f}^{(init)}$) in the tracking mode.

Frequency Compensation to the Modulated Signal

The frequency offset is compensated by applying the negative of the frequency output from (1-18) to the de-rotated symbols, given by $$u(n)=y_d(n)\exp(-j\cdot 2\pi \hat{f}^{(p)}\cdot n\cdot T_s), n=0,\ldots,N-6 \tag{1-19}$$

After the timing and frequency correction, phase estimation, amplitude correction and soft symbol generation are performed. These steps follow the same procedure both in the acquisition and tracking mode and are described only in the tracking mode in the following sections.

Tracking Mode

Figure 35:
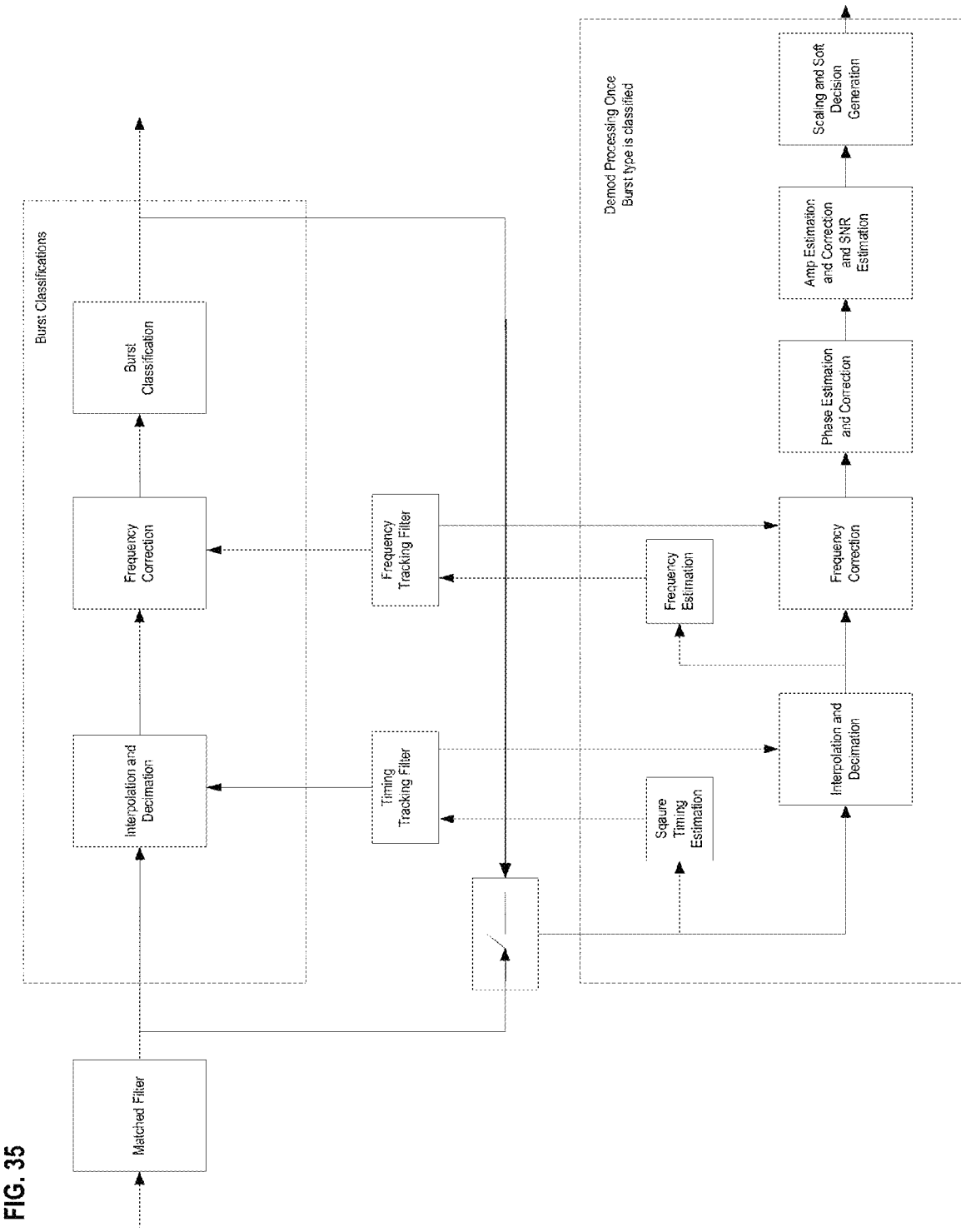

Since timing and frequency errors show some correlation from burst to burst, loop filters are employed in the tracking mode to estimate timing and frequency offset. The filters are initialized with the timing and frequency information obtained from the acquisition mode. The block diagram of the tracking mode is shown in FIG. 35. Unlike the acquisition mode where burst classification is done along with the timing estimation, in the tracking mode burst classification is performed before updating the timing and frequency loops.

FIG. 35. PNB3(1, n), n=3, 6 or 8, Demodulator in the Tracking Mode

Burst Classification

Since timing and frequency errors show some correlation from burst to burst, the timing and frequency corrections obtained from the previous bursts are used to compensate the present burst before burst classification is performed in the tracking mode.

Figure 36:
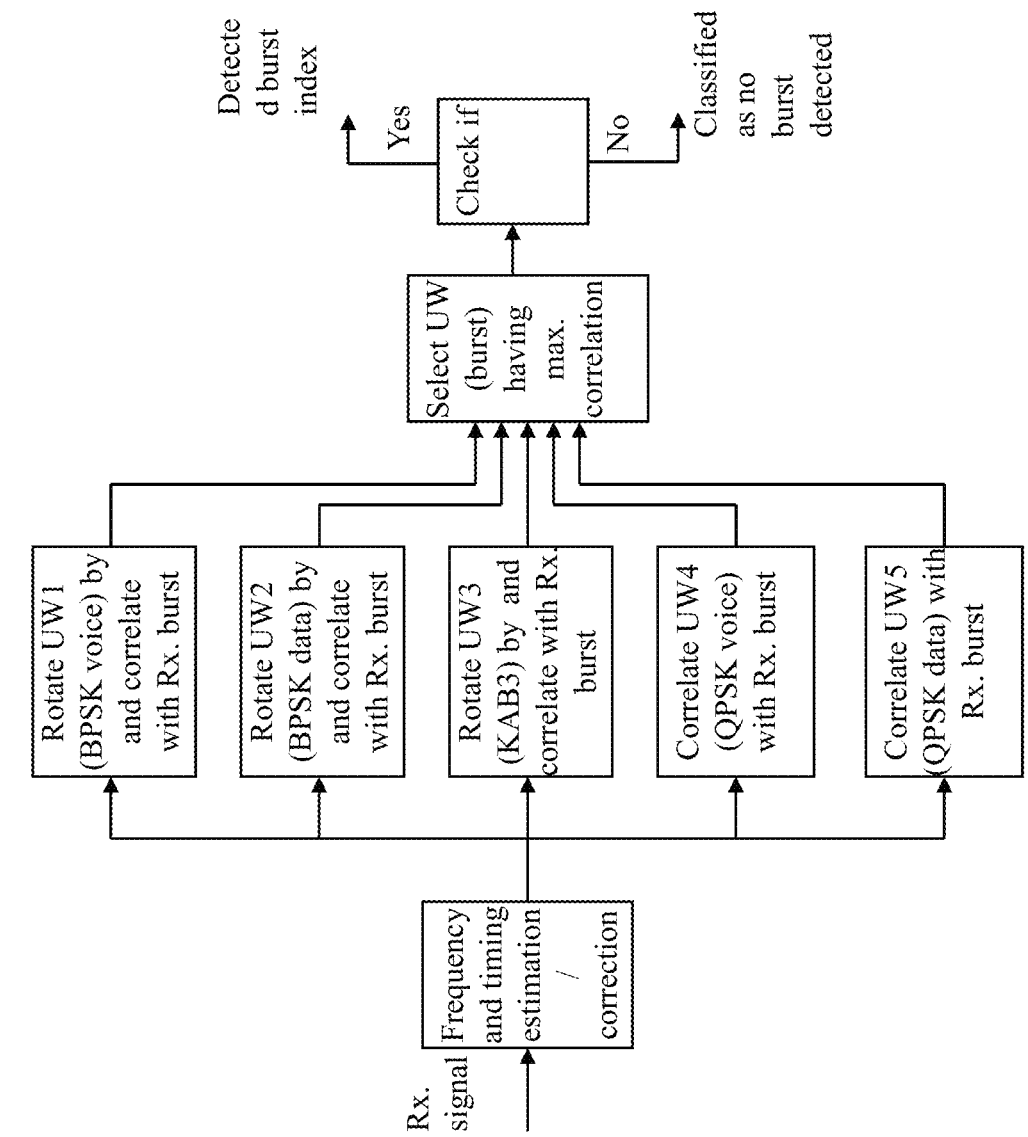

Once again we will use PNB3(1,6) burst to exemplify our algorithm for burst classification. The receiver structure for the tracking mode is illustrated in FIG. 36. Let $\{r_0, r_1, \ldots, r_{227}, r_{228}\}$ represent the received burst (excluding the guard symbols) after frequency and timing correction. Of this received burst, $\{r_8, r_9, \ldots, r_{16}, r_{17}\}$, $\{r_{109}, r_{110}, \ldots, r_{119}\}$ and $\{r_{211}, r_{212}, \ldots, r_{220}\}$ represent the 1st, 2nd and the 3rd segment of the unique word, respectively. For each burst, the unique word segments are correlated against the corresponding received segments according to $$C_{raw}^i = \left|\sum_{n=0}^{9} r_{n+8} u_n^j\right|^2 + \left|\sum_{n=10}^{20} r_{n+109} u_n^j\right|^2 + \left|\sum_{n=21}^{30} r_{n+211} u_n^j\right|^2, \tag{1-20}$$

$$1 \le i \le 5$$

where $C_{raw}^i$ denotes the cross-correlation value between the received symbol, r, and the i-th unique word symbols $u^i$. Note that the indices of the received symbols account for their position in the received burst with respect to the unique word segments. The received burst is classified by the unique word that results in the maximum correlation value $$i^* = \operatorname{argmax}\{C_{raw}^i\} \tag{1-21}$$

$$1 \le i \le 5$$

where i* denotes the index of the unique word that corresponds to the classified burst.

FIG. 36. Burst classification procedure for PNB3(1,6)

After the burst is classified, the correlation value $C_{raw}^{i^*}$ is compared against a threshold. This comparison is necessary since the maximum correlation approach will always result in some burst index even when no burst is transmitted. By comparing against the threshold, the probability of false detection can be minimized. So the classified burst with index i* is declared as detected if $$C_{raw}^{i^*} > \eta \tag{1-22}$$

where $$\eta = \alpha \left( \sum_{i=8}^{17} |r_i|^2 + \sum_{i=109}^{119} |r_i|^2 + \sum_{i=211}^{220} |r_i|^2 \right),$$

and $\alpha$ is a preconfigurable parameter. If the correlation value is too low and Eqn. (1-24) does not hold, the receiver invalidates the classification and no burst detection is declared.

Timing Estimator

The nonlinear square timing estimator is adopted for the tracking mode. With this procedure, the symbol timing can be obtained by simply transforming the phase of a first coefficient of Fourier series of the squared signal envelope. By applying a recursive loop, more stable estimation can be achieved. Instead of directly tracking the timing of each individual burst, the loop performs the estimation by tracking the timing variation from burst to burst. In this section, first we explain the square timing estimation with recursive loop, which estimates the individual burst timing, directly. Then, the algorithm based on the timing variation estimation is explained.

Direct Square Timing Estimator with Recursive Loop

Let $\tau^{(p)}$ denote the timing delay of burst at frame p. The timing delay is can be estimated as $$\tilde{\tau}^{(p)} = -\frac{T_s}{2\pi}\arg(c_1^{(p)}) \quad (1\text{-}23)$$

$c_1^{(p)}$ is the first coefficient of the Fourier Series of $|z(n)|^2$ $$c_1^{(p)} = \sum_{n=3M}^{M(N-2)-1} |z(n)|^2 \cdot \exp(-j2\pi \cdot n/M) \quad (1\text{-}24)$$

where z(n) is the output of matched filter defined in (1-2).

Since the symbol timing delay is not completely independent in practice, a certain level of correlation existed in burst to burst can be exploited in the estimation. The symbol timing estimation of the current burst can be based partially on that established over the previous bursts. This estimation can be achieved by applying a recursive loop $$\hat{\tau}^{(p)} = (1-\gamma_t)\hat{\tau}^{(p-1)} + \gamma_t\tilde{\tau}^{(p)} \quad (1\text{-}25)$$

where $\tilde{\tau}^{(p)}$ is the timing delay of burst at frame p obtained by (1-23) and $\gamma_t$ is a forgetting factor that delineates the memory length of the loop. The estimation of the delay directly may introduce frequent cycle slipping when the delay is close to $\pm T_s/2$. In the tracking mode, the delay variation between the bursts (which is usually much smaller than half symbol period) is estimated.

Timing Variation Estimator with Differential Recursive Loop (for Steady State Tracking)

Let $\hat{\delta}^{(p)}$ denote the variation of timing delay at burst p, $$\delta^{(p)} = \tilde{\tau}^{(p)} - \tilde{\tau}^{(p-1)} \quad (1\text{-}26)$$

Then, the equation (1-24) can be modified by $$\bar{c}_1^{(p)} = e^{(j2\pi\tilde{\tau}_{p-1}/T_s)} \cdot c_1^{(p)} \quad (1\text{-}27)$$

and the timing variation $\hat{\delta}^{(p)}$ becomes $$\hat{\delta}^{(p)} = -\frac{T}{2\pi}\arg(\bar{c}_1^{(p)}) \quad (1\text{-}28)$$

The raw estimate of timing delay of burst p is $$\tilde{\tau}^{(p)} = \hat{\delta}^{(p)} + \hat{\tau}^{(p-1)} \quad (1\text{-}29)$$

Timing Loop Control

By applying the recursive loop as (1-27) and considering (1-29), the output of the timing loop is given by $$\hat{\tau}^{(p)} = (1-\gamma_t)\hat{\tau}^{(p-1)} + \gamma_t\tilde{\tau}^{(p)} = \hat{\tau}^{(p-1)} + \gamma_t\hat{\delta}^{(p)} \quad (1\text{-}30)$$

The tracking loop in (1-30) is to be performed during the steady state only with $\gamma_t = 0.06$.

Symbol Timing Correction by Interpolation and Decimation

The output of the tracking loop is used for timing correction by interpolation and decimation. The interpolation and decimation procedure is described in section 1.3.3.2 where the symbol timing delay $\hat{\tau}^{(p)}$ is given by (1-30).

Frequency Estimator

In this function, the followings are performed in the order presented.

1. De-rotation ($\pi/2$-BPSK to BPSK or $\pi/4$-QPSK to QPSK signal constellation)
2. Modulation Removal
3. Frequency offset estimation on modulation removed symbols.
4. Recursive loop
5. Frequency offset compensation De-Rotation The output symbols of the interpolator are de-rotated to BPSK symbols by $$y_d(n) = y(n)\exp\left(-j\frac{\pi n}{2a}\right), \quad (1\text{-}31)$$

$$n = 0, \ldots, N-6$$

where n is an integer denoting the symbol time index, excluding first three guard symbols, a=1(2) for BPSK (QPSK). The first payload symbol index is 0 and this convention will be used for the rest of the document.

Modulation Removal

If we denote the $y_d(n)$ in the polar domain as $$y_d(n) = \rho(n) \cdot \exp(j\phi(n)) \text{ for } n=0,\ldots,N-6 \quad (1\text{-}32)$$

The modulation on de-rotated symbols can be removed as follows $$y_m(n) = (\rho(n))^q \cdot \exp(j \cdot r \cdot \phi(n)) \text{ for } n=0,\ldots,N-6 \quad (1\text{-}33)$$

where q=2 and r=2a, a=1 for BPSK and a=2 for QPSK. Note that because of the modulation removal process, the frequency offset is effectively doubled and quadrupled for BPSK and QPSK, respectively.

Frequency Estimation on Modulation Removed Symbols and Recursive Loop

The frequency estimation on the modulation removed symbols are performed by DFT around the center frequency of $f_{center}$ with the step size of $\Delta f$ as $$\hat{f}_{DFT}(f_{center}, \Delta f, f_\Delta) = \max_{f_i}\left|\sum_{n=0}^{N-6} y_m(n) \cdot \exp(j2\pi \cdot n \cdot f_i \cdot T_s)\right|^2 \quad (1\text{-}34)$$

where the frequency search range is $$f_i \in [f_{center} - f_\Delta, \ldots, f_{center} - \Delta f, f_{center}, f_{center} + \Delta f, \ldots, f_{center} + f_\Delta] \quad (1\text{-}35)$$

The recursive loop similar to one used in the timing estimation is used for more reliable estimate:

$$\hat{f}^{(p)} = (1-\gamma_f)\hat{f}^{(p-1)} + \gamma_f \cdot \hat{f}_{DFT}^{(p)}(f_{center}, \Delta f, f_\Delta) \cdot \frac{1}{2a} \quad (1\text{-}36)$$

where a=1(2) for BPSK (QPSK).

Note that factor of 2a in (1-36) is needed since the frequency estimate is obtained for the modulation removed signal, where as $\hat{f}$ is defined for the modulated burst. Note that in the tracking mode, the estimation is performed around the estimate from the previous burst with much smaller search range and finer step size.

Frequency Loop Control

The forgetting factor $\gamma_f$ is set to 0.26 and 0.03 for BPSK and QPSK modulation, respectively, for the steady state tracking Frequency Compensation to the Modulated Signal The frequency offset is compensated by applying the negative of the frequency loop output to the de-rotated symbols, given by $$u(n)=y_d(n)\exp(-j\cdot 2\pi \hat{f}^{(p)}\cdot n\cdot T_s), n=0,\ldots,N-6 \quad (1\text{-}37)$$

Outage Handling

The outage detection is used for controlling both timing and frequency synchronization loop filters.

The outage detection metric is calculated as an average of differential timing estimate magnitude obtained during the timing estimation, given by:

$$\hat{\Phi}_L(n) = \frac{1}{L}\sum_{j=n-L+1}^{n}|\hat{\delta}_j|, \quad (1\text{-}38)$$

where n is the time index (i.e., frame number), L=25 is the number of samples for the averaging, and $\hat{\delta}_j$ is differential timing estimate given by (1-28). The outage detection decision is made by comparing (1-38) with the decision threshold. For added robustness, different threshold values are used for entering the outage state from normal, and for exiting from an outage state. In addition, multiple observation of (1-38) is used for final outage decision.

The algorithm is as follows

Declare Outage at frame number n: if N(n)=0. Otherwise, declare Non-outage, where $$N(n) = \sum_{m=0}^{M-1} D(n-m)$$

is the multiple observation counter, where local outage state flag, D(n), is set with the following rule (D(n)=1 means no local outage and D(n)=0 means local outage):

When D(n−1)=1: If $\hat{\Phi}_L(n) > Th_0$ D(n)=0. Else D(n)=1

When $D(n-1)=0$: If $\hat{\Phi}_L(n) > Th_1$ D(n)=0 Else $D(n)=1$ (1-39)

where $Th_0$ and $Th_1$ are listed in Table 1-5 for each burst type, and M=10. Its state diagram is shown in FIG. 37.

Figure 37:
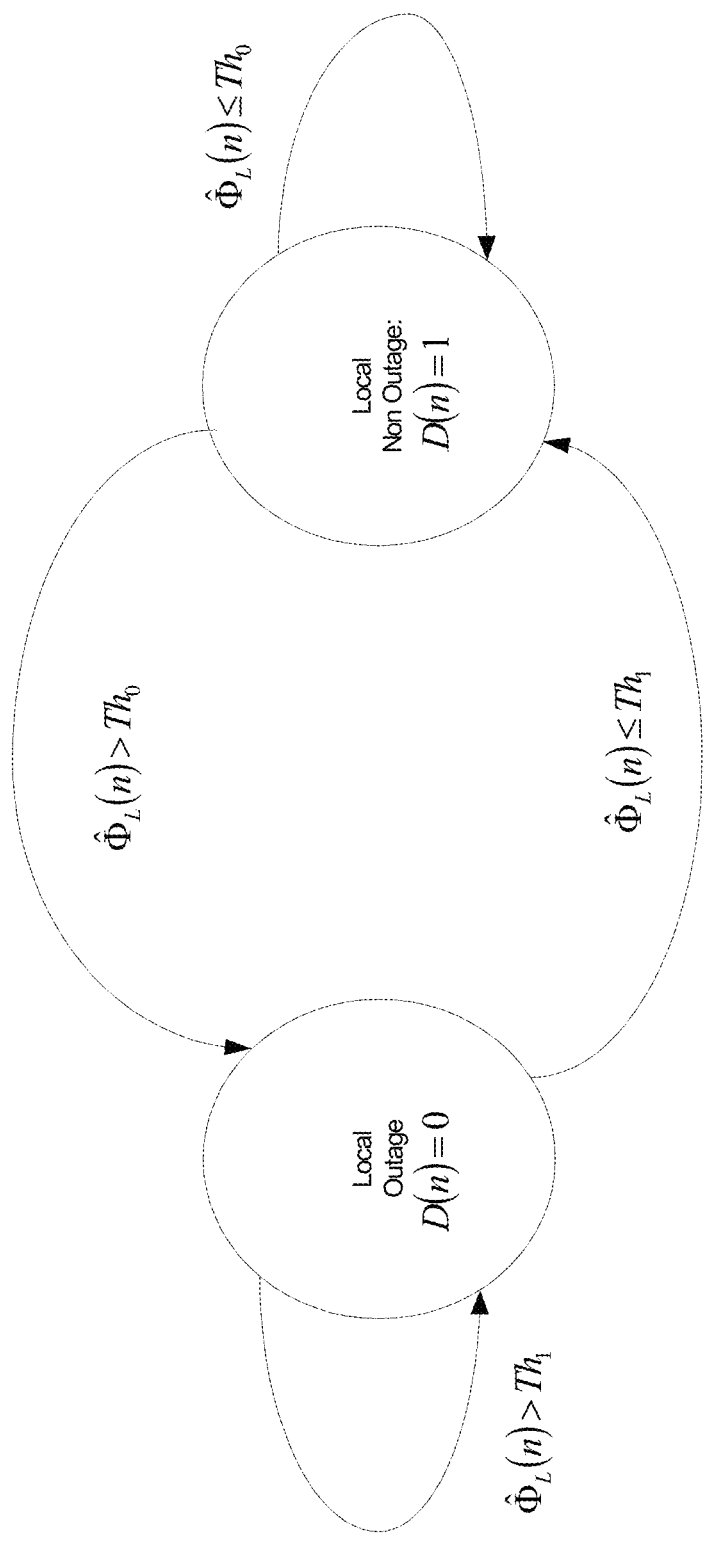

FIG. 37. Local Outage State Diagram

Note that the outage detection shall start only after the loop initializations are done: 35 burst after loop initialization.

TABLE 1-5

Threshold Parameters for DCH Bursts

| Threshold values | Burst types | | |
|---|---|---|---|
| | DCH3(1, 3) | DCH3(1, 6) | DCH3(1, 8) |
| $Th_0$ | 10.5 | 10.5 | 10.5 |
| $Th_1$ | 6.5 | 7.5 | 7.5 |

Synchronization Loop Parameter Control

The synchronization control parameter, the forgetting factor, in the synchronization loop for both timing and frequency shall be adaptively changed to yield improved performance.

The main triggers for adjusting the forgetting factor values are:

Burst type change: from KAB3 to Non-KAB3 (DTCH and DACCH) or vice versa.

Outage state change: in or out of the outage.

Loop state: initial or steady.

This is due to the fact that the frequency and timing estimation from KAB3 may not be as reliable as those from the other burst types, and this may require more averaging (small value for the forgetting factor). In addition, the estimation during the outage degrades which is not accurate enough for further processing.

The determination of the loop state will be solely based on the number of the burst received. For, example, if the receiver receives more than 50 bursts, then the state of the loop is considered to be in the steady state. It should be noted that when the outage is over, the received burst counter shall be set to be zero so that loop will always go through the loop initialization period.

Frequency Synchronization Control

Different values of frequency loop forgetting factors depending on the state and burst type transition are listed in Table 1-6.

TABLE 1-6

Frequency Forgetting Factors for Transitions Between Outage and Non-Outage

| State | | Burst Type Change | | | |
|---|---|---|---|---|---|
| | | Non-KAB3 → KAB3 | KAB3 → KAB3 | Non-KAB3 → Non-KAB3 | KAB3 → Non-KAB3 |
| Outage (see Note 1 and 2) | | N/A | N/A | N/A | N/A |
| Non-outage | $n_c \leq N_f$ (see Note 3) | N/A | N/A | N/A | N/A |
| | $n_c > N_f$ (see Note 4) | $\gamma_f = 0.26$ | $\gamma_f = 0.26$ | $\gamma_f = 0.10$ for QPSK $\gamma_f = 0.26$ for BPSK | $\gamma_f = 0.10$ for QPSK $\gamma_f = 0.26$ for BPSK |

Note 1:
During the outage, the loop output value at frame number $p_0 - N_d$ shall be used for the frequency offset compensation where $p_0$ is the frame number when the outage happens. That is, frequency offset estimate at frame number p (where $p \geq p_0$) shall be $\hat{f}_p = \hat{f}_{p_0-N_d}$ where $N_d = 35$. The reason for non-zero $N_d$ is to account for the delay in the outage detection so that unreliable information is not used.

Note 2:
After the outage, the received burst counter will be set to $n_c = 0$. The burst counter $n_c$ is incremented by one for every burst received.

Note 3:
During the initialization (i.e., $n_c \leq N_{fi}$ where $N_{fi} = 50$), the DFT frequency search range for modulated signal shall be performed for [−225 Hz, 225 Hz] with the step size of 45 Hz (25 Hz)[1], whereas steady state (i.e., $n_c > N_f$) the DFT frequency search range for modulated signal shall be [−45 Hz, 45 Hz] around the initial estimate with the step size of 9 Hz (5 Hz). Note that during the initialization, the frequency loop shall not be used. The most frequently reported raw frequency estimate among $N_f$ number of received bursts shall be used as the initial loop value for the steady state.

Note 4:
In the steady state, the tracking loop output is updated as follows: $\hat{f}^{(n_c)} = (1 - \gamma_f)\hat{f}^{(n_c-1)} + \gamma_f \cdot \hat{f}_{n_c}$ for $n_c > N_f(1\text{-}40)$ where $\hat{f}_{n_c}$ is the raw frequency estimate of the current burst, and $\hat{f}^{(n_c-1)}$ is the frequency loop output of the previous burst. Note that $\hat{f}^{(N_f)}$ is the loop initial value obtained from the majority vote during the loop initialization period.

Note 5:
The outage detection will be activated from frame number $n = N_d - L + \max(N_f, N_f)$ (where $N_d > L$) and the outage detection values will be available from frame index: $n = N_d + \max(N_f, N_f)$. This is to ensure that the outage detection uses reliable timing outputs from the steady state.
[1] 45 Hz corresponds to 11 frequency bins in the acquisition phase while 25 Hz corresponds to 19 bins.

In summary, the above Table 1-6 can be simplified to Table 1-7.

TABLE 1-7

Forgetting Factors for Frequency Loop Control

| State | | Burst Type Change Non-KAB3 ↔ KAB3 |
|---|---|---|
| Outage | | N/A |
| Non-outage | $n_c \leq N_f$ | N/A |
| | $n_c > N_f$ | $\gamma_f = 0.10$ for QPSK $\gamma_f = 0.26$ for BPSK |

Timing Synchronization Control

Different values of timing loop forgetting factors depending on the state and burst type transition are listed in Table 1-8.

TABLE 1-8

Timing Forgetting Factors for Transitions Between Outage and Non-Outage

| Outage State | | Burst Type Change | | | |
|---|---|---|---|---|---|
| | | Non-KAB3 → KAB3 | KAB3 → KAB3 | Non-KAB3 → Non-KAB3 | KAB3 → Non-KAB3 |
| Outage (see Note 1 and 2) | | $\gamma_t = 0.06$ | $\gamma_t = 0.06$ | $\gamma_t = 0.06$ | $\gamma_t = 0.06$ |
| Non-outage | $n_c \le N_t$ (see Note 3) | N/A | N/A | N/A | N/A |
| | $n_c > N_t$ (see Note 4) | $\gamma_t = 0.06$ | $\gamma_t = 0.06$ | $\gamma_t = 0.06$ | $\gamma_t = 0.06$ |

Note 1:
During the outage, the loop is not updated. Instead, the loop output value at frame number $p_0 - N_d$ shall be used for the timing offset compensation where $p_0$ is the frame number when the outage happens. That is, the timing offset estimate at frame number p shall be $\hat{\tau}^{(p)} = (1 - \gamma_t) \cdot \hat{\tau}^{(p_0 - N_d)} + \gamma_t \cdot \tilde{\tau}^{(p)} = \hat{\tau}^{(p_0 - N_d)} + \gamma_t \cdot \delta^{(p)}$ (1-41) where $N_d = 35$.

Note 2:
After the outage, the received burst counter will be set to $n_c = 0$. The burst counter $n_c$ is incremented by one for every burst received.

Note 3:
The average of timing estimates among $N_t$ (=50) bursts shall be used as the initial timing value for the tracking filter.

Note 4:
In the steady state, the timing tracking loop output is updated as follows: $\hat{\tau}^{(n_c)} = (1 - \gamma_t) \hat{\tau}^{(n_c - 1)} + \gamma_t \tilde{\tau}^{(n_c)} = \hat{\tau}^{(n_c - 1)} + \gamma_t \delta^{(n_c)}$ for $n_c > N_t$ (1-42) where $\tilde{\tau}^{(n_c)}$ is the raw timing estimate of the current burst, and $\hat{\tau}^{(n_c - 1)}$ is the timing loop output of the previous burst. Note that $\hat{\tau}^{(N_t)}$ is the loop initial value, which is the mean of the timing estimates during the loop initialization period ($n_c \le N_t$).

Note 5:
Same as Note 5 in frequency synchronization control.

In summary, Table 1-8 can be simplified to Table 1-9.

TABLE 1-9

Forgetting factor for timing loop control

| State | | Burst Type Change Non-KAB3 ↔ KAB3 |
|---|---|---|
| Outage | | $\gamma_t = 0.06$ |
| Non-outage | $n_c \le N_t$ | Open loop |
| | $n_c > N_t$ | $\gamma_t = 0.06$ |

Phase Estimation and Compensation

After compensating time and frequency, the residual phase error is estimated and compensated. Five phase estimates are computed based on known symbols in the burst (i.e., UWs). These values are linearly interpolated to compensate the phase for the symbols between UW segments. The phase estimates $\theta_n$ are obtained by taking the angle of the correlation values as $$\theta_n = \arctan\left(\sum_{i=0}^{Luw_n - 1} u(Iuw_n + i) \cdot UW_n^*(i)\right), \quad (1-43)$$

$$n \in \{1, 2, \ldots, N_m\}$$

where $N_m$ is the number of UW segments in PNB3(1, n) bursts defined in Table 1-3, and the u(i) represents the frequency error compensated output sequence, and $Iuw_n$ represents the starting indexes for received symbol corresponding to n-th UWs, and arctan(●) returns a value in $(-\pi, \pi)$. In order to avoid a modulo $2\pi$ problem in interpolating phase values, the following unwrapping formula is used for $n \in \{2, \ldots, N_m\}$:

$$\theta_n' = \theta_n + \left[\frac{\theta_{n-1} - \theta_n}{\pi}\right] \cdot 2\pi \quad (1-44)$$

where [x] denotes the operation of taking integer part of x. For compensating the phase of the symbols between each phase estimate on UWs, the linearly interpolated phase values given below are applied to the sequence u via $\exp(-j\theta(i))$:

$$\vartheta(i) = \begin{cases} \theta_1 & \text{for } i \le X_1 \\ \theta_n + (\theta_{n+1}' - \theta_n) \cdot \frac{(i - X_n)}{X_{n+1} - X_n} & \text{for } X_n < i \le X_{n+1} \\ \theta_{N_m}' & \text{for } i > X_{N_m} \end{cases} \quad (1-45)$$

$$n \in \{1, 2, \ldots, N_m - 1\}$$

where $X_n$ is the time index of the middle symbol in the n-th UW segment given by $$X_n = Iuw_n + \frac{1}{2} Luw_n \quad (1-46)$$

Note that $X_n$ does not have to be an integer and can be real value. The phase corrected symbol is denoted by $$\hat{u}(n) = u(n) \exp(-j \cdot \theta(n)) \quad (1-47)$$

Tentative Symbol Decision

For BPSK modulated bursts, the real part of samples $\hat{u}(n)$ in (1-47) is taken to yield the soft decision bits $\hat{d}(n)$:

$$d(n) = \Re\{\hat{u}(n)\}, \quad 0 \le n \le N-6 \quad (1-48)$$

Based on the samples, $\hat{d}(n)$, the detected BPSK symbols are obtained at the output of the symbol-mapping device given in Table 1-10.

TABLE 1-10

Demodulated Symbol Decision (BPSK)

| Detected BPSK Symbol | Range of the phase-rotated samples, $\hat{v}(n)$ |
|---|---|
| $\exp(j \cdot \pi \cdot 0)$ | $\hat{d}(n) \ge 0$ |
| $\exp(j \cdot \pi \cdot 1)$ | $\hat{d}(n) < 0$ |

For QPSK modulated bursts, the samples $\hat{u}(n)$ in (1-44) is first phase-rotated by $\pi/4$:

$$\hat{v}(n) = v_I(n) + jv_Q(n) = \hat{u}(n) \cdot \exp\left(j\frac{\pi}{4}\right), \quad 0 \le n \le N-6 \quad (1-49)$$

Based on the samples, $v_I(n)$ and $v_Q(n)$, the detected QPSK symbols are obtained from the symbol-mapping device given in Table 1-11.

TABLE 1-11

Demodulated Symbol Decision (QPSK)

| Detected QPSK Symbol $s_k$ | Detected QPSK SYMBOL INDEX | Range of the phase-rotated samples $v_I$, $v_Q$ |
|---|---|---|
| $e^{j\pi 0/2}$ | 0 | $v_I \geq 0$, $v_Q \geq 0$ |
| $e^{j\pi/2}$ | 1 | $v_I < 0$, $v_Q \geq 0$ |
| $e^{j2\pi/2}$ | 2 | $v_I < 0$, $v_Q < 0$ |
| $e^{j3\pi/2}$ | 3 | $v_I \geq 0$, $v_Q < 0$ |

Second-Stage Phase Tracking

The second-stage phase tracking is performed by using the tentative decisions of payload symbols and unique words. The tentative decisions or the unique words are correlated against the corresponding intial phase corrected received symbols to obtain $$w(k) = \hat{u}_k s_k^* \qquad (1\text{-}50)$$

where $s_k$ is the complex constellation point for unique word symbol or the tentative decision for the payload symbols, $\hat{u}_k$ is the initial phase corrected received symbol.

Let $L_{est}$ and $L_{step}$ denote, in term of number of symbols, the length of estimation interval and relative alignment of two consecutive blocks respectively. Here two types of blocks are defined:

Estimation block $I_k$

Phase block $B_k$.

The former is the interval of estimation while the latter is the interval to distinguish the phase variation. To obtain stable estimation, $L_{est}$, the length of estimation interval is bigger than that of phase block, and thus there is an overlap between two consecutive estimation intervals. The delineated blocks for phase estimation within one burst are shown in FIG. 38.

Figure 38:
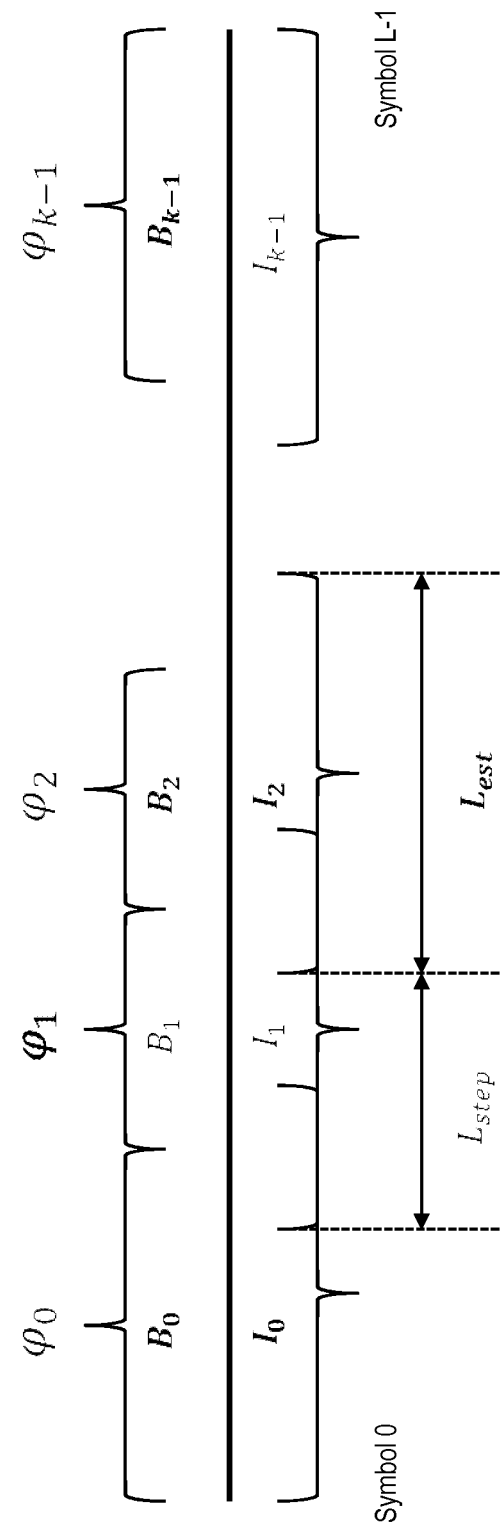

FIG. 38. Blocks Delineation within One Burst for Phase Tracking

With $L_{est}$ selected as an odd number, the phase of the midpoint of each estimation block can be obtained by unwrapping the averaged phasors within that block $$\phi_k = \arg\left(\sum_{i \in I_k} w(i)\right), k = 0, \ldots, K-1 \qquad (1\text{-}51)$$

$$\hat{\phi}_k = \hat{\phi}_{k-1} + (\phi_k - \phi_{k-1}) - 2\pi \cdot \text{int}\left\{\frac{(\phi_k - \phi_{k-1})}{\pi}\right\}, \qquad (1\text{-}51)$$
$$1 \leq k \leq K-1$$

where $\hat{\phi}_0 = \phi_0$, $\text{int}\{X\}$ denotes the integer part of X, and K is the total number of phase blocks over each PNB3(1, n), n=1,3, or 8, burst. Each estimation interval $I_k$ is composed as $$I_k = \{kL_{step} \leq i \leq kL_{step} + L_{est} - 1\} \; 0 \leq k \leq K-1 \qquad (1\text{-}53)$$

and the phase blocks $B_k$ are composed by $$B_k = \begin{cases} \{i | 0 \leq i \leq L_{est}/2 + L_{step}/2 - 1\}, k = 0 \\ \{i | L_{est}/2 + (k-1/2)L_{step} \leq i \leq L_{est}/2 + (k+1/2)L_{step} - 1\}, \\ \qquad 1 \leq k \leq K-2 \\ \{i | L_{est}/2 + (k-1/2)L_{step} \leq i \leq L-1\}, k = K-1 \end{cases} \qquad (1\text{-}54)$$

For all the burst types, $L_{step}=9$, $L_{est}=59$. After phase compensation u'(n) results from û(n).

Amplitude Estimation and Compensation

Tentative symbol decisions on the payload symbols are made after the second stage phase tracking as described in Section 1.4.3.7. The unique word symbols and the tentative payload symbols are utilized for the amplitude estimation. An estimate of the amplitude gain η is given by:

$$\eta = \frac{\left|\sum_{k=0}^{K-1} u'_k s_k^*\right|}{\sum_{k=0}^{K-1} |s_k|^2} \qquad (1\text{-}55)$$

where $s_k$ is the complex constellation point for the corresponding unique word symbol or for the tentative symbol decision.

The demodulated symbol in each burst, u'(n) is scaled by 1/η to obtain new symbol r(n)

$$r(n) = u'(n)/\eta \qquad (1\text{-}56)$$

SNR Estimation

Given received signal samples (after demod timing, frequency, phase, and amplitude correction), $r_k$, k=0, 1, ..., K−1, and transmitted bits $s_k$, k=0, 1, ..., K−1, it is straightforward to show that the maximum-likelihood estimate λ of the channel gain is given by $$\lambda = \frac{\left|\sum_{k=0}^{K-1} r_k s_k^*\right|}{\sum_{k=0}^{K-1} |s_k|^2} \qquad (1\text{-}57)$$

Given η, $r_k$ and $s_k$, the maximum-likelihood estimate $\sigma^2$ of the noise variance is $$\sigma^2 = \frac{1}{K}\sum_{k=0}^{K-1} |r_k - \lambda s_k|^2 \qquad (1\text{-}58)$$

Similarly, given λ and $s_k$, the average signal energy $\mu^2$ is given by $$\mu^2 = \frac{1}{K}\lambda^2 \sum_{k=0}^{K-1} |s_k|^2 \qquad (1\text{-}59)$$

Taking the ratio of $\mu^2$ and $\sigma^2$, the estimated SNR is given by $$SNR_{init} = 10 \log_{10}\left(\frac{\mu^2}{\sigma^2}\right) = 10 \log_{10}\left(\frac{\lambda^2 \sum_{k=0}^{K-1} |s_k|^2}{\sum_{k=0}^{K-1} |r_k - \lambda s_k|^2}\right) \qquad (1\text{-}60)$$

The transmit symbol $s_k$ is in general unknown a priori, but they can be estimated at the receiver:

Known symbols. The case where the sample indexes represent the known pilot symbols. True values are used for $s_k$.

Unknown (data or payload) symbols. The case where the sample indexes represent the unknown data symbols in the burst. The choice for the values $s_k$:

Hard decision values of the demodulator output are used for $s_k$. This is the case for conventional SNR estimator and referred to as "Blind EVM scheme".

All the symbols in the burst, except guard symbols, are used for the SNR estimation. From (1-55) and (1-56) in (1-57), it is easy to find that λ in (1-57) becomes unity for a single path receiver (no diversity), and thus on-line computation can be avoided. However, for the diversity combined path SNR estimation (described in a later Section), on-line calculation of λ is required.

Usually, at low SNR, the SNR estimator exhibits a high bias, and this bias can be removed by applying the linearizer. The linearizer can be realized by a memoryless mapping function, denoted by $L(SNR_{init})$. Then, the linearized SNR estimate is given by $$SNR_{dB} = L(SNR_{init}) \quad (1\text{-}61)$$

The purpose of the linearizer is to reduce the bias such that the mean of the estimator is the same as the actual channel SNR.

The linearizing function L is implemented as a look-up table with $N_{LUT}$ rows; hence given the measured value $SNR_{init}$, the index into the look-up table is $$\text{index} = \begin{cases} 0 & SNR_{init} < SNR_{LUT}^{MIN} \\ N_{LUT} - 1 & SNR_{init} > SNR_{LUT}^{MAX} \\ \left\lfloor \frac{SNR_{init} - SNR_{LUT}^{MIN}}{SNR_{LUT}^{RES}} + 0.5 \right\rfloor & \text{Otherwise} \end{cases}$$

where $SNR_{LUT}^{MIN} = -7$ dB, $SNR_{LUT}^{MAX} = 20$ dB, $SNR_{LUT}^{RES} = 0.1$ dB, and $N_{LUT} = 271$. The linearized value is then read out as L[index]. The linear version of the linearized SNR is given by $$SNR_{lin} = 10^{0.1 \ast SNR_{dB}} \quad (1\text{-}62)$$

Symbol Decision and Soft Bit Generation

For BPSK modulated bursts, all the relevant information can be obtained from the real part of the samples r(n) given by (1-56). So the soft decision bits $\hat{d}(n)$:

$$\hat{d}(n) = \Re\{r(n)\}, 0 \le n \le N-6 \quad (1\text{-}63)$$

For QPSK modulated bursts, r(n) given by (1-56) is first phase-rotated by π/4:

$$\hat{v}(n) = v_I(n) + jv_Q = r(n) \cdot \exp\left(j\frac{\pi}{4}\right), 0 \le n \le N-6 \quad (1\text{-}64)$$

The in-phase and q-phase of the signal is flipped to yield:

$$\hat{d}(n) = v_Q(n) + jv_I(n), n = 0, \ldots, N-6 \quad (1\text{-}65)$$

The real part of $\hat{d}(n)$ corresponds to the soft bit of even index bits and imaginary part of $\hat{d}(n)$ corresponds to the soft bit of odd index bits, where the first bits of the burst, excluding guard bits, is assumed to start with index 0 (even index).

Based on the samples $\hat{d}(n)$, the detected symbols are obtained as described in a previous Section from Table 1.10 and Table 1.11 for BPSK and QPSK, respectively.

For BPSK modulated bursts, the soft bits are scaled as $$d'(n) = \hat{d}(n) 2 \cdot SNR_{lin} \quad (1\text{-}66)$$

While for QPSK modulated bursts, the soft bits are scaled as $$v'_I(n) = v_I(n) \cdot 2\sqrt{2} \cdot SNR_{lin}$$

$$v'_Q(n) = v_Q(n) \cdot 2\sqrt{2} \cdot SNR_{lin}$$

$$d'(n) = v'_Q(n) + jv'_I(n) \quad (1\text{-}67)$$

where $SNR_{lin}$ is the linear, estimated SNR from (1-61).

Soft Bit Generation

The scaled, soft bits are quantized into $W_{PRI} = 8$ bit signed integer values (i.e., they are represented in integer values between −128 and 127). For BPSK this representation is given by $$\{\Re\{\tilde{d}(0)\}, \Re\{\tilde{d}(1)\}, \ldots, \Re\{\tilde{d}(N-6)\}\} \quad (1\text{-}68)$$

where $\Re\{X\}$ denotes the real part of complex variable X and

However, for QPSK the information is imbedded both in real and imaginary parts and the soft bit representation is modified as $$\{\Re\{\tilde{d}(0)\}, \Im\{\tilde{d}(0)\}, \Re\{\tilde{d}(1)\}, \Im\{\tilde{d}(1)\}, \ldots, \Re\{\tilde{d}(N-6)\}, \Im\{\tilde{d}(N-6)\}\} \quad (1\text{-}69)$$

where $\Re\{X\}$ and $\Im\{X\}$ denotes the real and imaginary part of complex variable X and $$\tilde{d}(n) = \text{int}\{I_{PRI} \cdot d'(n)\} \quad (1\text{-}70)$$

where the function int{ } quantizes its argument with a floor of $-2^{W_{PRI}}$ and a ceiling of $2^{W_{PRI}} - 1$ and $I_{PRI}$ is 8.

The quantization translates the unit valued soft bits ($\hat{d}(n)$) into integer values between $-I_{PRI}$ to $I_{PRI} - 1$. The remaining integer values (from $-2^{W_{PRI}}$ to $-I_{PRI} - 1$ and from $I_{PRI}$ to $2^{W_{PRI}} - 1$) are used to allow for the headroom given by the multiple 2. SNR. These quantized bits are then fed to the Viterbi decoder.

Two-Path Polarization Diversity Combining

Figure 39:
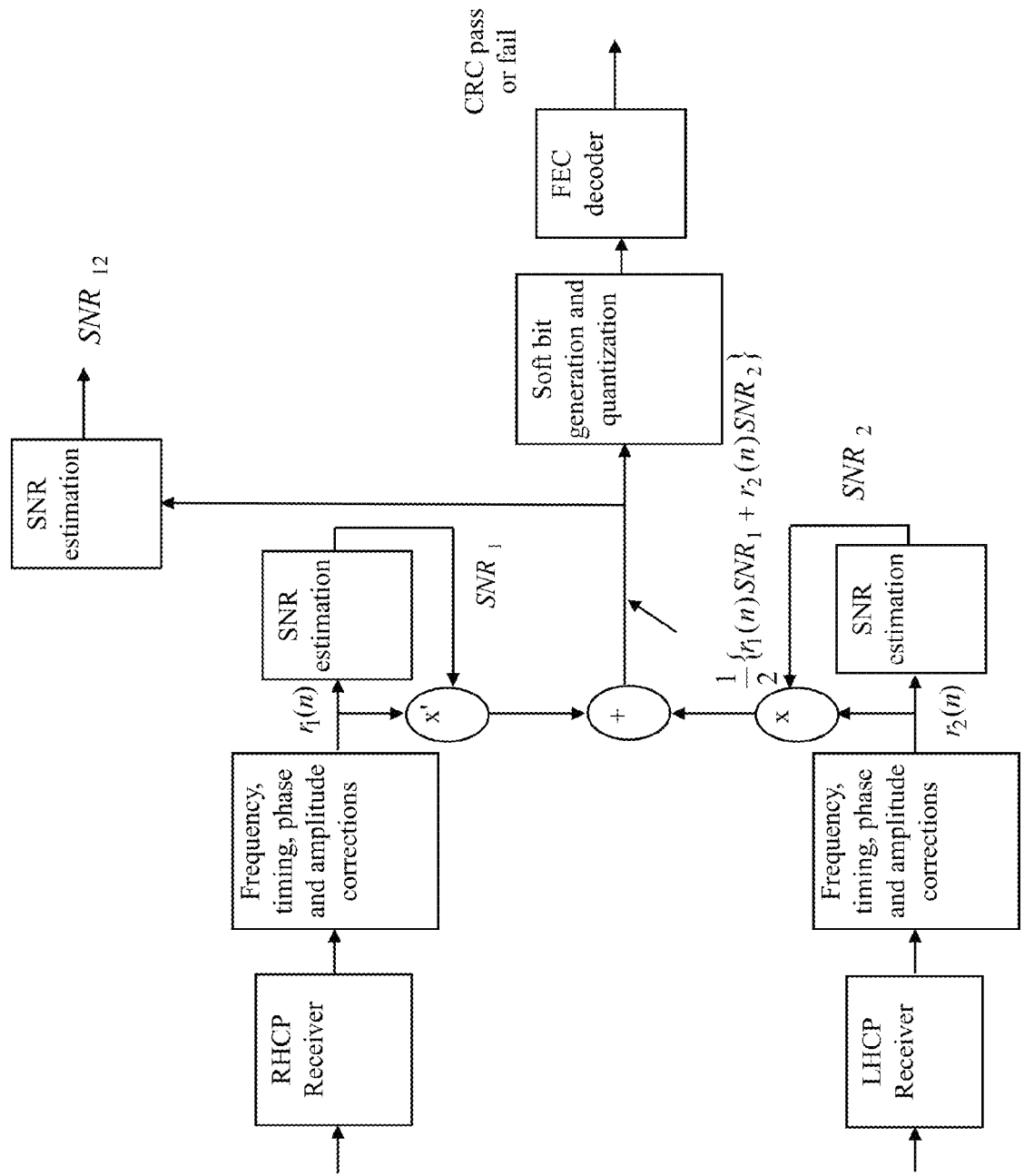

Two-path polarization diversity combining is depicted in FIG. 39. The two demod outputs, after timing, frequency, phase and amplitude corrections, are scaled by their respective SNR estimations and added to generate the combined output r.sub.12 according to $$r_{12}(n) = \frac{1}{2}\{r_1(n)SNR_1 + r_2(n)SNR_2\} \quad (1\text{-}71)$$

where $r_1$ and $r_2$ are the amplitude scaled outputs given by (1-56) for path 1 and path 2, respectively.

For BPSK modulated bursts, the real part of the combined output $r_{12}$ in (1-71) is taken to yield the soft decision bits $\hat{d}_{12}(n)$:

$$\hat{d}_{12}(n) = \Re\{r_{12}(n)\}, \quad (1\text{-}72)$$

For QPSK modulated bursts, as before, the combined output $r_{12}$ is first phase-rotated by π/4

$$\hat{v}_{12}(n) = v_I(n) + jv_Q(n) = r_{12}(n) \cdot \exp\left(j\frac{\pi}{4}\right) \quad (1\text{-}73)$$

The in-phase and q-phase of the signal is flipped to yield:

$$\hat{d}_{12}(n) = v_Q(n) + jv_I(n), n = 0, \ldots, N-6 \quad (1\text{-}74)$$

The real part of $\hat{d}_{12}$ corresponds to the soft bit of even index bits and imaginary part of $\hat{d}_{12}$ corresponds to the soft bit of odd index bits.

Based on the samples $\hat{d}_{12}(n)$, the detected BPSK and QPSK symbols for the combined path are obtained, as before, from Table 1-10 and Table 1-11, respectively. The combined samples, $r_{12}$, are used to estimate the SNR for the combined path using the same algorithm as described in 1.3.6.7.

FIG. 39. Two-Path Diversity Combining

For BPSK modulated bursts, the soft bits for the combined path are scaled as $$d'_{12}(n) = \hat{d}_{12} \cdot 2 \tag{1-75}$$

For QPSK modulated bursts, the soft bits for the combined path are scaled as $$v'_1(n) = v_1(n) \cdot 2\sqrt{2}$$

$$v'_Q(n) = v_Q(n) \cdot 2\sqrt{2}$$

$$d'_{12}(n) = v'_Q(n) + jv'_1(n) \tag{1-76}$$

Note that, unlike for the individual paths, the soft bits for the combined path are not scaled by the SNR value.

The scaled, soft bits for the combined path are quantized into $W_{PRI} = 8$ bit signed integer values.

For BPSK this representation is given by $$\{\Re\{\tilde{d}_{12}(0)\}, \Re\{\tilde{d}_{12}(1)\}, \ldots, \Re\{\tilde{d}_{12}(N-7)\}, \Re\{\tilde{d}_{12}(N-6)\}\} \tag{1-77}$$

where $\Re\{X\}$ denotes the real part of complex variable X and

However, for QPSK the information is imbedded both in real and imaginary parts and the soft bit representation is modified as $$\Re\{\tilde{d}_{12}(0)\}, \Im\{\tilde{d}_{12}(0)\}, \ldots, \Re\{\tilde{d}_{12}(N-6)\}, \Im\{\tilde{d}_{12}(N-6)\} \tag{1-78}$$

where $\Re\{X\}$ and $\Im\{X\}$ denotes the real and imaginary part of complex variable X and $$\tilde{d}_{12}(n) = \text{int}\{I_{PRI_{12}} \cdot d'_{12}(n)\} \tag{1-79}$$

where the value of $IPRI_{1,2}$ is the same as that of IPRI given in Section 1.3.8. The quantizing function int{ } is also described in Section 1.3.8.

The quantized sequences derived from two individual paths and the combined path, $\tilde{d}_1(n)$, $\tilde{d}_2(n)$, and $\tilde{d}_{12}(n)$ can then be fed to FEC decoders. However, for the baseline implementation, only the combined path is processed through the FEC decoder to generate the CRC pass or fail indicator.

Four-Path Diversity Combining

Figure 40:
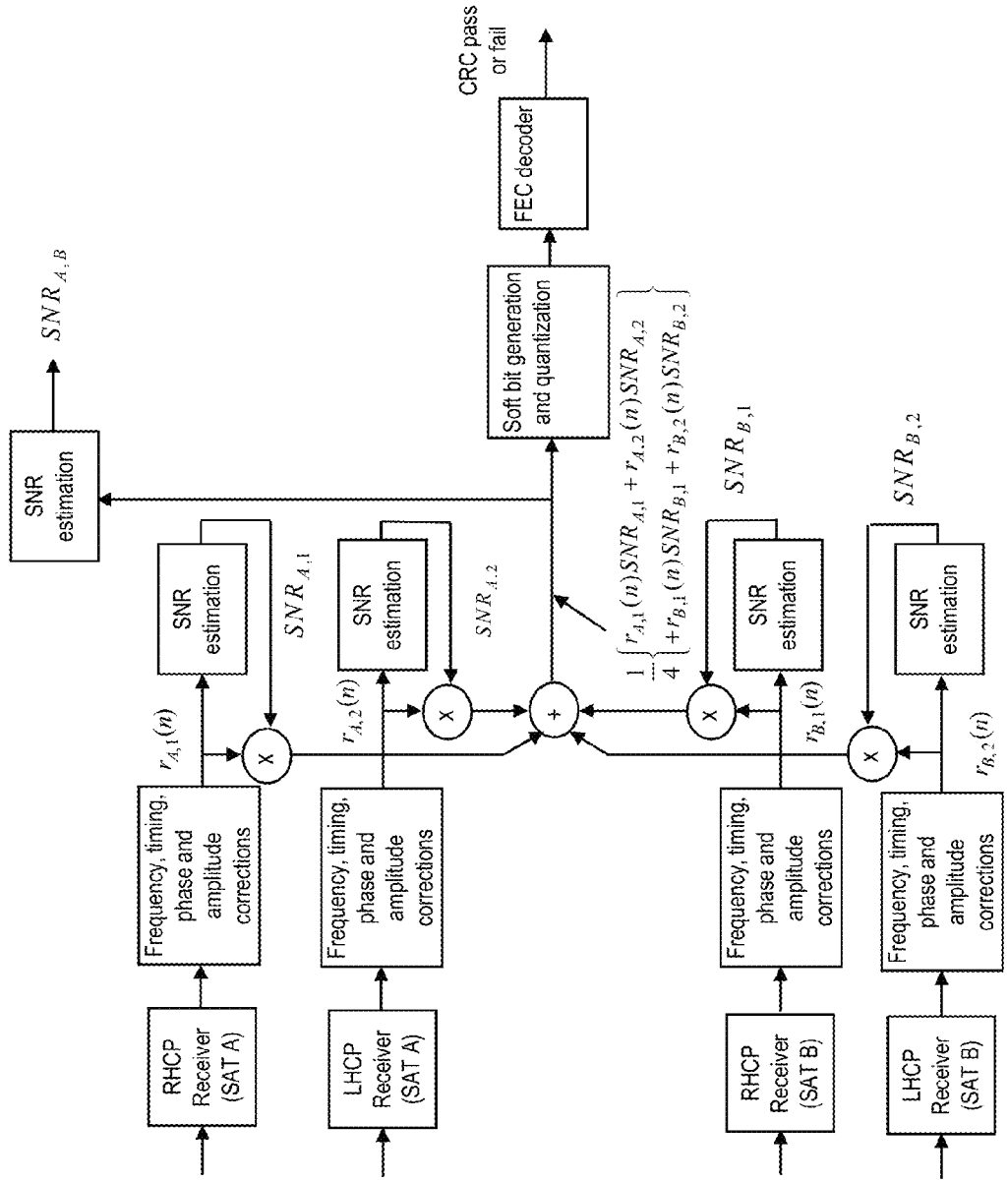

Four-path diversity combining is depicted in FIG. 40. The four demod outputs (two from each antenna) after timing, frequency, phase and amplitude corrections, are scaled by their respective SNR estimations and added to generate the combined output $r_{A,B}$ according to $$r_{AB}(n) = \tag{1-80}$$
$$\frac{1}{4}\{r_{A1}(n)SNR_{A1} + r_{A2}(n)SNR_{A2} + r_{B1}(n)SNR_{B1} + r_{B2}(n)SNR_{B2}\}$$

where the subscripts A and B denote the satellites while 1 and 2 denote left hand or right hand circular polarization.

For BPSK modulated bursts, the real part of the combined output $r_{AB}$ in (1-80) is taken to yield the soft decision bits $\hat{d}_{12}(n)$:

$$\hat{d}_{AB}(n) = \Re\{r_{AB}(n)\}, \tag{1-81}$$

For QPSK modulated bursts, as before, the combined output $r_{AB}$ is first phase-rotated by $\pi/4$ $$\hat{v}_{AB}(n) = v_I(n) + jv_Q(n) = r_{AB}(n) \cdot \exp\left(j\frac{\pi}{4}\right) \tag{1-82}$$

The in-phase and q-phase of the signal is flipped to yield:

$$\hat{d}_{AB}(n) = v_Q(n) + jv_1(n), n = 0, \ldots, N-6 \tag{1-83}$$

The real part of $\hat{d}_{AB}$ corresponds to the soft bit of even index bits and imaginary part of $\hat{d}_{AB}$ corresponds to the soft bit of odd index bits.

Based on the samples $\hat{d}_{AB}(n)$, the detected BPSK and QPSK symbols for the combined path are obtained, as before, from Table 1-10 and Table 1-11, respectively. The combined samples, $r_{AB}$, are used to estimate the SNR for the combined path using the same algorithm as described in 1.3.6.7.

FIG. 40. Four-Path Polarization Diversity Combining

For BPSK modulated bursts, the soft bits for the combined path are scaled as $$d'_{AB}(n) = \hat{d}_{AB} \cdot 2 \tag{1-84}$$

For QPSK modulated bursts, the soft bits for the combined path are scaled as $$v'_1(n) = v_1(n) \cdot 2\sqrt{2}$$

$$v'_Q(n) = v_Q(n) \cdot 2\sqrt{2}$$

$$d'_{AB}(n) = v'_Q(n) + jv'_1(n) \tag{1-85}$$

Note that, unlike for the individual paths, the soft bits for the combined path are not scaled by the SNR value.

The scaled, soft bits for the combined path are quantized into $W_{PRI} = 8$ bit signed integer values.

For BPSK this representation is given by $$\{\Re\{\tilde{d}_{AB}(0)\}, \Re\{\tilde{d}_{AB}(1)\}, \ldots, \Re\{\tilde{d}_{AB}(N-7)\}, \Re\{\tilde{d}_{AB}(N-6)\}\} \tag{1-86}$$

where $\Re\{X\}$ denotes the real part of complex variable X and for QPSK, as before, the soft bit representation is modified as $$\Re\{\tilde{d}_{AB}(0)\}, \Im\{\tilde{d}_{AB}(0)\}, \ldots, \Re\{\tilde{d}_{AB}(N-6)\}, \Im\{\tilde{d}_{AB}(N-6)\} \tag{1-87}$$

where $\Re\{X\}$ and $\Im\{X\}$ denotes the real and imaginary part of complex variable X and $$\tilde{d}(n) = \text{int}\{I_{PRI_{AB}} \cdot d'_{AB}(n)\} \tag{1-88}$$

where the value of IPRI is the same as that of IPRI given in Section 1.3.8. The quantizing function int{ } is also described in Section 1.3.8.

The quantized sequences derived from four individual paths and the combined path, $\tilde{d}_{A,1}$ and $\tilde{d}_{A,2}(n)$, $\tilde{d}_{B,1}(n)$, $\tilde{d}_{B,2}(n)$ and $\tilde{d}_{A,B}(n)$, can then be fed to FEC decoders. However, for the baseline implementation, only the combined path is processed through the FEC decoder to generate the CRC pass or fail indicator.

Burst Classification with Diversity

In this Section burst classification with diversity is presented which is little different from single-path burst classification described in Section 1.3.4.1. For the case of receive diversity, all the paths need to be accounted for in the burst classification algorithm. First, frequency and timing correction is applied to each path individually. Next, all the paths are correlated with the candidate unique word sequences and the correlation values are non-coherently combined. As before, the unique word sequence that results in the highest correlation determines the burst type according to (1-21). Also the classification procedure has to satisfy (1-22), where η is modified to account for receive diversity according to $$\eta = \alpha \left( \sum_{n=1}^{N_r} \sum_{i=8}^{17} |r_{i,n}|^2 + \sum_{n=1}^{N_r} \sum_{i=109}^{119} |r_{i,n}|^2 + \sum_{n=1}^{N_r} \sum_{i=211}^{220} |r_{i,n}|^2 \right) \quad (1\text{-}89)$$

where α is a preconfigurable parameter and $N_r$ is the number of receive diversity paths.

Figure 41:
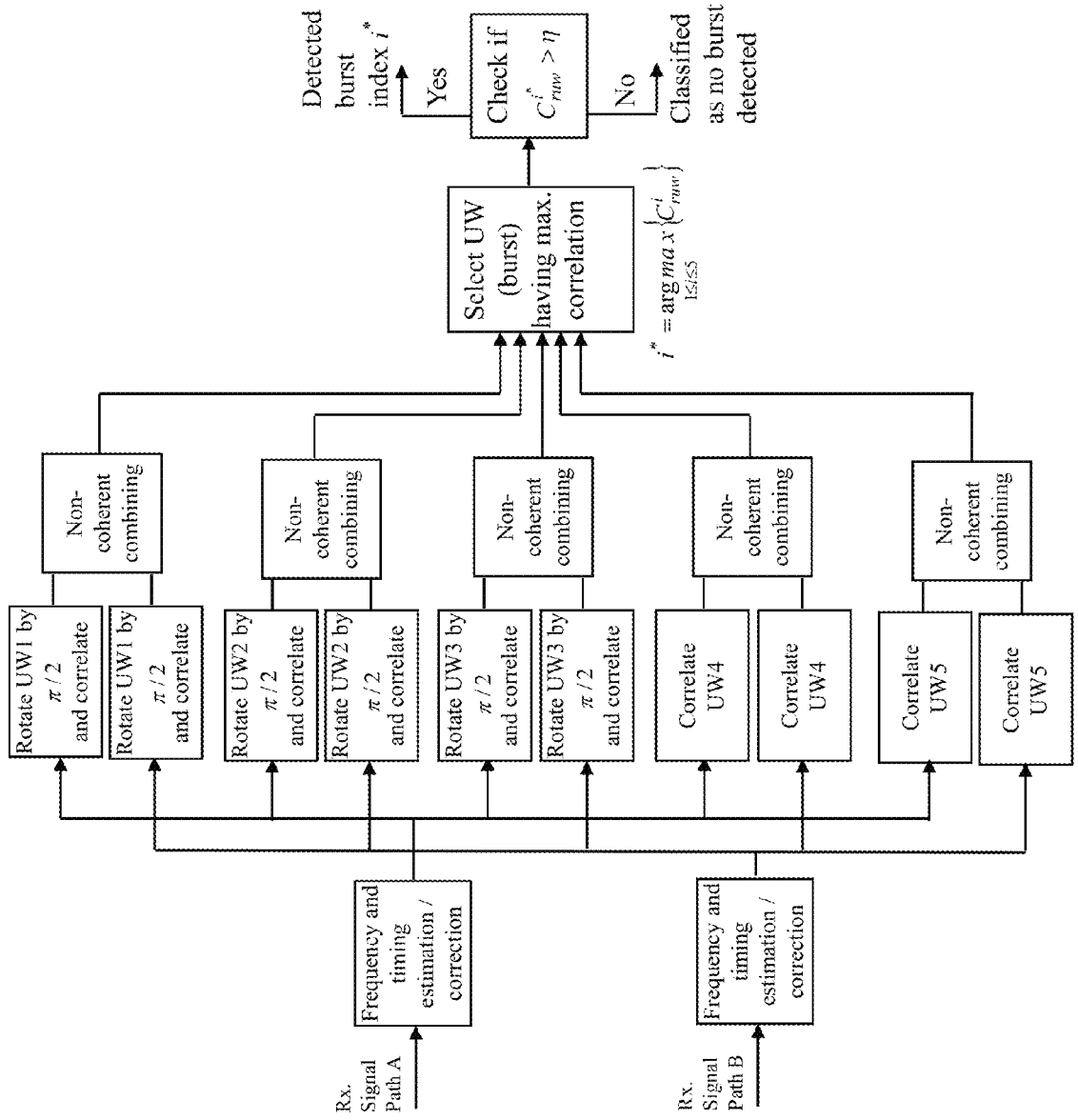

Note that if outage is declared for any path during the timing estimation, it is not processed for burst classification until the outage is over. In other words, during outage $N_r$ in (1-89) effectively denotes the number of paths in non-outage. As an example, the burst classification procedure with diversity for PNB3(1,6) is depicted in FIG. 41. For the sake of simplicity, only 2-path receive diversity is considered, however, extension to more paths is straightforward.

Physical Layer Method for Packet Data Bearers

Packet data Physical Channels and BURST FORMAT
Packet Data Channels (PDCH)
The Packet Data Channel (PDCH) are further divided into Packet Common Control Channel (PCCCH), Packet Associated Control Channel (PACCH), and Packet Data Traffic Channel (PDTCH)
Packet Common Control Channels (PCCCH)
The packet common control channel is defined in either in forward or return link direction. It carries control information for a group of users.
Forward link only:
PAGCH (Packet Access Grant Channel) is used by Gateway to send assignments to dedicate resources to UTs for transferring data in response to PRACH requests.
Packet Associated Control Channel (PACCH)
PACCH (Packet Associated Control Channel) transports signaling message between the UT and Gateway. It carries user associated control information either in forward or return link
Packet Data Traffic Channel (PDTCH)
PDTCH (Packet Traffic Channel) carries the packet switched data and control,
Packet Normal Bursts: PNB(1,6), PNB3(2,6), PNB3(5,3), PNB3(5,12), PNB3(10,3)
Narrowband Packet Normal Bursts: PNB(1,6) and PNB3 (2,6)
Both PNB(1,6) and PNB3(2,6) are π/4 QPSK modulated. PNB(1,6) is Convolutionally encoded, and PNB3(2,6) is Turbo encoded. The payload throughput for each different code rates are summarized in Table 0-1 and Table 0-2.

TABLE 0-1

PNB(1,6) Burst Summary

| Burst Type | Direction | Tx Rate in ksps | Burst Duration in ms | FEC Rate (Approx.) | FEC Rate (Exact) | No of Coded Bits | Payload in No of Bits (Excluding 8 Bit Tails) | Peak Payload Data Rate in kbps |
|---|---|---|---|---|---|---|---|---|
| PNB (1,6) | D/U | 23.40 | 10.00 | 4/5 | 0.81 | 366 | 288 | 28.80 |
|  | D/U | 23.40 | 10.00 | 7/10 | 0.70 | 366 | 248 | 24.80 |
|  | D/U | 23.40 | 10.00 | 3/5 | 0.59 | 366 | 208 | 20.80 |

TABLE 0-2

PNB3(2,6) Burst Summary

| Burst Type | Direction | Tx Rate in ksps | Burst Duration in ms | FEC Rate (Approx.) | FEC Rate (Exact) | No of Coded Bits | Payload in No of Bits | Peak Payload Data Rate in kbps |
|---|---|---|---|---|---|---|---|---|
| PNB3 (2,6) | U | 46.80 | 10.00 | 4/5 | 0.80 | 800 | 640 | 64.00 |
|  | U | 46.80 | 10.00 | 7/10 | 0.70 | 800 | 560 | 56.00 |
|  | U | 46.80 | 10.00 | 3/5 | 0.59 | 800 | 472 | 47.20 |
|  | D | 46.80 | 10.00 | 4/5 | 0.82 | 778 | 640 | 64.00 |
|  | D | 46.80 | 10.00 | 7/10 | 0.72 | 778 | 560 | 56.00 |
|  | D | 46.80 | 10.00 | 3/5 | 0.61 | 778 | 472 | 47.20 |

Wideband Packet Normal Bursts: PNB3(5,3), PNB3(5,12), PNB3(10,3)

All wideband packet normal bursts are encoded with Turbo FEC. Both π/4 QPSK and 16 APSK are supported in the downlink. Return link only supports the π/4 QPSK modulation. Table 0-3, Table 0-4, and Table 0-5 summarize the data rates for PNB3(5,3), PNB3(5,12), and PNB3(10,3), respectively, for different modulation schemes and FEC rates.

TABLE 0-3

PNB3(5,3) Burst Summary

| Burst Type | Direction | Tx Rate in ksps | Burst Duration in ms | FEC Rate (Approx.) | FEC Rate (Exact) | No of Coded Bits | Payload in No of Bits (Including 16 Bit CRC) | Peak Payload Data Rate in kbps |
|---|---|---|---|---|---|---|---|---|
| PNB3(5,3) pi/4 QPSK | D/U | 117.00 | 5.00 | 5/6 | 0.84 | 958 | 800.00 | 160.00 |
|  | D/U | 117.00 | 5.00 | 3/4 | 0.75 | 958 | 720.00 | 144.00 |
|  | D/U | 117.00 | 5.00 | 5/8 | 0.63 | 958 | 600.00 | 120.00 |
|  | D/U | 117.00 | 5.00 | 1/2 | 0.50 | 958 | 480.00 | 96.00 |
| PNB3(5,3) 16 APSK | D | 117.00 | 5.00 | 2/3 | 0.67 | 1916 | 1280.00 | 256.00 |

TABLE 0-4

PNB3(5,12) Burst Summary

| Burst Type | Direction | Tx Rate in ksps | Burst Duration in ms | FEC Rate (Approx.) | FEC Rate (Exact) | No of Coded Bits | Payload in No of Bits (Including 16 Bit CRC) | Peak Payload Data Rate in kbps |
|---|---|---|---|---|---|---|---|---|
| PNB3(5,12) pi/4 QPSK | D/U | 117.00 | 20.00 | 5/6 | 0.84 | 4440 | 3720.00 | 186.00 |
|  | D/U | 117.00 | 20.00 | 3/4 | 0.75 | 4440 | 3328.00 | 166.40 |
|  | D/U | 117.00 | 20.00 | 5/8 | 0.63 | 4440 | 2784.00 | 139.20 |
|  | D/U | 117.00 | 20.00 | 1/2 | 0.50 | 4440 | 2224.00 | 111.20 |
| PNB3(5,12) 16 APSK | D | 117.00 | 20.00 | 2/3 | 0.67 | 2 × 4440 | 2 × 2960 | 296.00 |

TABLE 0-5

PNB3(10,3) Burst Summary

| Burst Type | Direction | Tx Rate in ksps | Burst Duration in ms | FEC Rate (Approx.) | FEC Rate (Exact) | No of Coded Bits | Payload in No of Bits (including 16 Bit CRC) | Peak Payload Data Rate in kbps |
|---|---|---|---|---|---|---|---|---|
| PNB3(10,3) pi/4 QPSK | D | 234.00 | 5.00 | 5/8 | 0.62 | 2108 | 1304 | 260.80 |
| PNB3(10,3) 16 APSK | D | 234.00 | 5.00 | 2/3 | 0.70 | 4216 | 2952 | 590.40 |

When the burst carries UL-MAP (defined in the next section), the payload FEC block sizes reduce to accommodate the UL-MAP field. The FEC block sizes for such cases are listed in Table 0-6, Table 0-7, and Table 0-8.

TABLE 0-6

PNB3(5,3) Downlink Burst Carrying UL-MAP Burst Summary

| Burst Type | Direction | Tx Rate in ksps | Burst Duration in ms | FEC Rate (Approx.) | FEC Rate (Exact) | No of Coded Bits | Payload in No of Bits (Including 16 Bit CRC) | Peak Payload Data Rate in kbps |
|---|---|---|---|---|---|---|---|---|
| PNB3(5,3) pi/4 QPSK | D | 117.00 | 5.00 | 5/6 | 0.81 | 830 | 672 | 134.40 |
|  | D | 117.00 | 5.00 | 3/4 | 0.71 | 830 | 592 | 118.40 |

TABLE 0-6-continued

PNB3(5,3) Downlink Burst Carrying UL-MAP Burst Summary

| Burst Type | Direction | Tx Rate in ksps | Burst Duration in ms | FEC Rate (Approx.) | FEC Rate (Exact) | No of Coded Bits | Payload in No of Bits (Including 16 Bit CRC) | Peak Payload Data Rate in kbps |
|---|---|---|---|---|---|---|---|---|
| | D | 117.00 | 5.00 | 5/8 | 0.62 | 830 | 512 | 102.40 |
| | D | 117.00 | 5.00 | 1/2 | 0.49 | 830 | 408 | 81.60 |
| PNB3(5,3) 16 APSK | D | 117.00 | 5.00 | 2/3 | 0.65 | 1660 | 1072 | 214.40 |

TABLE 0-7

PNB3(5,12) Downlink Burst Carrying UL-MAP Burst Summary

| Burst Type | Direction | Tx Rate in ksps | Burst Duration in ms | FEC Rate (Approx.) | FEC Rate (Exact) | No of Coded Bits | Payload in No of Bits (Including 16 Bit CRC) | Peak Payload Data Rate in kbps |
|---|---|---|---|---|---|---|---|---|
| PNB3(5,12) pi/4 QPSK | D | 117.00 | 20.00 | 5/6 | 0.83 | 4120 | 3416.00 | 170.80 |
| | D | 117.00 | 20.00 | 3/4 | 0.74 | 4120 | 3064.00 | 153.20 |
| | D | 117.00 | 20.00 | 5/8 | 0.62 | 4120 | 2560.00 | 128.00 |
| | D | 117.00 | 20.00 | 1/2 | 0.50 | 4120 | 2040.00 | 102.00 |
| PNB3(5,12) 16 APSK | D | 117.00 | 20.00 | 2/3 | 0.66 | 2 × 4120 | 2 × 2736 | 273.60 |

TABLE 0-8

PNB3(10,3) Downlink Burst Carrying UL-MAP Burst Summary

| Burst Type | Direction | Tx Rate in ksps | Burst Duration in ms | FEC Rate (Approx.) | FEC Rate (Exact) | No of Coded Bits | Payload in No of Bits (including 16 Bit CRC) | Peak Payload Data Rate in kbps |
|---|---|---|---|---|---|---|---|---|
| PNB3(10,3) pi/4 QPSK | D | 234.00 | 5.00 | 5/8 | 0.61 | 1852 | 1136 | 227.20 |
| PNB3(10,3) 16 APSK | D | 234.00 | 5.00 | 2/3 | 0.69 | 3704 | 2560 | 512.00 |

PNB Burst Format and Characteristics

The PNB bursts consist of multiple fields that are summarized below:

PRI (Private Information): PRI carries user data and/or control messages. PRI is also termed as payload. The PRI can be modulated either by π/4 QPSK, 16 APSK, and it is encoded with either convolutional code or turbo FEC for various rates.

PUI (Public User Information): PUI contains the physical layer related control messages and burst format information. It carries keep-alive burst indicator (downlink only), and link adaptation control message (uplink only), burst modulation and coding information, and access permission to the uplink timeslots associated with the downlink timeslots where the burst is received. PNB(1,6) and PNB3(2,6)/U, PNB3(5,3)/U, PNB3(5,12)/U: The PUI information is coded with (24, 12) extended Golay code with one-time repetition (effective code rate 1/4), resulting in 48 encoded PUI bits. This translates into 24 π/4-QPSK modulated symbols in the PUI fields of the burst. All the UTs attached to the same PDCH carrier, shall decode the PUI fields prior to decoding the payload in the burst.

PNB3(2,6)/D, PNB3(5,3)/D, PNB3(5,12)/D, and PNB3(10,3)/D: The PUI information is encoded with outer CRC and inner convolutional code constraint length 9.

UL-MAP (Uplink MAP): The UL-MAP contains uplink assignment map which is encoded with convolutional code constraint length 9. The presence of this field is optional, and indicated by PUI.

UW (Unique Words): Unique Words (UW) assists burst synchronization such as timing, phase, and frequency estimation.

G (Guard): G provides guard time (along with network synchronization) between the consecutive burst and allows the period for carrier power ramp up and down.

Figure 42:
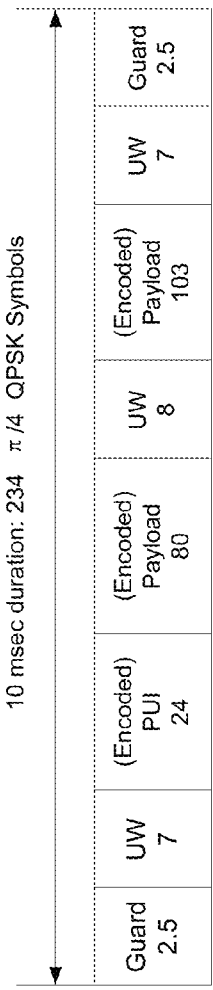

FIG. 42. PNB(1,6) Uplink and Downlink Burst Format: Number in Units of Symbol

Figure 43:
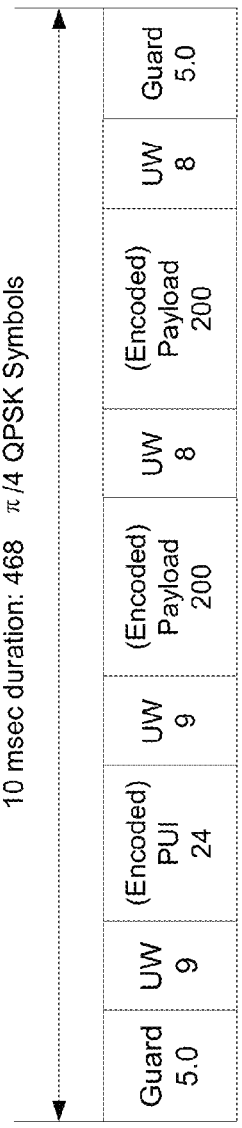

FIG. 43 PNB3(2,6) Uplink Burst Format: Number in Units of Symbol

Figure 44:
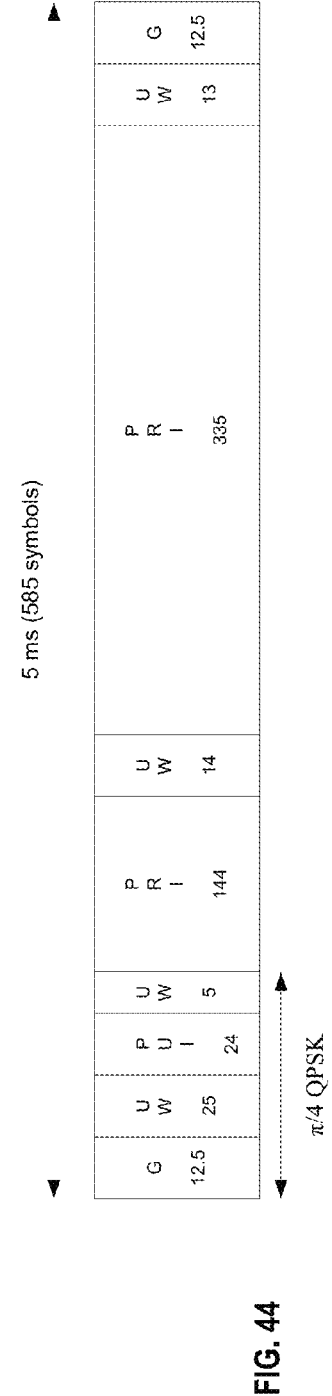

FIG. 44. PNB3(5,3) Uplink Burst Format: Number in Units of Symbol

Figure 45:
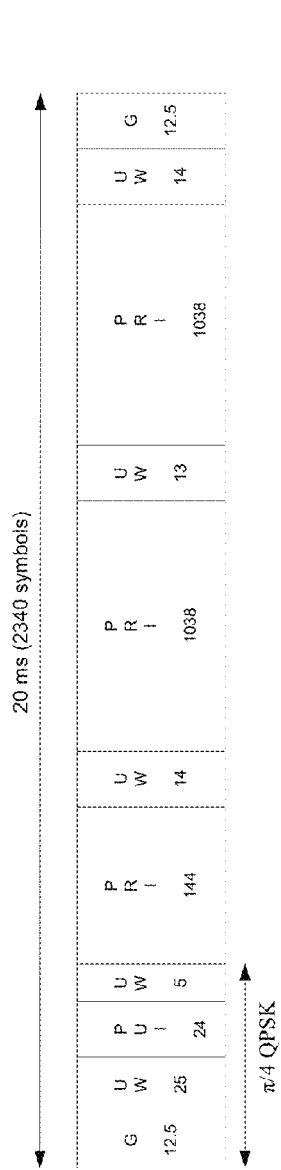

FIG. 45. PNB3(5,12) Uplink Burst Format: Number in Units of Symbol

Figure 46:
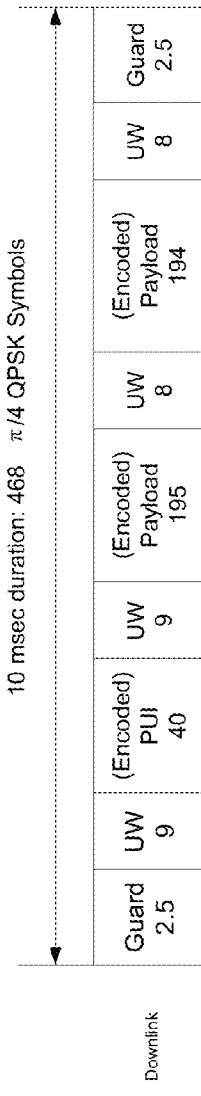

FIG. 46. PNB3(2,6) Downlink Burst Format: Number in Units of Symbol

Figure 47:
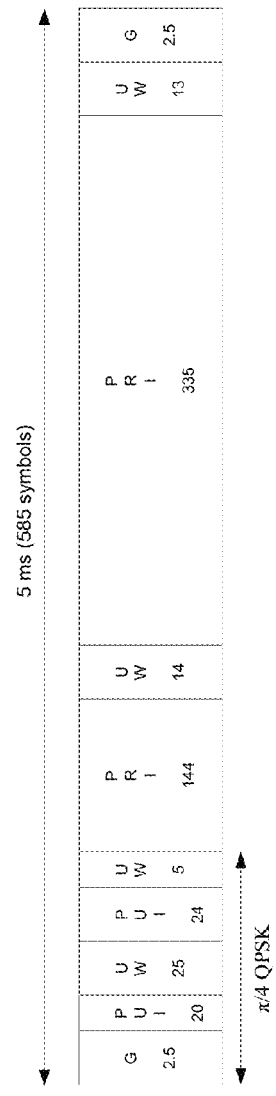

FIG. 47. PNB3(5,3) Downlink Burst Format: Number in Units of Symbol

Figure 48:
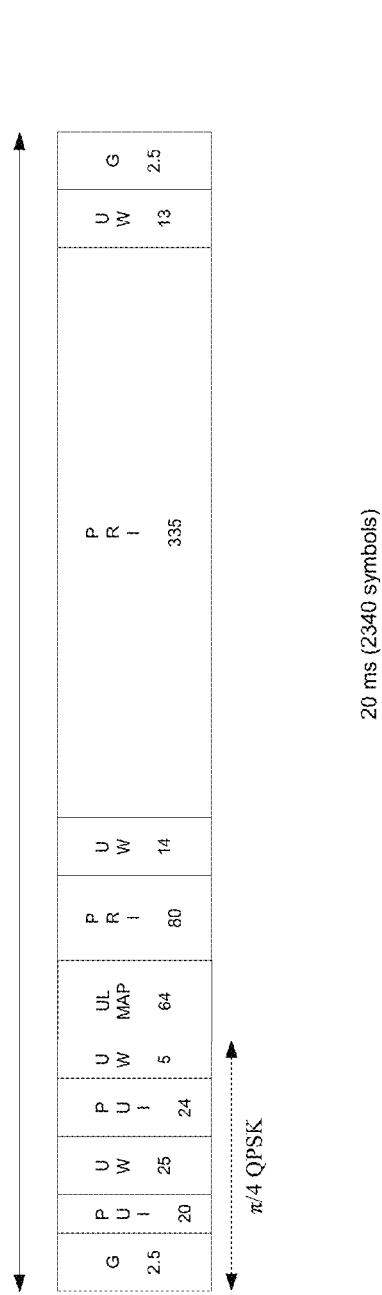
Figure 49:
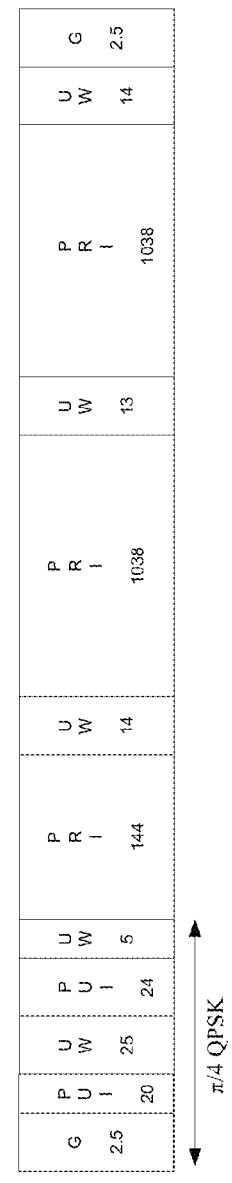
Figure 50:
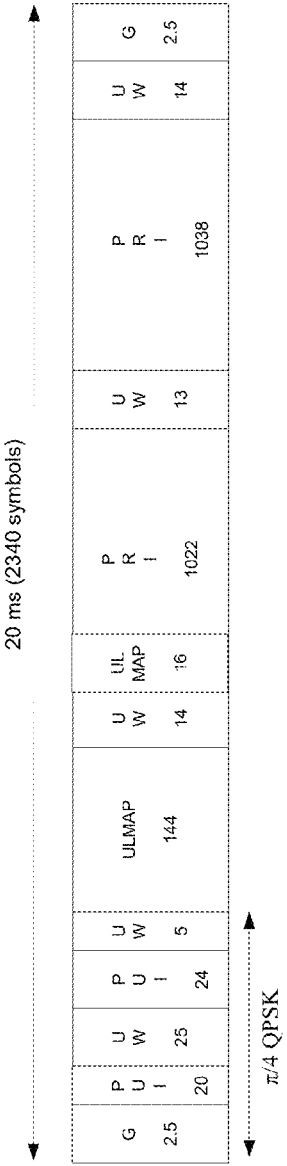
Figure 51:
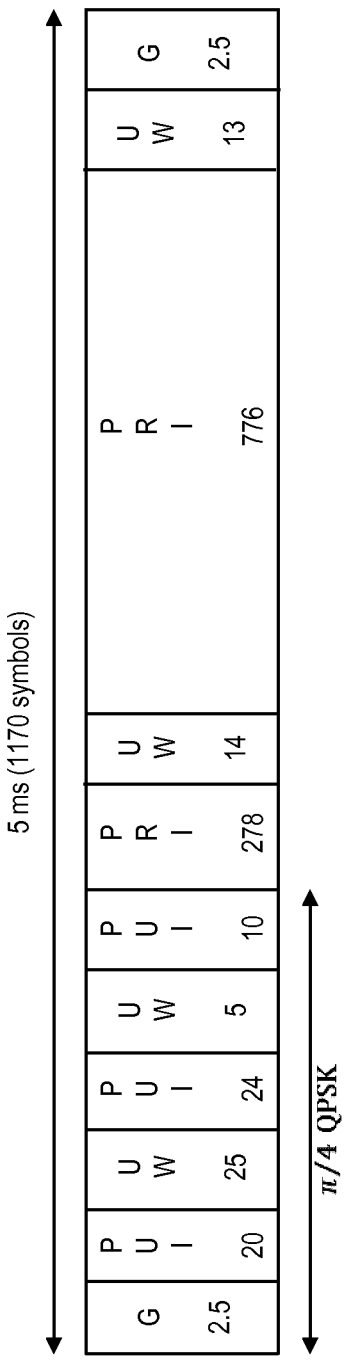
Figure 52:
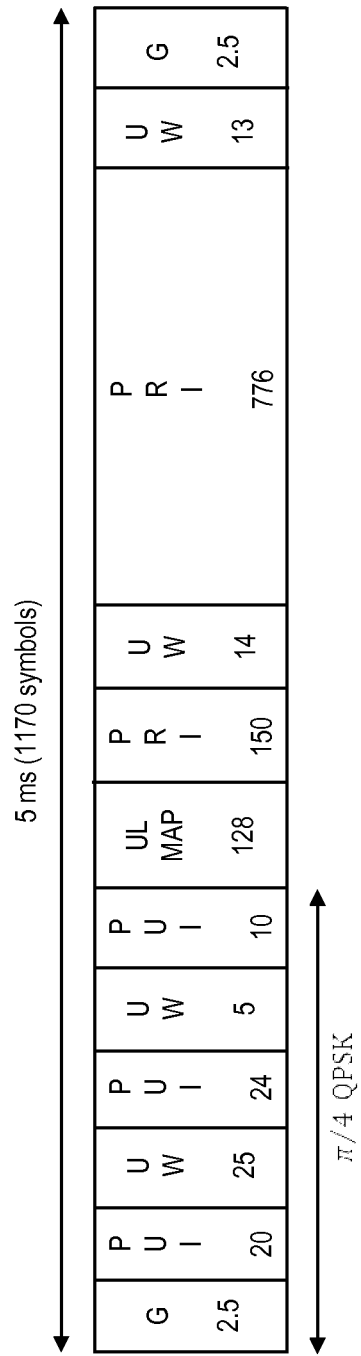

FIG. 48. PNB3(5,3) Downlink with UL-MAP Burst Format: Number in Units of Symbol FIG. 49. PNB3(5,12) Downlink Burst Format: Number in Units of Symbol FIG. 50. PNB3(5,12) Downlink with UL-MAP Burst Format: Number in Units of Symbol FIG. 51. PNB3(10,3) Downlink Burst Format: Number in Units of Symbol FIG. 52. PNB3(10,3) Downlink with UL-MAP Burst Format: Number in Units of Symbol PUI and UL-MAP Field Table 0-9 summarizes the PUI and UL-MAP FEC parameters.

When ULMAP is present in the downlink burst then PUI and ULMAP bits are CRC encoded together. The resultant CRC is only transmitted over PUI.

PKAB3 and KAB3 Burst Format and Characteristics

The Packet Keep Alive Bursts (PKAB3s) are transmitted over downlink PDCH3 carrier to fill in during a silence period of the packet data (PRI) transmission. The absence of PRI in the burst will help saving the satellite power as well as UT processing power. This continuous transmission of PUI makes uplink access permission (USF) available every burst and also helps the UT to maintain its receiver downlink synchronization by tracking time and frequency offsets.

The PKAB3(m,3) for (m=5 and 10) burst format is identical to downlink PNB3(m, 3) except that it does not carry Payload (PRI) and the last UW segment. It contains only PUI, UL-MAP and first three UW segments. Similarly, the PKAB3 (2,6) burst format is identical to downlink PNB3(2,6) except

TABLE 0-9

PUI and UL-MAP REC Parameters

| Field Type | Associated PNBs | Direction | Symbol Rates (ksps) | MOD | FEC | Input Bits to FEC (Including CRC Bits) | Coded Bits | Effective Code Rates (Including Puncturing and Repetition) |
|---|---|---|---|---|---|---|---|---|
| UL-MAP | PNB3(5,3) | D | 117.00 | PI/4-QPSK | TB Conv. Code K = 9 Rate 1/2 (after puncture) with 1x repetition | 32 (info bits) | 128 | 0.25 |
| | PNB3(5,12) | D | 117.00 | PI/4-QPSK | TB Conv. Code K = 9 Rate 1/2 (after puncture) with 1x repetition | 80 (info. bits) | 320 | 0.25 |
| | PNB3(10,3) | D | 234.00 | PI/4-QPSK | TB Conv. Code K = 9 Rate 1/2 (after puncture) with 1x repetition | 64 (info. bits) | 256 | 0.25 |
| PUI | PNB(1,6) | D/U | 23.40 | PI/4-QPSK | Golay Code with repetition | 12 (info bits) | 48 | 0.25 |
| | PNB3(2,6) | D | 46.80 | PI/4-QPSK | TB Conv. Code K = 9 Rate 0.52 (after puncture) with 1x repetition | 21 (info bits, including 3 bit CRC) | 80 | 0.26 |
| | | U | 46.80 | PI/4-QPSK | Golay Code with repetition | 12 (info bits) | 48 | 0.25 |
| | PNB3(5,3) | D | 117.00 | PI/4-QPSK | TB Conv. Code K = 9 Rate 0.52 (after puncture) with 1x repetition | 23 (info bits, including 3 bit CRC) | 88 | 0.26 |
| | | U | 117.00 | PI/4-QPSK | Golay Code with repetition | 12 (info bits) | 48 | 0.25 |
| | PNB3(5,12) | D | 117.00 | PI/4-QPSK | TB Conv. Code K = 9 Rate 0.52 (after puncture) with 1x repetition | 23 (info bits, including 3 bit CRC) | 88 | 0.26 |
| | | U | 117.00 | PI/4-QPSK | Golay Code with 1x repetition | 12 (info bits) | 48 | 0.25 |
| | PNB3(10,3) | D | 234.00 | PI/4-QPSK | TB Conv. Code K = 9 Rate 0.58 (after puncture) with 1x repetition | 30 (info bits, including 3 bit CRC) | 108 | 0.28 | that it does not carry Payload (PRI) and last two UW segments. The burst format for PKAB3(10,3), PKAB3(5,3), PKAB3(2,6), and PKAB3(1,6) are shown in FIG. 53, FIG. 54, FIG. 55, and FIG. 56, respectively.

Figure 53:
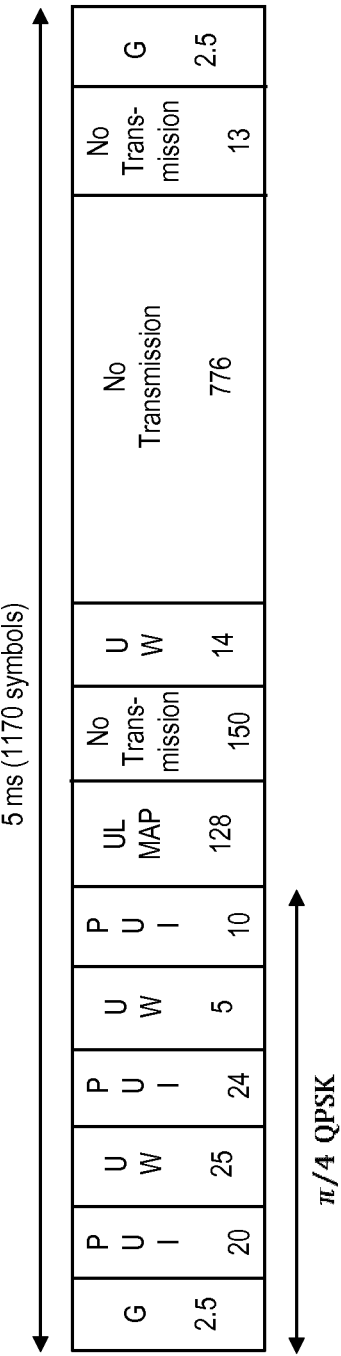

FIG. 53. PKAB3(10,3)
FIG. 54. PKAB3(5,3) Burst Format
FIG. 55. PKAB3(2,6) Burst Format
FIG. 56. PKAB(1,6) Burst Format Packet Data Channel Unique Words For PNB(1,6) and PNB3(2,6) the UW's are as shown in Table 2-10 and Table 2-11

TABLE 2-10

PNB(1, 6) Unique Words

| UW Segment | No of Symbols In Each Segment | UW Pattern |
|---|---|---|
| First Segment | 7 | $\{e^{j \cdot 0}, e^{j \cdot \frac{\pi}{2}}, e^{j \cdot \pi}, e^{j \cdot \frac{\pi}{2}}, e^{j \cdot 0}, e^{j \cdot \frac{3\pi}{2}}, e^{j \cdot 0}\}$ |
| Second Segment | 8 | $\{e^{j \cdot 0}, e^{j \cdot \frac{\pi}{2}}, e^{j \cdot \pi}, e^{j \cdot \frac{\pi}{2}}, e^{j \cdot 0}, e^{j \cdot \frac{3\pi}{2}}, e^{j \cdot 0}, e^{j \cdot \frac{3\pi}{2}}\}$ |
| Third Segment | 7 | $\{e^{j \cdot 0}, e^{j \cdot \frac{\pi}{2}}, e^{j \cdot \pi}, e^{j \cdot \frac{\pi}{2}}, e^{j \cdot 0}, e^{j \cdot \frac{3\pi}{2}}, e^{j \cdot 0}\}$ |

TABLE 2-11

PNB3(2, 6) Unique Words

| UW Segment | No of Symbols In Each Segment | UW Pattern |
|---|---|---|
| First Segment | 9 | $\{e^{j \cdot 0}, e^{j \cdot \frac{\pi}{2}}, e^{j \cdot \pi}, e^{j \cdot \frac{\pi}{2}}, e^{j \cdot 0}, e^{j \cdot \frac{3\pi}{2}}, e^{j \cdot 0}, e^{j \cdot \frac{3\pi}{2}}, e^{j \cdot 0}\}$ |
| Second Segment | 9 | $\{e^{j \cdot 0}, e^{j \cdot \frac{\pi}{2}}, e^{j \cdot \pi}, e^{j \cdot \frac{\pi}{2}}, e^{j \cdot 0}, e^{j \cdot \frac{3\pi}{2}}, e^{j \cdot 0}, e^{j \cdot \frac{3\pi}{2}}, e^{j \cdot 0}\}$ |
| Third Segment | 8 | $\{e^{j \cdot 0}, e^{j \cdot \frac{\pi}{2}}, e^{j \cdot \pi}, e^{j \cdot \frac{\pi}{2}}, e^{j \cdot 0}, e^{j \cdot \frac{3\pi}{2}}, e^{j \cdot 0}, e^{j \cdot \frac{3\pi}{2}}\}$ |
| Fourth Segment | 8 | $\{e^{j \cdot 0}, e^{j \cdot \frac{\pi}{2}}, e^{j \cdot \pi}, e^{j \cdot \frac{\pi}{2}}, e^{j \cdot 0}, e^{j \cdot \frac{3\pi}{2}}, e^{j \cdot 0}, e^{j \cdot \frac{3\pi}{2}}\}$ |

For PNB3(5,3), PNB3(5,12) and PNB3(10,3) the Unique Words are as shown in Tables Table 2-12 and Table 2-13

TABLE 2-12

PNB3(5, 3) and PNB3(10,3) Unique Words

| UW Length | UW Basic Patterns |
|---|---|
| 25 symbols | $UW_{25} = \{e^{j\frac{\pi}{2}0}, e^{j\frac{\pi}{2}1}, e^{j\frac{\pi}{2}2}, e^{j\frac{\pi}{2}3}, e^{j\frac{\pi}{2}0}, e^{j\frac{\pi}{2}3}, e^{j\frac{\pi}{2}2}, e^{j\frac{\pi}{2}1}, e^{j\frac{\pi}{2}0}, e^{j\frac{\pi}{2}1}, e^{j\frac{\pi}{2}0}, e^{j\frac{\pi}{2}1}, e^{j\frac{\pi}{2}0}, e^{j\frac{\pi}{2}1}, e^{j\frac{\pi}{2}0}, e^{j\frac{\pi}{2}1}, e^{j\frac{\pi}{2}0}, e^{j\frac{\pi}{2}3}, e^{j\frac{\pi}{2}2}, e^{j\frac{\pi}{2}1}, e^{j\frac{\pi}{2}2}, e^{j\frac{\pi}{2}3}, e^{j\frac{\pi}{2}0}, e^{j\frac{\pi}{2}3}, e^{j\frac{\pi}{2}0}\}$ |
| 14 symbols | $UW_{14} = \{e^{j\frac{\pi}{2}0}, e^{j\frac{\pi}{2}1}, e^{j\frac{\pi}{2}0}, e^{j\frac{\pi}{2}3}, e^{j\frac{\pi}{2}0}, e^{j\frac{\pi}{2}1}, e^{j\frac{\pi}{2}0}, e^{j\frac{\pi}{2}1}, e^{j\frac{\pi}{2}2}, e^{j\frac{\pi}{2}3}, e^{j\frac{\pi}{2}2}, e^{j\frac{\pi}{2}3}, e^{j\frac{\pi}{2}2}, e^{j\frac{\pi}{2}1}\}$ |
| 13 symbols | $UW_{13} = \{e^{j\frac{\pi}{2}0}, e^{j\frac{\pi}{2}1}, e^{j\frac{\pi}{2}0}, e^{j\frac{\pi}{2}3}, e^{j\frac{\pi}{2}0}, e^{j\frac{\pi}{2}3}, e^{j\frac{\pi}{2}0}, e^{j\frac{\pi}{2}1}, e^{j\frac{\pi}{2}2}, e^{j\frac{\pi}{2}1}, e^{j\frac{\pi}{2}2}, e^{j\frac{\pi}{2}1}, e^{j\frac{\pi}{2}0}\}$ |
| 5 symbols | $UW_5 = \{e^{j\frac{\pi}{2}}, e^{j\frac{\pi}{2}}, e^{j\frac{\pi}{2}}, e^{j\frac{\pi}{2}}, e^{j\frac{\pi}{2}}\}$ |

TABLE 2-13

PNB3(5, 12) Unique Words

| UW Length | UW Basic Patterns |
|---|---|
| 25 symbols | $UW_{25} = \{e^{j\frac{\pi}{2}0}, e^{j\frac{\pi}{2}1}, e^{j\frac{\pi}{2}2}, e^{j\frac{\pi}{2}3}, e^{j\frac{\pi}{2}0}, e^{j\frac{\pi}{2}3}, e^{j\frac{\pi}{2}2}, e^{j\frac{\pi}{2}1}, e^{j\frac{\pi}{2}0}, e^{j\frac{\pi}{2}1}, e^{j\frac{\pi}{2}0}, e^{j\frac{\pi}{2}1}, e^{j\frac{\pi}{2}0}, e^{j\frac{\pi}{2}1}, e^{j\frac{\pi}{2}0}, e^{j\frac{\pi}{2}1}, e^{j\frac{\pi}{2}0}, e^{j\frac{\pi}{2}3}, e^{j\frac{\pi}{2}2}, e^{j\frac{\pi}{2}1}, e^{j\frac{\pi}{2}2}, e^{j\frac{\pi}{2}3}, e^{j\frac{\pi}{2}0}, e^{j\frac{\pi}{2}3}, e^{j\frac{\pi}{2}0}\}$ |
| 14 symbols | $UW_{14} = \{e^{j\frac{\pi}{2}0}, e^{j\frac{\pi}{2}1}, e^{j\frac{\pi}{2}0}, e^{j\frac{\pi}{2}3}, e^{j\frac{\pi}{2}0}, e^{j\frac{\pi}{2}1}, e^{j\frac{\pi}{2}0}, e^{j\frac{\pi}{2}1}, e^{j\frac{\pi}{2}2}, e^{j\frac{\pi}{2}3}, e^{j\frac{\pi}{2}2}, e^{j\frac{\pi}{2}3}, e^{j\frac{\pi}{2}2}, e^{j\frac{\pi}{2}1}\}$ |
| 13 symbols | $UW_{13} = \{e^{j\frac{\pi}{2}0}, e^{j\frac{\pi}{2}1}, e^{j\frac{\pi}{2}0}, e^{j\frac{\pi}{2}3}, e^{j\frac{\pi}{2}0}, e^{j\frac{\pi}{2}3}, e^{j\frac{\pi}{2}0}, e^{j\frac{\pi}{2}1}, e^{j\frac{\pi}{2}2}, e^{j\frac{\pi}{2}1}, e^{j\frac{\pi}{2}2}, e^{j\frac{\pi}{2}1}, e^{j\frac{\pi}{2}0}\}$ |
| 6 symbols | $UW_{6} = \{e^{j\frac{\pi}{2}0}, e^{j\frac{\pi}{2}0}, e^{j\frac{\pi}{2}2}, e^{j\frac{\pi}{2}0}, e^{j\frac{\pi}{2}2}, e^{j\frac{\pi}{2}3}\}$ |
| 5 symbols | $UW_{5} = \{e^{j\frac{\pi}{2}}, e^{j\frac{\pi}{2}}, e^{j\frac{\pi}{2}}, e^{j\frac{\pi}{2}}, e^{j\frac{\pi}{2}}\}$ |

Packet DatA Bearer Receiver Design

Figure 57:
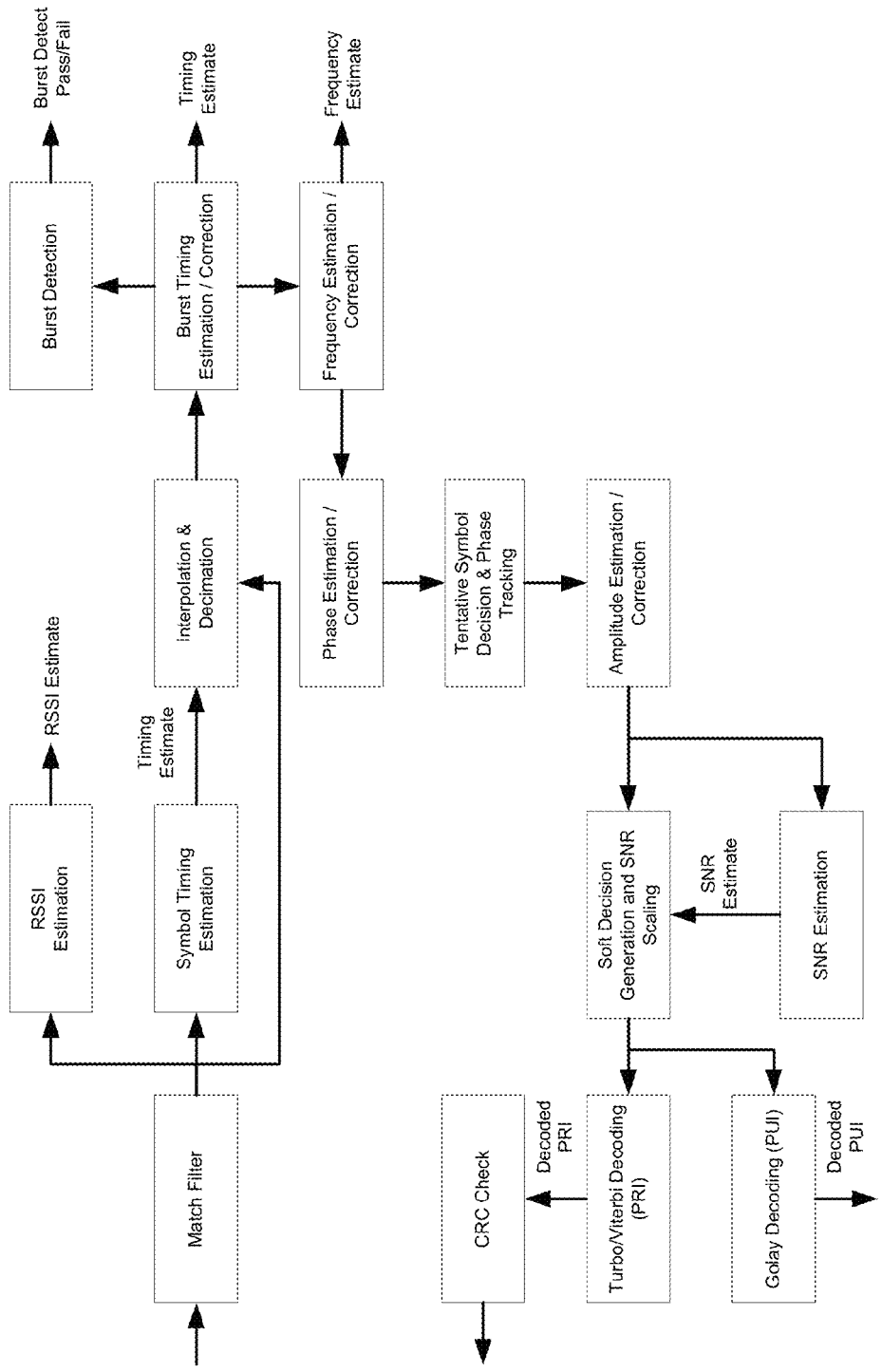

The receiver performs the following functions in a sequential manner:
- Matched Filter and RSSI estimation
- Timing estimation
- Timing correction by interpolation and decimation
- Frequency estimation and correction
- Phase estimation and correction
- Soft bit generation and symbol decision
- Amplitude estimation
- SNR estimation The PDCH receiver block diagram is shown in FIG. 57. The parameter values are summarized in Table 0-14

FIG. 57. PDCH receiver block diagram

TABLE 0-14

Demodulator parameters for PNB3(1, 6), PNB3(2, 6), PNB3(5, 3), PNB3(5, 12)

| Function Module | Default Parameter Values |
|---|---|
| Matched Filtering | For PNB3(1, 6) m = 1, PNB3(2, 6) m = 2, PNB3(5, 3) m = 5, PNB3(5, 12) m = 5 Roll-off factor: α = 0.35 Filter window size: L = 8 symbols Number of samples per symbol: M = 4 Number of symbols in a burst: N = 234 *m for PNB3(1, 6) and PNB3(2, 6) N = 117*5 for PNB3(5, 3) and N = 117*20 for PNB3(5, 12) |
| RSSI estimation | For PNB3(5, 12) and PNB3(5, 3): Number of symbols used in the RSSI calculation: N − 25. For PNB3(1, 6): Number of symbols used in the RSSI calculation: N − 5. For PNB3(2, 6) and PNB3(5, 3): Number of symbols used in the RSSI calculation: N − 10. Number of samples per symbol: M = 4. |
| Timing Estimation | Square timing estimation for symbol timing. Timing uncertainty search range $[−T_s/2, T_s/2]$. Number of samples per symbol for symbol timing: M = 4 Interpolation filter tap length: I = 16 Oversampling factor for interpolation: v + 1 = 8 UW based timing for burst timing and correction. Timing uncertainty search range $[−T_1, T_1]$: $T_1$ = 2*m*symbol duration Number of samples per symbol for burst timing: M = 1 |
| Burst Detection | Predetermined burst detection threshold set for each burst type |

TABLE 0-14-continued

Demodulator parameters for PNB3(1, 6), PNB3(2, 6), PNB3(5, 3), PNB3(5, 12)

| Function Module | Default Parameter Values |
|---|---|
| Frequency Estimation | Number of samples per symbol: M = 1 Frequency bin size: $f_1$ = 4 × 10 = 40 Hz for PNB3(2, 6), PNB3(5, 3) and PNB3(5, 12) and $f_1$ = 10 Hz for PNB3(1, 6) Frequency search window $[−f_\Delta, f_\Delta]$ for CW: $f_\Delta$ = 4 × 300 = 1200 Hz for PNB3(2, 6), PNB3(5, 3) and PNB3(5, 12) and $f_\Delta$ = 300 Hz for PNB3(1, 6) Number of frequency offset candidates: $N_{candidate}$ = 1 for PNB3(5, 12), PNB3(2, 6) and PNB3(1, 6) Number of frequency offset candidates: $N_{candidate}$ = 3 for PNB3(5, 3) |
| Phase Estimation | For two stage phase estimation Phase estimation on each UW segment. Linear interpolation in-between symbols. Block phase estimation Number of samples per symbol: M = 1 Length of estimation interval: Lest = 31*4 symbols for PNB3(5, 3) and PNB3(5, 12) Lest = 65 symbols for PNB3(1, 6) and PNB3(2, 6) Relative alignment interval: Lstep = 9 × m symbols for PNB3(5, 3) and PNB3(5, 12) Lstep = s0 symbols for PNB3(1, 6) and PNB3(2, 6) Single stage Block phase estimation (PNB3(5, 12) code rates 5/8, 3/4 and 5/6) Number of samples per symbol: M = 1 Length of estimation interval: Lest = 31*4 symbols Relative alignment interval: Lstep = 9 × m symbols |
| Tentative symbol estimation | Tentative decisions made on payload symbols and PUI symbols |
| Noise variance estimation | Noise variance is estimated using only the UW symbols. |
| Amplitude estimation | Amplitude estimated by using UW symbols and tentative symbol decisions on payload and PUI |
| SNR estimation | Es/N0 Estimation based on UW and demodulated payload. |

Matched Filter

At the receiver, the signal r (t) is sampled at a rate of $M/T_s$ samples per second (i.e., symbol over-sampled by a factor of M=4). The resultant discrete-time signal, r (n), is passed through a discrete time matched filter $h_{trunc}$ (n), to obtain $z(n) = r(n) * h_{trunc}(n)$, for $n = 0, 1, \ldots, MN−1$   (2-1)

where N is the number of symbols per burst. Note that $h_{trunc}(n)$ is the truncated and time shifted version of the pulse shaping filter given (1-2) in sampled at the sampling rate $M/T_s$, given by $$h_{trunc}(n) = \frac{\left\{\cos\left(\frac{(1+\alpha)\pi n'}{M}\right) + \frac{N}{4\alpha n'}\sin\left(\frac{(1-\alpha)\pi n'}{M}\right)\right\}}{4\alpha\pi(1/(4\cdot\alpha)^2 - (n'/M)^2)} \quad (2\text{-}2)$$

for $0 \le n \le LM-1$ where $n'=n-LM/2+\frac{1}{2}$. Note that the above filter is causal and spans L symbol duration. Due to the power ramp up and down, the guard symbols are not used for the further processing (e.g., timing estimation).

RSSI Estimation

The received signal strength can also be used to help determine the link quality, since it denotes the sum of the desired signal power and noise power whereas the SNR represents the ratio of these two powers.

The received signal power in a burst can be measured as $$\hat{P}_{est} = \frac{1}{NM}\sum_{n=0}^{NM-1}|z(n)|^2 \quad (2\text{-}3)$$

where $z(n)$ is the matched filter output samples. Then the RSSI (in dB) is defined as $$\text{RSSI}_{dB} = 10\log(\hat{P}_{est}/P_{ref}) \quad (2\text{-}4)$$

where the normalization factor, $P_{ref}$, is the reference power which is implementation dependent. For example, if the matched filter output samples are represented by 12 bits then the reference power can be set to be the maximum sample power with 12 bit amplitude representation, which is $P_{ref}=2*(2^{11}-1)^2$. In this case, $\text{RSSI}_{dB}$ is in the range of $-69\sim 0$ dB.

Timing Estimator

Let $\tau$ denote the symbol timing delay of burst in $[-T_s/2, T_s/2]$. The symbol timing delay is can be estimated as $$\tau = -\frac{T_s}{2\pi}\arg(c_1) \quad (2\text{-}5)$$

$c_1$ is the first coefficient of the Fourier Series of $|z(n)|^2$ $$c_1 = \sum_{n=M\cdot l_{PUI}}^{M\cdot(N-L_{guard2}-L_{uw5})-1}|z(n)|^2 \cdot \exp(-j2\pi\cdot n/M) \quad (2\text{-}6)$$

where $z(n)$ is the output of matched filter defined in (1-4).

Interpolation and Decimation

Prior to decimation, or symbol sampling, symbol timing adjustment is performed by interpolating the matched filter output. This interpolation is needed since the samples available at the matched filter output for the decimation are only $T_s/M$ apart ($T_s/4$ in our case). To elaborate this point, first let's decompose the estimated symbol timing delay $\tau$ in (1-8) as $$\tau = \frac{T_s}{M}\hat{k} + \Delta\tau \quad (2\text{-}7)$$

where $0\le\Delta\tau<T_s/M$ and $\hat{k}$ is an integer. The expected sample at the symbol timing is $$y(n) = z\left(nT_s + \frac{T_s}{M}\hat{k} + \Delta\tau\right) \quad (2\text{-}8)$$

whereas the available samples are only $$z\left(nT_s + \frac{T_s}{M}\hat{k}\right).$$

Hence the interpolation can be performed to re-construct the sample values at the desired sampling timing $$nT_s + \frac{T_s}{M}\hat{k} + \Delta\tau: \quad (2\text{-}9)$$

$$y(n) = z\left(nT_s + \frac{T_s}{M}\hat{k} + \Delta\tau\right)$$
$$= \sum_{i=-I}^{I-1} h\left(\frac{T_s}{M}i + \Delta\tau\right)z\left(nT_s + \frac{T_s}{M}(\hat{k}-i)\right)$$

where the truncated Sinc filter (I=16) is used for interpolation filter $$h(t) = \frac{\sin(4\pi\cdot t/T_S)}{(4\pi\cdot t/T_S)} \quad (2\text{-}10)$$

To make the interpolation more practical, the interpolation filter are constructed based on the quantized value of $\Delta\tau$, and the interpolation filtering is performed by selecting the closest set of coefficients. Evenly quantizing $\Delta\tau$ to $\nu$ levels within one sample duration of $T_s/M$ (thus the resolution of $T_s/(\nu M)$), interpolation accuracy down to $T_s/(2\cdot M\cdot\nu)$ can be achieved. For the implementation, $\nu=8$ shall be used. After symbol timing correction, the rest of the process will be performed at a symbol rate of $T_s^{-1}$ (one complex sample/symbol). The output of the interpolator is denoted by $y(n)$ where n is an integer denoting the symbol time index.

Burst Timing Estimation and Burst Detection

Once the square timing estimator described is performed ($[-T_s/2, T_s/2]$), the UW correlation shall be done over $[-T_1, +T_1]$. Where $T_1=10T_s$ for PNB3(5,3) and PNB3(5,12), $T_1=4T_s$ for PNB3(2,6) and $T_1=2T_s$ for PNB3(1,6)

The burst timing offset index is estimated as:

$$\hat{i} = \arg_{i=-T_1\ldots+T_1}\max(TC) \text{ for } PNB3(5,12) \quad (2\text{-}11)$$

Where:
For PNB3(1,6) and PNB3(2,6)

$$TC(i) = \sum_{n=1}^{N_m} \frac{\left|\sum_{k=0}^{Luw_n-1} y(i+k+Iuw_n)\cdot \exp\left(-j\frac{\pi}{4}k\right)\cdot UW_n^{*(k)}\right|^2}{\sum_{k=0}^{Luw_n-1}|y(i+k+Iuw_n)|^2}$$

For PNB3(5,3)

$$TC(i) = \frac{\left|\sum_{k=0}^{Luw_1-1} y(i+k+Iuw_1)\cdot \exp\left(-j\frac{\pi}{4}k\right)\cdot UW_1^{*(k)}\right|^2}{\sum_{k=0}^{Luw_1-1}|y(k+k+Iuw_1)|^2} +$$

$$\frac{\left|\sum_{k=0}^{Luw_3-1} y(i+k+Iuw_3)\cdot \exp\left(-j\frac{\pi}{4}\right)\cdot UW_3^{*(k)}\right|}{\sum_{k=0}^{Luw_3-1}|y(i+k+Iuw_3)|^2}$$

For PNB3(5,12)

$$TC(i) = \frac{\left|\sum_{k=0}^{Luw_1-1} y(i+k+Iuw_1)\cdot \exp\left(-j\frac{\pi}{4}k\right)\cdot UW_1^{*(k)}\right|^2}{\sum_{k=0}^{Luw_1-1}|y(i+k+Iuw_1)|^2} + \quad (2\text{-}12)$$

$$\frac{\left|\sum_{k=0}^{Luw_3-1} y(i+k+Iuw_3)\cdot \exp\left(-j\frac{\pi}{4}\right)\cdot UW_3^{*(k)}\right|^2}{\sum_{k=0}^{Luw_3-1}|y(i+k+Iuw_3)|^2} +$$

$$\frac{\left|\sum_{k=0}^{Luw_4-1} y(i+k+Iuw_4)\cdot \exp\left(-j\frac{\pi}{4}k\right)\cdot UW_4^{*(k)}\right|^2}{\sum_{k=0}^{Luw_4-1}|y(i+k+Iuw_4)|^2} +$$

$$\frac{\left|\sum_{k=0}^{Luw_5-1} y(i+k+Iuw_5)\cdot \exp\left(-j\frac{\pi}{4}\right)\cdot UW_5^{*(k)}\right|}{\sum_{k=0}^{Luw_5-1}|y(i+k+Iuw_5)|^2}$$

$Iuw_n$ denotes the time index corresponds to the starting time of the symbols in n-th UW segment, and $Luw_n$ denotes the number of symbols in n-th UW segment.

Then the adjusted timing offset based on symbol and burst timing estimate is given by $$\hat{\tau} = \tilde{\tau} + \hat{i}T \quad (2\text{-}13)$$

and the sample timing index is adjusted by amount of $\hat{i}$. That is y(n) is replaced with y(n–$\hat{i}$).

Burst Detection

For PNB3(1,6) and PNB3(2,6) if the following test is true, the burst is declared to be present. Otherwise, it will be declared as no burst received.

$$TC(i)\hat{\ } \geq \gamma$$

where the threshold γ is the design parameter.

For PNB3(5,3) and PNB3(5,12) if the following test is true, the burst is declared to be present. Otherwise, it will be declared as no burst received.

$$TC(\hat{i}) + \frac{\left|\sum_{k=0}^{Luw_2-1} y(\hat{i}+k+Iuw_2)\cdot \exp\left(-j\frac{\pi}{4}k\right)\cdot UW_2^{*(k)}\right|^2}{\sum_{k=0}^{Luw_2-1}|y(\hat{i}+k+Iuw_2)|^2} \geq \gamma$$

where the threshold γ is the design parameter. (2-14)

Frequency Estimation

De-Rotation

The burst timing adjusted output symbols of the interpolator are de-rotated to QPSK symbols by $$y_d(n) = y(n)\exp\left(-j\frac{\pi}{4}n\right) \text{ for } n = 0, \ldots, N-1$$

where n is an integer denoting the symbol time index. The first symbol of the burst, excluding guard symbols, is assumed to start with index 0 and this convention will be used for the rest of the document.

Modulation Removal

If we denote the $y_d(n)$ in the polar domain as $$y_d(n)=\rho(n)\cdot\exp(j\phi(n)) \text{ for } n=0,\ldots,N-1 \quad (2\text{-}15)$$

The modulation on de-rotated symbols can be removed as follows $$y_m(n)=(\rho(n))^q\cdot\exp(j\cdot r\cdot\phi(n)) \text{ for } n=0,\ldots,N-1 \quad (2\text{-}16)$$

where q=2 and r=4. Note that because of the modulation removal process, the frequency offset is effectively quadrupled.

Frequency Estimation on Modulation Removed Symbols

Frequency estimation is performed in two stages. In stage one the frequency estimation on the modulation removed symbols are performed by DFT around the center frequency of 0 with the step size of Δf where the frequency search range is $$f_i \in [-f_{max}, -f_{max}+\Delta f, \ldots, -\Delta f, 0, \Delta f, \ldots, f_{max}-\Delta f, f_{max}] \quad (2\text{-}17)$$

The frequency estimate is given by $$\hat{f}_{DFT} = \underset{f_i \in [-f_{max}, -f_{max}+\Delta f, \ldots, -\Delta f, 0, \Delta f, \ldots, f_{max}-\Delta f, f_{max}]}{\arg\max} F_{DFT}(f_i) \quad (2\text{-}18)$$

where $$F_{DFT}(f_i) = \left|\sum_{n=Iuw1}^{N-Lguard2-Luw5-1} y_m(n)\cdot\exp(j2\pi\cdot n\cdot f_i\cdot T_s)\right|^2 \quad (2\text{-}19)$$

The estimate frequency from DFT is $\tilde{f}=\hat{f}/4$. The factor of 4 comes from the fact that the modulation removal process has quadrupled the frequency offset. Finer frequency estimation is obtained by 3-point Lagrange interpolator as follows:

$$\hat{f} = \tilde{f} + \frac{\Delta f}{4}\cdot\Delta \quad (2\text{-}10)$$

where $$\Delta = \frac{1}{2}\cdot\frac{F_{DFT}(\hat{f}_{DFT}-\Delta f) - F_{DFT}(\hat{f}_{DFT}+\Delta f)}{F_{DFT}(\hat{f}_{DFT}-\Delta f) + F_{DFT}(\hat{f}_{DFT}-\Delta f) - 2F_{DFT}(\hat{f}_{DFT})} \quad (2\text{-}11)$$

Note that $|\Delta|$ should not be larger than 0.5, and if this is larger than 0.5 from the numerical error in the implementation, $\Delta$ should be set to zero.

In stage 2, frequency estimation based on known symbols: UW, transition symbols, and Tail symbols is done. The overall procedure is as follows. In the first stage, $N_{candidate}$ frequency offset candidates are obtained by performing DFT on the modulation removed symbols $y_n$ as:

$$\hat{f}_1 = \underset{f_i \in [-f_\Delta, f_\Delta]}{\arg\max} \left| \sum_{n=luw1}^{N-Lguard2-Luw5-1} y_n \exp(j2\pi \cdot n \cdot f_i T) \right| \quad (2\text{-}12)$$

$$\hat{f}_2 = \underset{\substack{f_i \in [-f_\Delta, f_\Delta] \\ f_i \notin [\hat{f}_1]}}{\arg\max} \left| \sum_{n=luw1}^{N-Lguard2-Luw5-1} y_n \exp(j2\pi \cdot n \cdot f_i T) \right|$$

$$\vdots$$

$$\hat{f}_{N_{candidate}} = \underset{\substack{f_i \in [-f_\Delta, f_\Delta] \\ f_i \notin [\hat{f}_1, \hat{f}_{N_{candidate}-1}]}}{\arg\max} \left| \sum_{n=luw1}^{N-Lguard2-Luw5-1} y_n \exp(j2\pi \cdot n \cdot f_i T) \right|$$

where T is the symbol duration. In this stage, frequency offsets, which yield the $N_{candidate}$ largest |DFT| values, are chosen. Finally, one of the $N_{candidate}$ frequency offsets $\hat{f}_1, \hat{f}_2, \ldots, \hat{f}_{N_{candidate}}$, is selected by the following correlation with known symbols in the second stage:

$$\hat{f} = \underset{f \in [\hat{f}_1, \hat{f}_{N_{candidate}}]}{\max} \left| \sum_{i=luw_1}^{i=luw_1+Luw_1} \left( \left( y(n)\exp\left(-j\frac{i\pi}{4}\right) \right) \right) \right. \quad (2\text{-}13)$$

$$\exp\left(-j2\pi \cdot \hat{f}_i \cdot i/(4*BW)\right) \cdot UW_1^*(i) +$$

$$\sum_{i=luw_2}^{i=luw_2+Luw_2} \left( \left( y(n)\exp\left(-j\frac{i\pi}{4}\right) \right) \right)$$

$$\exp\left(-j2\pi \cdot \hat{f}_i \cdot i/(4*BW)\right) \cdot UW_2^*(i) +$$

$$\sum_{i=luw_3}^{i=luw_3+Luw_3} \left( (y(n)\exp\left(-j2\pi \cdot \hat{f}_i \cdot i/(4*BW)\right) \right) \cdot$$

$$UW_3^*(i) + \sum_{i=luw_4}^{i=luw_4+Luw_4} ((y(n))$$

$$\exp\left(-j2\pi \cdot \hat{f}_i \cdot i/(4*BW)\right) \cdot$$

$$\left. UW_4^*(i) + \sum_{i=luw_5}^{i=luw_5+Luw_5} ((y(n))\exp \right.$$

$$\left. \left(-j2\pi \cdot \hat{f}_i \cdot i/(4*BW)\right) \cdot UW_5^*(i) \right|$$

where $\tau_2 + \hat{\tau}_c$ denotes the corrected starting time index of UW symbols. Note that if $N_{candidate}$ is set one, the frequency estimation becomes solely DFT based blind estimation. For PNB3(5,12), PNB3(1,6) and PNB3(2,6) $N_{candidate}$ is set to one. For PNB3(5,3) $N_{candidate}$ is set to three.

Frequency Compensation to the Modulated Signal

The frequency offset is compensated by applying the negative of the frequency loop output to the de-rotated symbols, given by $$u(n) = y_d(n)\exp(-j \cdot 2\pi \hat{f} \cdot n \cdot T_s), n=0, \ldots, N-1 \quad (2\text{-}14)$$

Phase Estimation

First stage of phase estimation when two-stage phase estimation is employed

After compensating time and frequency, the residual phase error is estimated and compensated. Phase estimates are computed based on known symbols in the burst (i.e., UWs). These values are linearly interpolated to compensate the phase for the symbols between UW segments. The phase estimates $\theta_n$ are obtained by taking the angle of the correlation values as:

$$\theta_1 = \arctan\left( \sum_{n=1}^{n=2} \sum_{i=0}^{Luw_n-1} i(Iuw_n + i)UW_n^*(i) \right) \quad (2\text{-}15)$$

$$\theta_n = \arctan\left( \sum_{i=0}^{Luw_{n+1}-1} u(Iuw_{n+1} + i)UW_{n+1}^*(i) \right) \text{ for } n \in \{2, 3, 4\}$$

where $N_m$ is the number of UW segments and the u(i) represents the frequency error compensated output sequence, and $Iuw_n$ represents the starting indexes for received symbol corresponding to n-th UWs, and arctan(●) returns a value in $(-\pi, \pi)$. In order to avoid a modulo $2\pi$ problem in interpolating phase values, the following unwrapping formula is used for $n \in \{2, \ldots, N_m\}$:

$$\theta'_n = \theta_n + \left[ \frac{\theta_{n-1} - \theta_n}{\pi} \right] \cdot 2\pi \quad (2\text{-}16)$$

where [x] denotes the operation of taking integer part of x. For compensating the phase of the symbols between each phase estimate on UWs, the linearly interpolated phase values given below are applied to the sequence u via $\exp(-j\theta(i))$:

$$\vartheta(i) = \begin{cases} \theta_1 & \text{for } i \leq X_1 \\ \theta_n + (\theta'_{n+1} - \theta_n) \cdot \frac{(i - X_n)}{X_{n+1} - X_n} & \text{for } X_n < i \leq X_{n+1}, \\ \theta'_{N_m} & \text{for } i > X_{N_m} \end{cases} \quad (2\text{-}17)$$

$$n \in \{1, 2, \ldots, N_m - 1\}$$

where $X_n$ is the time index of the middle symbol in the n-th UW segment given by $$X_n = Iuw_n + \frac{1}{2}Luw_n$$

Note that $X_n$ does not have to be an integer and can be real value. The phase corrected symbol is denoted by $$\hat{u}(n) = u(n)\exp(-j \cdot \theta(n))$$

Phase Estimation for Bursts with Single Stage Phase Estimation

With the frequency loop output, $\hat{f}^{(p)}$ given in (2-14), the modulation removed samples are frequency offset compensated as:

$$u(n) = y_m(n) \cdot \exp(-j2\pi \cdot 4 \cdot \hat{f}^{(p)} \cdot n \cdot T_s), n=0, \ldots, N-1 \quad (2\text{-}18)$$

In the presence of AWGN, $y'_m(n)$ is equivalent to an unmodulated carrier with a constant phase throughout the whole burst. This constant phase can be obtained by an unbiased estimation $$\hat{\phi} = \arg\left(\sum_{n=0}^{N-1} u(n)\right) \quad (2\text{-}19)$$

Through a fading channel, however, the anticipated phase φ varies throughout a burst instead of a constant. To account for such phase variation, phase estimation will be performed over smaller blocks split from one burst.

Let $L_{est}$ and $L_{step}$ denote, in term of number of symbols, the length of estimation interval and relative alignment of two consecutive blocks respectively. Here two types of blocks are defined:

Estimation block $I_k$
Phase block $B_k$.

The former is the interval of estimation while the latter is the interval to distinguish the phase variation. To obtain stable estimation, $L_{est}$, the length of estimation interval is bigger than that of phase block, and thus there is an overlap between two consecutive estimation intervals. The delineated blocks for phase estimation within one burst are shown in FIG. 58.

FIG. 58. Block Delineation within One Burst for Phase Tracking

With $L_{est}$ selected as an odd number, the phase of the midpoint of each estimation block can be obtained by unwrapping the averaged phasors within that block $$\phi_k = \arg\left(\sum_{i \in I_k} u(i)\right), k = 0, \ldots, K-1 \quad (2\text{-}20)$$

$$\hat{\phi}_k = \hat{\phi}_{k-1} + (\phi_k - \phi_{k-1}) - 2\pi \cdot \text{int}\left\{\frac{(\phi_k - \phi_{k-1})}{\pi}\right\}, \quad (2\text{-}21)$$
$$1 \leq k \leq K-1$$

where $\hat{\phi}_0 = \phi_0$, int{X} denotes the integer part of X, and K is the total number of phase blocks over each PNB3(5,12) burst. Each estimation interval $I_k$ is composed as $$I_k = \{kL_{step} \leq i \leq kL_{step} + L_{est} - 1\} \ 0 \leq k \leq K-1 \quad (2\text{-}22)$$

and the phase blocks $B_k$ are composed by $$B_k = \quad (2\text{-}23)$$
$$\begin{cases} \{i \mid 0 \leq i \leq L_{est}/2 + L_{step}/2 - 1\}, k = 0 \\ \{i \mid L_{est}/2 + (k-1/2)L_{step} \leq i \leq L_{est}/2 + (k+1/2)L_{step} - 1\}, \\ \qquad 1 \leq k \leq K-2 \\ \{i \mid L_{est}/2 + (k-1/2)L_{step} \leq i \leq L-1\}, k = K-1 \end{cases}$$

For PNB3(5,12), $L_{step}=9$, $L_{est}=31*4$, and L=2315, and there are K=245 phase blocks.

Phase Compensation

The estimated $\hat{\phi}_k$ as the phases of the corresponding blocks, the frequency offset compensated samples in (1-27a) are further phase offset compensated as $$\hat{x}(i) = u(i) \cdot \exp(-j\hat{\phi}/4), i \in B_k \quad (2\text{-}24)$$

where the factor 4 comes from the fact that the phase estimate is performed over the modulation removed signal.

Phase Ambiguity Removal

The estimated phase $\hat{\phi}_k$ may not be a true estimate of the initial phase $\phi_0$. This is due to the fact that the solution (1-35) is not unique. This actually leads to a set of four candidate solutions, $$(\hat{\phi}_k + 2\pi \cdot l)/4, k=0, \ldots, K-1 \quad (2\text{-}25)$$

exist for l=0, 1, 2, and 3. This ambiguity can be resolved based on the available known symbols. by performing complex correlation against the first UW ($UW_1$) and the second UW ($UW_2$).

$$W_{PNB512} = \sum_{k=0}^{24} \hat{x}(k + Iuw_1) \cdot UW_1^*(k) + \sum_{k=0}^{k=4} \hat{x}(k + Iuw_2) \cdot UW_2^*(k) \quad (2\text{-}26)$$

and by quantizing to the nearest phase values of $l \cdot \pi/2$ where l=0, 1, 2, 3, the phase ambiguity is determined as $$\hat{\beta} = \hat{l}\frac{\pi}{2} \quad (2\text{-}27)$$

where $$\hat{l} = \arg\left(\min_l \left| l \cdot \frac{\pi}{2} - \tan^{-1}\left(\frac{\text{Im}(W_{PNB512})}{\text{Re}(W_{PNB512})}\right)\right|\right), l = 0, 1, 2, 3 \quad (2\text{-}28)$$

The data samples $\hat{x}(n)$ are then phase offset compensated as $$\hat{u}(n) = \hat{x}(n) \cdot \exp(-j\hat{\beta}) \quad (2\text{-}29)$$

Tentative Symbol Generation

The QPSK modulated samples $\hat{u}(n)$ is first phase rotated by π/4:

$$\hat{v}(n) = v_I(n) + jv_Q(n) = \hat{u}(n) \cdot \exp\left(j\frac{\pi}{4}\right), \quad (2\text{-}30)$$
$$n = 0, \ldots, N-1$$

then the in-phase and q-phase of the signal is flipped to yield:

$$\hat{d}(n) = v_Q(n) + jv_I(n), n=0, \ldots, N-1 \quad (2\text{-}31)$$

The real part of $\hat{d}(n)$ corresponds to the soft bit of even index bits and imaginary part of $\hat{d}(n)$ corresponds to the soft bit of odd index bits where the first bits of the burst, excluding guard bits, is assumed to start with index 0 (even index).

Based on the decisions over samples $v_I$ and $v_Q$ the detected QPSK symbol is finally obtained at the output of the symbol-mapping device.

TABLE 2-15

Demodulated symbol decisions for QPSK

| Detected QPSK Symbol | Detected QPSK SYMBOL INDEX | Range of the phase-rotated samples $v_I, v_Q$ |
|---|---|---|
| $e^{j\pi 0/2}$ | 0 | $v_I \geq 0, v_Q \geq 0$ |
| $e^{j\pi/2}$ | 1 | $v_I < 0, v_Q \geq 0$ |
| $e^{j2\pi/2}$ | 2 | $v_I < 0, v_Q < 0$ |
| $e^{j3\pi/2}$ | 3 | $v_I \geq 0, v_Q < 0$ |

Second Stage Phase Estimation when Two-Stage Phase Estimation is Employed

The unique words and the symbols in the data fields of the burst are utilized for phase and amplitude tracking. Let us consider a burst having $K_1$ unique-word fields and $K_2$ data fields (payload and PUI). For each of the fields, we obtain w(n) which is given by $$w(n) = \hat{u}(n)s_k^*(n) \quad (2\text{-}32)$$

For a field belonging to one of the $K_1$ unique-word fields, $s_k$ is the complex constellation point for unique word symbol in the corresponding field and for the $K_2$ data fields, $s_k$ is the complex constellation point for the symbol decision obtained in Section 2.2.6 in the corresponding data field.

Let $L_{est}$ and $L_{step}$ denote, in term of number of symbols, the length of estimation interval and relative alignment of two consecutive blocks respectively. Here two types of blocks are defined:

Estimation block $I_k$

Phase block $B_k$.

The former is the interval of estimation while the latter is the interval to distinguish the phase variation. To obtain stable estimation, $L_{est}$, the length of estimation interval is bigger than that of phase block, and thus there is an overlap between two consecutive estimation intervals. The delineated blocks for phase estimation within one burst are shown in FIG. 59.

FIG. 59. Block Delineation within One Burst for Phase Tracking

With $L_{est}$ selected as an odd number, the phase of the midpoint of each estimation block can be obtained by unwrapping the averaged phasors within that block $$\phi_k = \arg\left(\sum_{i \in I_k} w(i)\right), k = 0, \cdots, K-1 \quad (2\text{-}33)$$

$$\hat{\phi}_k = \hat{\phi}_{k-1} + (\phi_k - \phi_{k-1}) - 2\pi \cdot \text{int}\left\{\frac{(\phi_k - \phi_{k-1})}{\pi}\right\}, \quad (2\text{-}34)$$
$$1 \leq k \leq K-1$$

where $\hat{\phi}_0 = \phi_0$, $\text{int}\{X\}$ denotes the integer part of X, and K is the total number of phase blocks over each burst. Each estimation interval $I_k$ is composed as $$I_k = \{kL_{step} \leq i \leq kL_{step} + L_{est} - 1\} \quad 0 \leq k \leq K-1 \quad (2\text{-}35)$$

and the phase blocks $B_k$ are composed by $$B_k = \quad (2\text{-}36)$$
$$\begin{cases} \{i \mid 0 \leq i \leq L_{est}/2 + L_{step}/2 - 1\}, k = 0 \\ \{i \mid L_{est}/2 + (k-1/2)L_{step} \leq i \leq L_{est}/2 + (k+1/2)L_{step} - 1\}, \\ \quad 1 \leq k \leq K-2 \\ \{i \mid L_{est}/2 + (k-1/2)L_{step} \leq i \leq L-1\}, k = K-1 \end{cases}$$

The phase compensated output is denoted by u' (n). For all the other code rates $u'(n) = \hat{u}(n)$ Noise Variance Estimation Noise Variance Estimation for PNB3(2,6)

The unique words symbols of the burst are utilized for estimation of the noise variance which can be used for decoding the Turbo code. Let us consider 4 unique-word fields for PNB3(2,6). For each of the fields an estimate of the amplitude gain $\eta_i$ is evaluated which is given by $$\eta_i = \frac{\sum_{n=luw_i}^{n=luw_i+Luw_i-1} u'_i(n)s^*_i(n)}{\sum_{n=luw_i}^{n=luw_i+Luw_i-1} |s_i(n)|^2} \quad i = \{1, 4\} \quad (2\text{-}37)$$

For a field belonging to one of the $K_1$ unique-word fields, $s_i(n)$ is the complex constellation point for unique word symbol in the corresponding field.

Given $\eta_i$, $u'_i(n)$ and $s_i(n)$, the maximum-likelihood estimate $\sigma^2$ of the noise variance is $$2\sigma^2 = \frac{1}{Luw_1 + Luw_2 + Luw_3 + Luw_4} \quad (2\text{-}38)$$
$$\left( \sum_{n=luw_1}^{n=luw_1+Luw_1} |u'_1(n) - \eta_1 s_1(n)|^2 + \sum_{n=luw_2}^{n=luw_2+Luw_2} |u'_2(n) - \eta_2 s_2(n)|^2 + \right.$$
$$\sum_{n=luw_3}^{n=luw_3+Luw_3} |u'_3(n) - \eta_3 s_3(n)|^2 +$$
$$\left. \sum_{n=luw_4}^{n=luw_4+Luw_4} |u'_4(n) - \eta_4 s_4(n)|^2 \right).$$

The above estimate of the noise variance is used for Turbo decoding.

Noise variance estimation for PNB3(5,3) and PNB3(5,12)

For PNB3(5,3) and PNB3(5,12) UW1 and UW2 are considered as one UW block. Thus we consider a total of $K_1=4$ UW fields in PNB3(5,12) burst and a K1=3 fields in PNB3 (5,3)

For each of the UW fields an estimate of the amplitude gain $\eta_i$ is evaluated which is given by $$\eta_1 = \frac{\sum_{n=luw_1}^{n=luw_1+Luw_1-1} u'_1(n)s^*_1(n) + \sum_{n=luw_2}^{n=luw_2+Luw_2-1} u'_2(n)s^*_2(n)}{\sum_{n=luw_1}^{n=luw_1+Luw_1-1} |s_1(n)|^2 + \sum_{n=luw_2}^{n=luw_2+Luw_2-1} |s_2(n)|^2} \quad (2\text{-}40)$$

$$\eta_j = \frac{\sum_{n=luw_i}^{n=luw_i+Luw_i-1} u'_i(n)s^*_i(n)}{\sum_{n=luw_i}^{n=luw_i+Luw_i-1} |s_i(n)|^2}$$

$i = \{3, 4, 5\}, j = i-1$ for $PNB3(5,12)$ $i = \{3, 4\}, j = i-1$ for $PNB3(5,3)$ For a field belonging to one of the $K_1$ unique-word fields, $s_i(n)$ is the complex constellation point for unique word symbol in the corresponding field.

Given $\eta_i$, $u'_i(n)$ and $s_i(n)$, the maximum-likelihood estimate $\sigma^2$ of the noise variance is For PNB3(5,12)

$$2\sigma^2 =$$
$$\frac{1}{Luw_1 + Luw_2 + Luw_3 + Luw_4 + Luw_5} \left( \sum_{n=luw_1}^{n=luw_1+Luw_1} |u'_1(n) - \eta_1 s_1(n)|^2 + \right.$$
$$\sum_{n=luw_2}^{n=luw_2+Luw_2} |u'_2(n) - \eta_1 s_2(n)|^2 + \sum_{n=luw_3}^{n=luw_3+Luw_3} |u'_3(n) - \eta_2 s_3(n)|^2 +$$

$$\sum_{n=luw_4}^{n=luw_4+Luw_4}|u'_4(n)-\eta_3 s_4(n)|^2 + \sum_{n=luw_5}^{n=luw_5+Luw_5}|u'_5(n)-\eta_4 s_5(n)|^2\Bigg)$$

For PNB3(5,3)

$$2\sigma^2 = \frac{1}{Luw_1+Luw_2+Luw_3+Luw_4}$$

$$\left(\sum_{n=luw_1}^{n=luw_1+Luw_1}|u'_1(n)-\eta_1 s_1(n)|^2 + \sum_{n=luw_2}^{n=luw_2+Luw_2}|u'_2(n)-\eta_1 s_2(n)|^2 + \right.$$

$$\left.\sum_{n=luw_3}^{n=luw_3+Luw_3}|u'_3(n)-\eta_2 s_3(n)|^2 + \sum_{n=luw_4}^{n=luw_4+Luw_4}|u'_4(n)-\eta_3 s_4(n)|^2\right).$$

The above estimate of the noise variance is used for Turbo decoding.

Amplitude Estimation and Compensation

Tentative symbol decisions on the payload and PUI symbols afer second stage phase tracking as described in Section 1.4.6 is made. The unique words and the symbols in the data fields of the burst are utilized for amplitude estimation. Let 0 be the index in the burst for the first symbol after the first guard interval and K be the index for the first symbol of the guard interval at the end of the burst. An estimate of the amplitude gain $I_I$ is given by:

$$\eta = \frac{\left|\sum_{k=0}^{K-1}u'_k s_k^*\right|}{\sum_{k=0}^{K-1}|s_k|^2} \quad (2\text{-}41)$$

$s_k$ is the complex constellation point for the corresponding unique word symbol or for the tentative symbol decision obtained in Section 1.4.6 for the data fields.

The demodulated symbol in each burst, u'(n) is scaled by $1/\eta$ to obtain new symbol r(n)

$$r(n)=u'(n)/\eta \quad (2\text{-}42)$$

SNR Estimation

Given received signal samples (after demod timing, frequency, and phase correction), r(n), n=, 1, ..., K−1, and transmitted bits s(n), n=0, 1, ..., K−1, it is straightforward to show that the maximum-likelihood estimate λ of the channel gain is given by $$\lambda = \left|\frac{\sum_{n=0}^{K-1}r(n)s^*(n)}{\sum_{n=0}^{K-1}|s(n)|^2}\right|.$$

Given λ, r(n) and s(n), the maximum-likelihood estimate $\sigma^2$ of the noise variance is $$2\sigma^2 = \frac{1}{K}\sum_{n=0}^{K-1}|r(n)-\lambda s(n)|^2.$$

Similarly, given λ and s(n), the average signal energy $\mu^2$ is given by $$\mu^2 = \frac{1}{K}\lambda^2\sum_{k=0}^{K-1}|s(n)|^2.$$

Taking the ratio of $\mu^2$ and $\sigma^2$, the estimated SNR is given by:

$$SNR_{init} = 10\log_{10}\left(\frac{\mu^2}{2\sigma^2}\right) \quad (2\text{-}43)$$

$$= 10\log_{10}\left(\frac{\lambda^2\sum_{k=0}^{K-1}|s(n)|^2}{\sum_{k=0}^{K-1}|r(n)-\lambda s(n)|^2}\right)$$

The transmit symbol s(n) is in general unknown a priori, but they can be estimated at the receiver:

Known symbols. The case where the sample indexes represent the known pilot symbols. True values are used for s(n).

Unknown (data or payload) symbols. The case where the sample indexes represent the unknown data symbols in the burst. The choice for the values s(n):

Hard decision values of the demodulator output are used for s(n). This is the case for conventional SNR estimator and referred to as "Blind EVM scheme".

Usually, in low SNR, the SNR estimator exhibits a high bias, and this bias can be removed by applying the linearizer. The linearizer can be realized by a memoryless mapping function, denoted by $L(SNR_{init})$. Then, the linearized SNR estimate is given by $$SNR_{dB}=L(SNR_{init}(SNR)) \quad (2\text{-}44)$$

The purpose of the linearizer is to reduce the bias such that the mean of the estimator is the same as the actual channel SNR Symbol Decisions and Soft Bit Generation The QPSK modulated samples in r(n) is first phase rotated by π/4:

$$\hat{v}(n) = v_I(n)+jv_Q(n) = r(n)\cdot\exp\left(j\frac{\pi}{4}\right), \quad (2\text{-}45)$$

then the in-phase and q-phase of the signal is flipped to yield:

$$\hat{d}(n)=v_Q(n)+jv_I(n), \quad (2\text{-}46)$$

The real part of $\hat{d}(n)$ corresponds to the soft bit of even index bits and imaginary part of $\hat{d}(n)$ corresponds to the soft bit of odd index bits where the first bits of the burst, excluding guard bits, is assumed to start with index 0 (even index).

Based on the decisions over samples $v_I$ and $v_Q$, the detected QPSK symbol is finally obtained at the output of the symbol-mapping device.

TABLE 2-16

Demodulated Symbol Decision

| Detected QPSK Symbol | Detected QPSK SYMBOL INDEX | Range of the phase-rotated samples $v_I$, $v_Q$ |
|---|---|---|
| | | $v_I \geq 0, v_Q \geq 0$ |
| | | $v_I < 0, v_Q \geq 0$ |
| | | $v_I < 0, v_Q < 0$ |
| | | $v_I \geq 0, v_Q < 0$ |

For Turbo coded bursts The soft bits are scaled as $v'_I(n) = v_I(n) \cdot \sqrt{2} |\eta|^2/\sigma^2$ $v'_Q(n) = v_Q(n) \cdot \sqrt{2} |\eta|^2/\sigma^2$ $$d'(n) = v'_Q(n) + jv'_I(n) \quad (2\text{-}47)$$

where the values of $\hat{\eta}_i$, are as calculated in the previous section.

The scaled, soft-bits are then quantized into 5 bit signed integer values (i.e., they are represented in integer values between −32 and 31) as $\{\Re\{\tilde{d}(0)\}, \Im\{\tilde{d}(0)\}, \Re\{\tilde{d}(1)\}, \Im\{\tilde{d}(1)\}, \ldots, \Re\{\tilde{d}(N-1)\}, \Im\{\tilde{d}(N-1)\}\}$ where $\Re\{X\}$ and $\Im\{X\}$ denotes the real and imaginary part of complex variable X and $$\tilde{d}(n) = \text{int}\{I \cdot d'(n)\} \quad (2\text{-}48)$$

where the function int{ } quantizes its argument with a floor of −32 and a ceiling of 31. The quantization uses I=6. These quantized bits are then fed to the Turbo decoder.

For PNB(1,6) bursts:
The soft bits are scaled as $v'_I(n) = v_I(n) \cdot 2\sqrt{2} \cdot \text{SNR}$ $v'_Q(n) = v_Q(n) \cdot 2\sqrt{2} \cdot \text{SNR}$ $$d'(n) = v'_Q(n) + jv'_I(n) \quad (2\text{-}49)$$

where SNR is the linear, estimated SNR from (46). The scaled, soft, PRI bits are quantized into $W_{PRI}$=8 bit signed integer values (i.e., they are represented in integer values between −128 and 127) as $\{\Re\{\tilde{d}(0)\}, \Im\{\tilde{d}(0)\}, \Re\{\tilde{d}(1)\}, \Im\{\tilde{d}(1)\}, \ldots, \Re\{\tilde{d}(N-1)\}, \Im\{\tilde{d}(N-1)\}\}, \quad (2\text{-}50)$ where $\Re\{X\}$ and $\Im\{X\}$ denotes the real and imaginary part of complex variable X and $$\tilde{d}(n) = \text{int}\{I_{PRI} \cdot d'(n)\} \quad (2\text{-}51)$$

where the function int{ } quantizes its argument with a floor of $-2^{W_{PRI}}$ and a ceiling of $2^{W_{PRI}}-1$ and $I_{PRI}$ is tabulated below for the three code rates.

The quantization translates the unit valued soft bits $(v_I(n) \cdot \sqrt{2}$ and $v_Q(n) \cdot \sqrt{2})$ into integer values between $-I_{PRI}$ to $I_{PRI}-1$. The remaining integer values (from $-2^{W_{PRI}}$ to $-I_{PRI}-1$ and from $I_{PRI}$ to $2^{W_{PRI}}-1$) are used to allow for the headroom given by the multiple 2·SNR. These quantized bits are then fed to the Viterbi decoder.

| Code Rate | $I_{PRI}$ |
|---|---|
| 0.6 | 8 |
| 0.7 | 8 |
| 0.8 | 4 |

Figure 60:
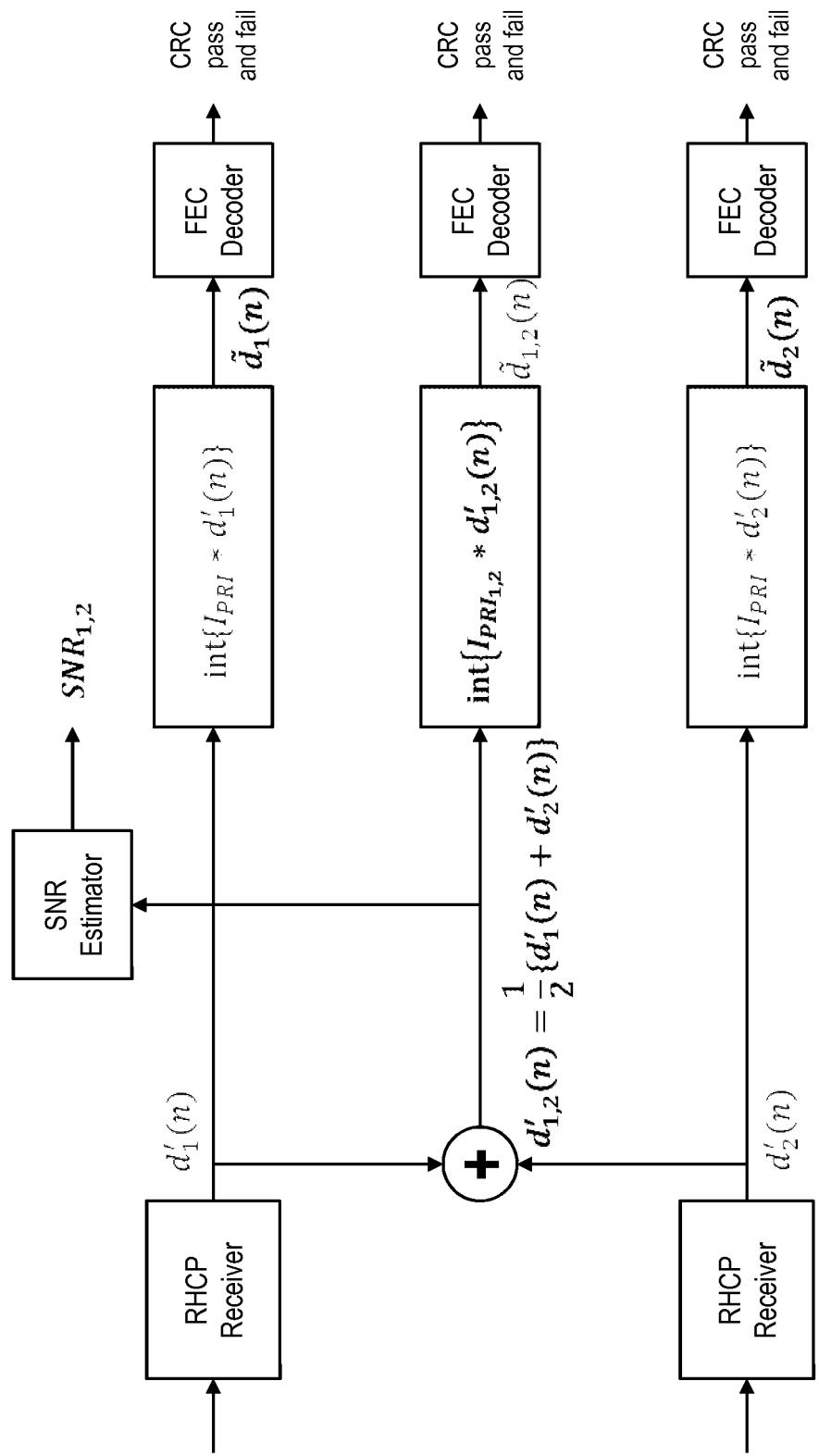

Hybrid Diversity Combining
Two-path Diversity Combining
FIG. 60 shows the block diagram for the two-path diversity combining scheme. This could be polarization or satellite diversity. The two demods output the scaled, soft bits from Equation (2-46). These sequences must also include the scaled, soft UW bits as well, since these are required for SNR estimation. Each of these sequences are added together and scaled by 0.5 as $$d'_{1,2}(n) = \frac{1}{2}\{d'_1(n) + d'_2(n)\} \quad (2\text{-}52)$$

FIG. 60. Two-path diversity combining
For this sequence the I and Q values are first flipped and then the resulting signal is rotated by $\pi/4$ to correct the opposite rotation in Equation (2-46) and then fed to the SNR estimator The PRI bits from the sequence in Equation (2-52) are quantized as $\{\Re\{\tilde{d}_{1,2}(0)\}, \Im\{\tilde{d}_{1,2}(0)\}, \Re\{\tilde{d}_{1,2}(1)\}, \Im\{\tilde{d}_{1,2}(1)\},$
$\Re\{\tilde{d}_{1,2}(2)\}, \Im\{\tilde{d}_{1,2}(2)\}, \ldots\} \quad (2\text{-}53)$ where $\Re\{X\}$ and $\Im\{X\}$ denotes the real and imaginary part of complex variable X and $$\tilde{d}_{1,2}(n) = \text{int}\{I_{PRI_{1,2}} \cdot d'_{1,2}(n)\} \quad (2\text{-}54)$$

where the value of $IPRI_{1,2}$ is half of the value of I given in Section 2.2.11 and the quantizing function int{ } is as described in Section 2.2.11

The quantized sequences derived from $\tilde{d}_1(n)$, $\tilde{d}_2(n)$, and $\tilde{d}_{1,2}(n)$ are then fed to the FEC decoder, which generates the Boolean CRC pass or fail indicator. Finally, between these three quantized sequences or between these three diversity paths, the demod choses the optimal sequence or path by selecting the one with a passed CRC and the largest SNR.

Figure 61:
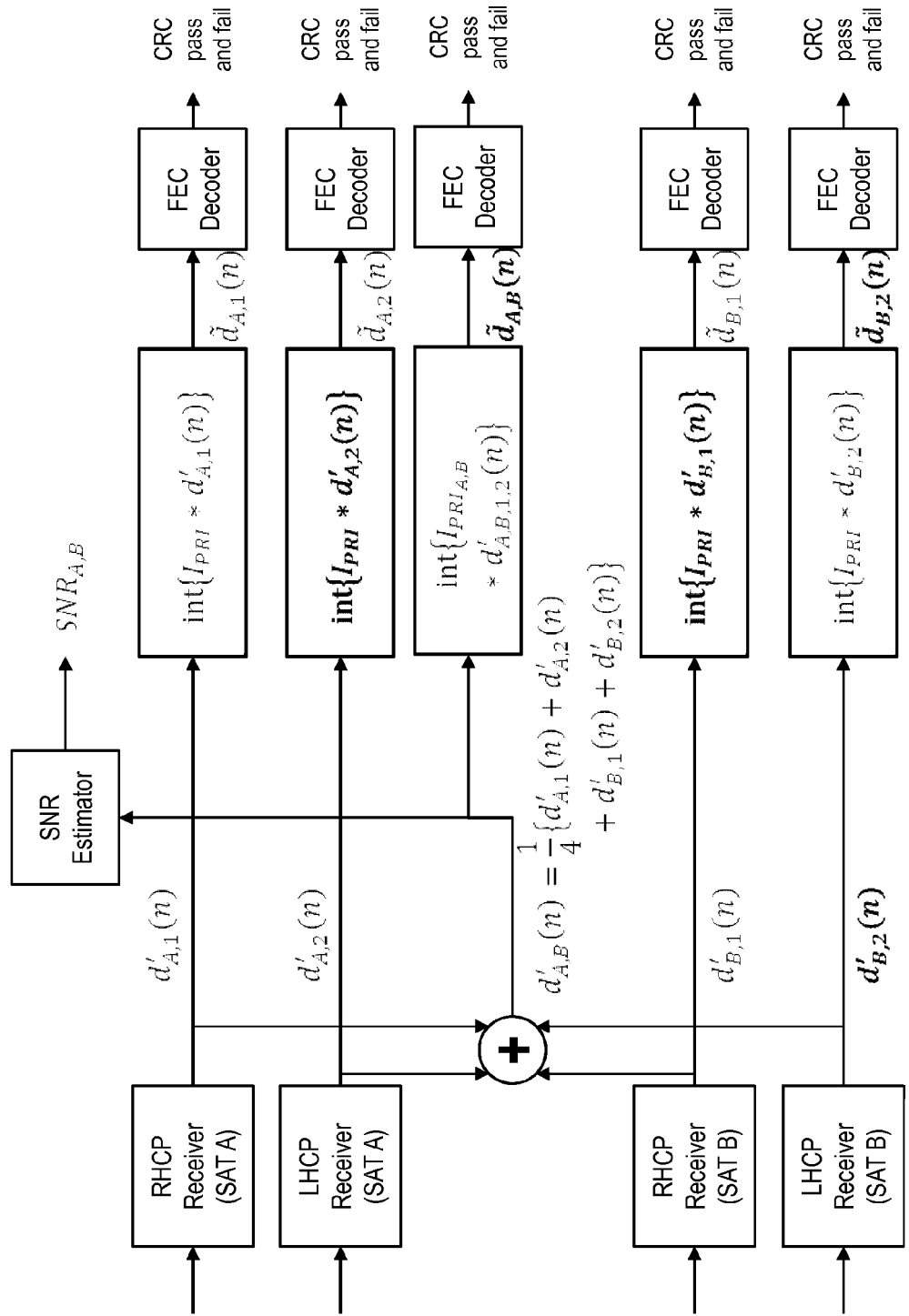

Four Path Diversity Combining
FIG. 61. Four-Path Diversity Combining
FIG. 61 shows the block diagram for the four-path satellite and polarization diversity combining scheme. The four demods—two per satellite—output the scaled, soft bits from Equation (2-46). These sequences must also include the scaled, soft UW bits as well, since these are required for SNR estimation. Each of these sequences are added together and scaled by 0.25 as $$d'_{A,B}(n) = \frac{1}{4}\{d'_{A,1}(n) + d'_{A,2}(n) + d'_{B,1}(n) + d'_{B,2}(n)\} \quad (2\text{-}55)$$

For this sequence the I and Q values are first flipped after which the resulting sequence is rotated by $-\pi/4$ to correct the opposite rotation in Equation (2-46) and then fed to the SNR estimator The PRI bits from the sequence in Equation (2-55) are quantized as $\{\Re\{\tilde{d}_{A,B}(0)\}, \Im\{\tilde{d}_{A,B}(0)\}, \Re\{\tilde{d}_{A,B}(1)\}, \Im\{\tilde{d}_{A,B}(1)\},$
$\Re\{\tilde{d}_{A,B}(2)\}, \Im\{\tilde{d}_{A,B}(2)\}, \ldots\} \quad (2\text{-}56)$ where $\Re\{X\}$ and $\Im\{X\}$ denotes the real and imaginary part of complex variable X and $$\tilde{d}_{A,B}(n) = \text{int}\{I_{PRI_{A,B}} \cdot d'_{A,B}(n)\} \quad (2\text{-}57)$$

where the value of $IPRI_{A,B}$ is one-quarter of the value of I given in Section 2.2.10 and the quantizing function int{ } is as described in Section 2.2.10.

The quantized sequences derived from $\tilde{d}_{A,1}(n)$, $\tilde{d}_{A,2}(n)$, $\tilde{d}_{B,1}(n)$, $\tilde{d}_{B,2}(n)$ and $\tilde{d}_{A,B}(n)$ are then fed to the FEC decoder, which generates the Boolean CRC pass or fail indicator. Finally, between these five quantized sequences or between these five diversity paths, the demod chooses the optimal sequence or path by selecting the one with a passed CRC and the largest SNR.

REFERENCE

C.-K. Chan and W.-H. Lam, "Generalized barker-like PN sequences for quasi-synchronous spread-spectrum multiple-access communication systems", *IEE Proc. Commun.*, vol. 142, no. 2, pp. 91-98, April 1995.

S. W. Golomb and R. A. Scholtz, "Generalized Barker sequences," *IEEE Trans. Inform. Theory*, vol. 11, no. 4, pp. 533-537, October 1965.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
generating, by a physical layer component of a communications device, a data transmission sequence comprising a plurality of data bursts of at least a first burst type, the first burst type being configured to carry a plurality of different data transmission types; and
transmitting, by the communications device, the data transmission sequence over a dedicated channel of a communications network;
wherein,
the plurality of data bursts includes two or more data bursts of the first burst type respectively carrying at least two different ones of the data transmission types,
each data burst of the first burst type consists of a uniform format irrespective of the data transmission type carried by the data burst,
each data burst of the first burst type comprises a unique word signature sequence that is unique to the data transmission type carried by the data burst providing for physical layer burst classification, and
in a case where a one of the data bursts of the first burst type carries VOIP data, the uniform format of the first burst type comprises an arrangement of the VOIP data in a manner whereby perceptually important bits and perceptually unimportant bits of the VOIP data are arranged relative to each other to maximize interleaving and coding gains in fading channels.

2. The method of claim 1, wherein the plurality of different data transmission types comprise voice over IP (VOIP) data of one or more vocoder rates and packet data of one or more data rates, and the physical layer burst classification comprises identification of the data transmission type carried by a respective data burst as VOIP data or packet data and identification of the respective vocoder rate or data rate on a burst-by-burst basis.

3. The method of claim 2, wherein the plurality of different data transmission types further comprise keep alive bursts, and the keep alive bursts are transmitted during silence periods of a VOIP session and comprise a minimal number of symbols to minimize transmission power during such silence periods.

4. The method of claim 1, wherein the uniform format of the first burst type comprises uniform placement of the unique word signature sequence, and the uniform placement of the unique word signature sequence comprises division of the signature sequence into unique word segments and positioning of the segments relative to one another in a manner that offsets channel-induced fading.

5. The method of claim 1, wherein, in a case where a one of the data bursts of the first burst type carries VOIP data, perceptually important bits and perceptually unimportant bits of the VOIP data are encoded using different FEC coding schemes to improve spectral efficiency, whereby the FEC coding scheme used for the perceptually important bits is of a higher quality target than the FEC coding scheme used for the perceptually unimportant bits.

6. The method of claim 1, wherein the communications network comprises a satellite communications network configured in a manner whereby two or more satellites operating with polarization diversity are intended to receive the transmission of the data transmission sequence and to transmit the sequence for receipt by at least one target communications device.

7. The method of claim 6, wherein the uniform format of the first burst type comprises uniform placement of the unique word signature sequence and the uniform placement of the unique word signature sequence comprises a division of the signature sequence into unique word segments and positioning of the segments relative to one another in a manner that offsets one or more of timing, frequency and phase shifts in receipt and transmission of the data transmission sequence between the two or more satellites.

8. The method of claim 6, wherein, in a case where at least one of the data bursts of the first burst type carries VOIP data, the uniform format of the first burst type comprises an arrangement of the VOIP data in a manner whereby perceptually important bits and perceptually unimportant bits of the VOIP data are arranged relative to each other to minimize voice quality degradation resulting from one or more of timing, frequency and phase shifts in receipt and transmission of the data transmission sequence between the two or more satellites.

9. An apparatus comprising:
a physical layer component configured to generate a data transmission sequence comprising a plurality of data bursts of at least a first burst type, the first burst type being configured to carry a plurality of different data transmission types; and
a transmitter component configured to transmit the data transmission sequence over a dedicated channel of a communications network;
wherein,
the plurality of data bursts includes two or more data bursts of the first burst type respectively carrying at least two different ones of the data transmission types,
each data burst of the first burst type consists of a uniform format irrespective of the data transmission type carried by the data burst,
each data burst of the first burst type comprises a unique word signature sequence that is unique to the data transmission type carried by the data burst providing for physical layer burst classification, and
in a case where a one of the data bursts of the first burst type carries VOIP data, the uniform format of the first burst type comprises an arrangement of the VOIP data in a manner whereby perceptually important bits and perceptually unimportant bits of the VOIP data are arranged relative to each other to maximize interleaving and coding gains in fading channels.

10. The apparatus of claim 9, wherein the plurality of different data transmission types comprise voice over IP (VOIP) data of one or more vocoder rates and packet data of one or more data rates, and the physical layer burst classification comprises identification of the data transmission type carried by a respective data burst as VOIP data or packet data and identification of the respective vocoder rate or data rate on a burst-by-burst basis.

11. The apparatus of claim 10, wherein the plurality of different data transmission types further comprise keep alive bursts, and the keep alive bursts are transmitted during silence periods of a VOIP session and comprise a minimal number of symbols to minimize transmission power during such silence periods.

12. The apparatus of claim 9, wherein the uniform format of the first burst type comprises uniform placement of the unique word signature sequence, and the uniform placement of the unique word signature sequence comprises division of the signature sequence into unique word segments and positioning of the segments relative to one another in a manner that offsets channel-induced fading.

13. The apparatus of claim 9, wherein, in a case where a one of the data bursts of the first burst type carries VOIP data, perceptually important bits and perceptually unimportant bits of the VOIP data are encoded using different FEC coding schemes to improve spectral efficiency, whereby the FEC coding scheme used for the perceptually important bits is of a higher quality target than the FEC coding scheme used for the perceptually unimportant bits.

14. The apparatus of claim 9, wherein the communications network comprises a satellite communications network configured in a manner whereby two or more satellites operating with polarization diversity are intended to receive the transmission of the data transmission sequence and to transmit the sequence for receipt by at least one target communications device.

15. The apparatus of claim 14, wherein the uniform format of the first burst type comprises uniform placement of the unique word signature sequence and the uniform placement of the unique word signature sequence comprises a division of the signature sequence into unique word segments and positioning of the segments relative to one another in a manner that offsets one or more of timing, frequency and phase shifts in receipt and transmission of the data transmission sequence between the two or more satellites.

16. The apparatus of claim 14, wherein, in a case where at least one of the data bursts of the first burst type carries VOIP data, the uniform format of the first burst type comprises an arrangement of the VOIP data in a manner whereby perceptually important bits and perceptually unimportant bits of the VOIP data are arranged relative to each other to minimize voice quality degradation resulting from one or more of timing, frequency and phase shifts in receipt and transmission of the data transmission sequence between the two or more satellites.

* * * * *